(12) United States Patent
Gebremariam et al.

(10) Patent No.: US 10,025,813 B1
(45) Date of Patent: Jul. 17, 2018

(54) DISTRIBUTED DATA TRANSFORMATION SYSTEM

(71) Applicant: SAS Institute Inc., Cary, NC (US)

(72) Inventors: Biruk Gebremariam, Cary, NC (US); Xiangxiang Meng, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/876,543

(22) Filed: Jan. 22, 2018

Related U.S. Application Data

(60) Provisional application No. 62/485,247, filed on Apr. 13, 2017.

(51) Int. Cl.
  *G06F 17/30* (2006.01)
  *G06N 99/00* (2010.01)
  *G06N 5/04* (2006.01)

(52) U.S. Cl.
  CPC .. *G06F 17/30371* (2013.01); *G06F 17/30569* (2013.01); *G06N 5/04* (2013.01); *G06N 99/005* (2013.01)

(58) Field of Classification Search
  CPC ........ G06F 17/30371; G06F 17/30569; G06N 5/04; G06N 99/005
  See application file for complete search history.

(56) References Cited

PUBLICATIONS

Heule et al., HyperLogLog in Practice: Algorithmic Engineering of a State of the Art Cardinality Estimation Algorithm, 16th International Conference on Extending Database Technology, Genoa, Italy, Mar. 18, 2013.

P. Pebay, Formulas for Robust, One-Pass Parallel Computation of Covariances and Arbitrary-Order Statistical Moments, SANDIA Report, SAND2008-6212, Sep. 2008.

Hubert et al., An Adjusted Boxplot for Skewed Distributions, Computational Statistics & Data Analysis, vol. 52, issue 12, Aug. 15, 2008, pp. 5186-5201.

J.B. Copas, Regression, Prediction and Shrinkage, Journal of the Royal Statistical Society. Series B (Methodological), vol. 45, No. 3, 1983, pp. 311-354.

Dougherty et al., Supervised and Unsupervised Discretization of Continous Features, Machine Learning: Proceedings of the Twelfth International Conference, 1995.

Hartigan et al., A K-Means Clustering Algorithm, Journal of the Royal Statistical Society. Series C (Applied Statistics), vol. 28, No. 1, 1979, pp. 100-108.

Tsai et al., A discretization algorithm based on Class-Attribute Contingency Coefficient, Information Sciences 178, 2008, pp. 714-731.

*Primary Examiner* — James K Trujillo
*Assistant Examiner* — Jessica N Le
(74) *Attorney, Agent, or Firm* — Bell & Manning, LLC

(57) ABSTRACT

A computing system transforms variable values in a dataset using a transformation flow definition applied in parallel. The transformation flow definition indicates flow variables and transformation phases to apply to the flow variables. A computation is defined for each variable and for each transformation phase. A phase internal parameter value is computed for each defined computation from observation vectors read from the dataset. A current variable, a first variable value, a first transformation phase, the phase internal parameter value, and a current transformation phase are selected based on an observation vector read from the dataset. A result value is computed by executing the transformation function with the phase internal parameter value and the first variable value. The computed result value is output to a transformed input dataset. The process is repeated for each variable, transformation phase, and observation vector.

30 Claims, 32 Drawing Sheets

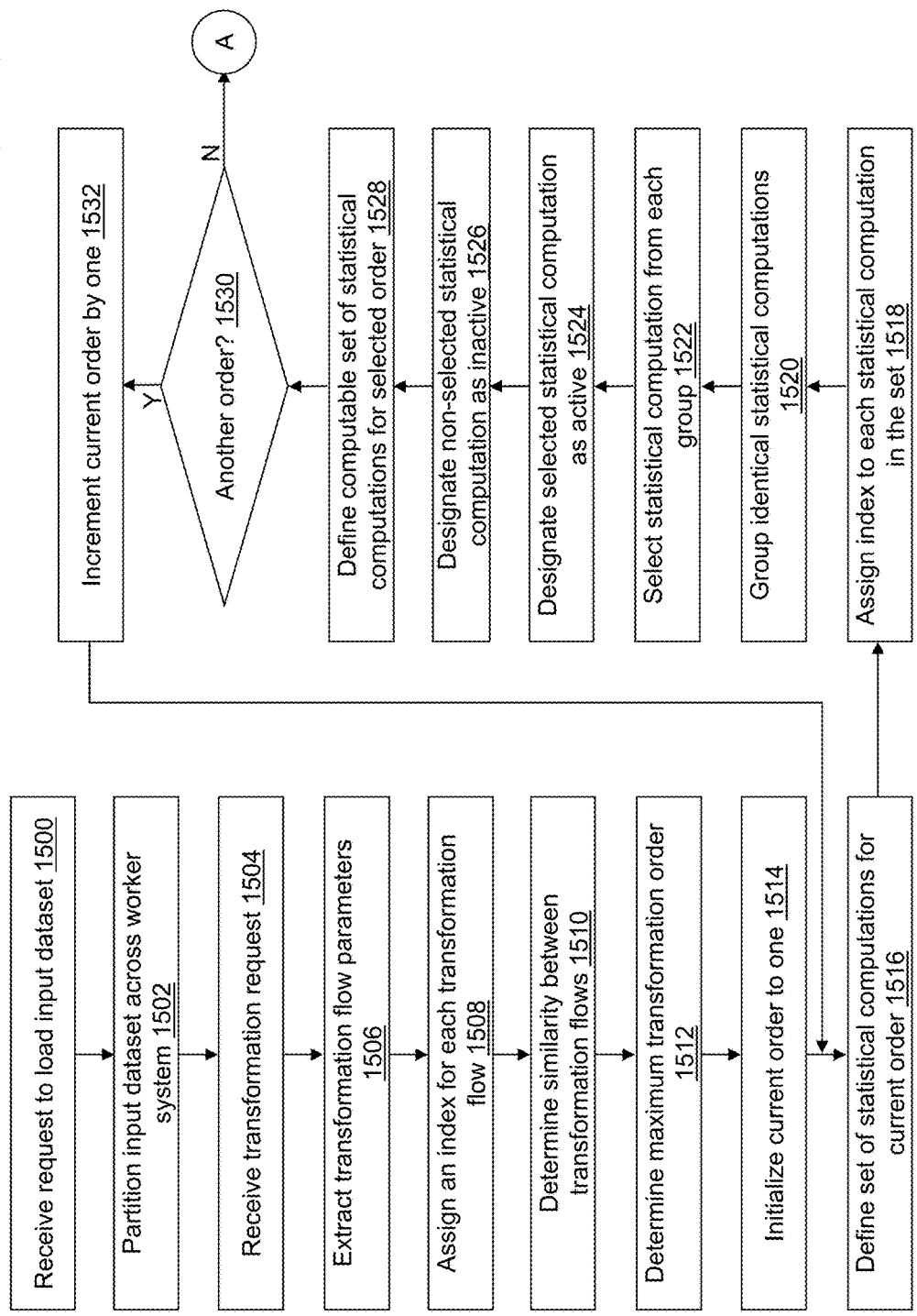

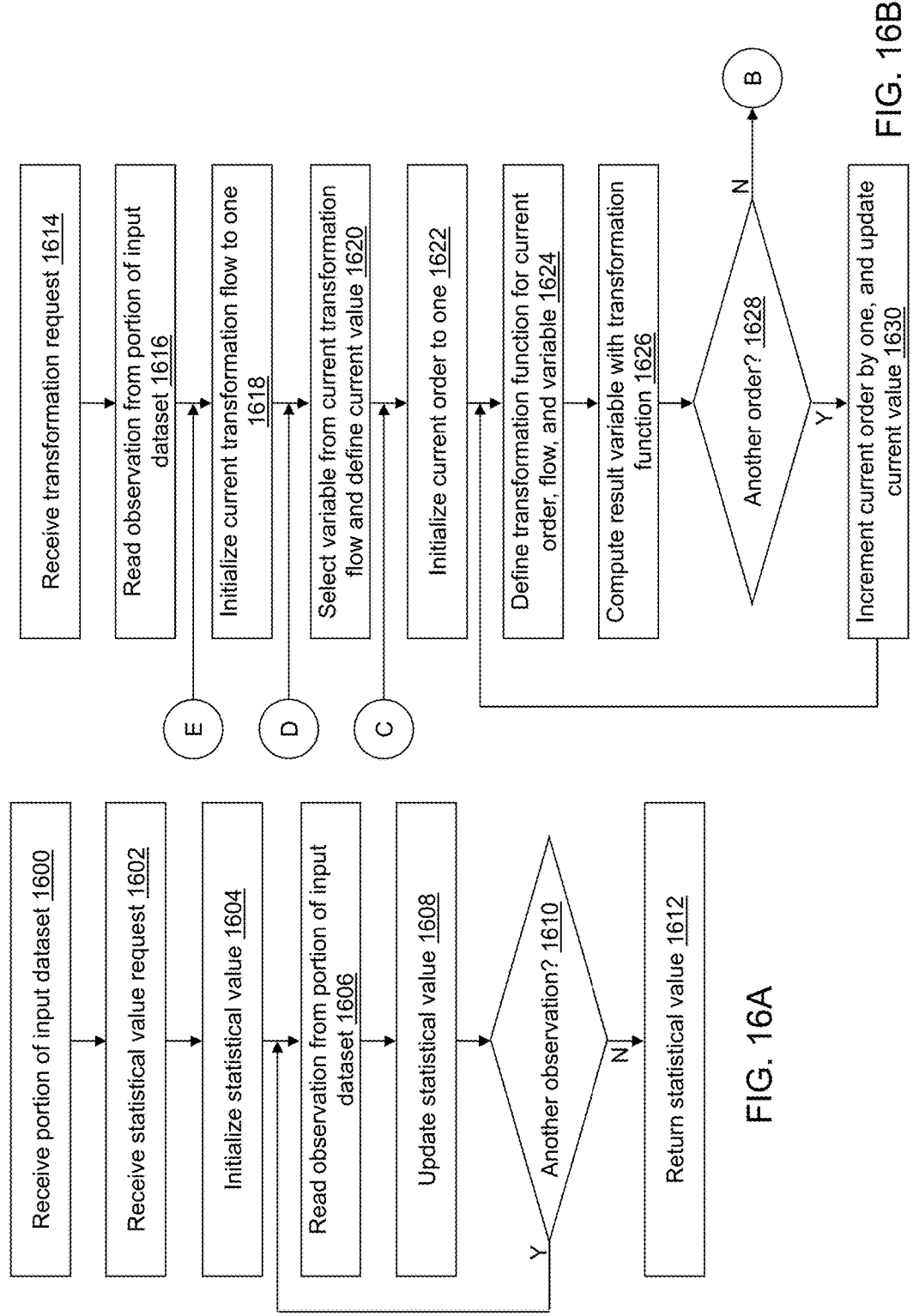

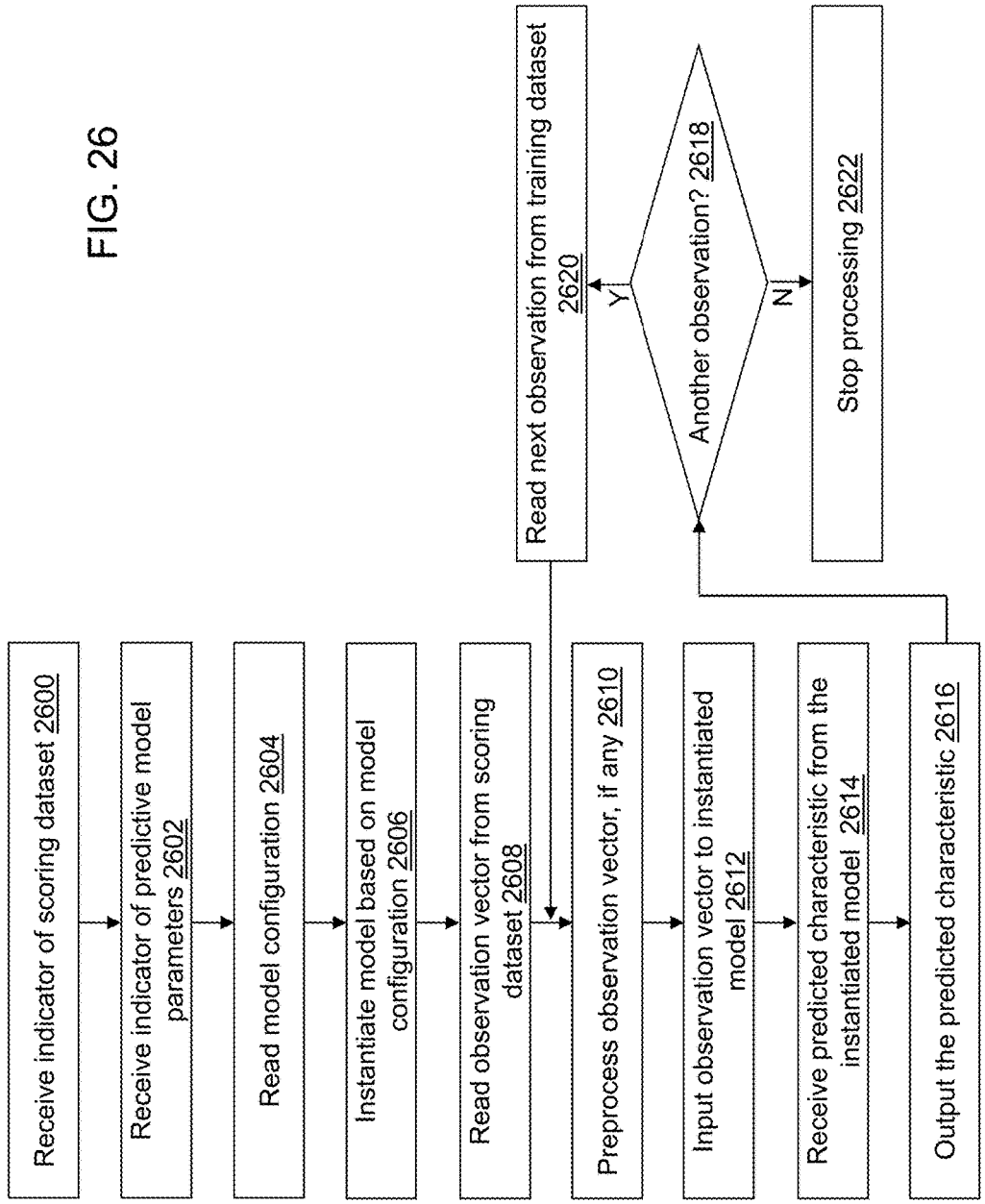

DISTRIBUTED DATA TRANSFORMATION SYSTEM

CROSS-REFERENCE TO RELATED APPLICATIONS

The present application claims the benefit of 35 U.S.C. § 119(e) to U.S. Provisional Patent Application No. 62/485,247 filed Apr. 13, 2017, the entire contents of which are hereby incorporated by reference.

BACKGROUND

One of the common characteristics of many modern datasets is high dimensionality along with low signal-to-noise ratio due to a potentially large number of irrelevant variables. Quantifying data-quality issues using statistical data quality metrics such as missing rate, cardinality, etc. is the first task in predictive modelling of a dataset. As a result, variable (feature) transformation aimed at increasing model performance is a significant part of a predictive modelling workflow. However, high dimensionality precludes an interactive variable-by-variable analysis and transformation. To handle this issue of scale (high dimensionality), practitioners consider data quality issues iteratively. For example, variables with a high-rate of missing values can be identified and addressed. Variables with a high-skew can then be identified and addressed. However, this approach precludes the effective utilization of prescriptions that can treat multiple data quality problems at the same time. In addition, this approach is prone to significant bias, especially in cases where imputation is applied to variables with high missing rate. Automated data preprocessing with meta-learning machine learning systems is another potential solution to the scale issue. However, current meta-learning systems use dataset features that are based solely on individual data quality metrics, and do not take interactions between data quality metrics into consideration. This approach finds it challenging to retain sufficient information that describes the dataset, which is a critical step for meta-learning based approaches.

SUMMARY

In an example embodiment, a computer-readable medium is provided having stored thereon computer-readable instructions that when executed by a computing device, cause the computing device to provide analysis of distributed data and grouping of variables in support of analytics. A received transformation flow definition indicates one or more flow variables and one or more transformation phases to apply to the one or more flow variables. A statistical computation is defined for each variable of the one or more variables and for each transformation phase of the one or more transformation phases. A phase internal parameter value is computed for each defined statistical computation from a plurality of observation vectors read from an input dataset. Each observation vector of the plurality of observation vectors includes a plurality of values. Each value of the plurality of values is associated with a different variable to define a plurality of variables. Each variable of the one or more variables is associated with one of the defined plurality of variables. (a) an observation vector is read from the input dataset to define a first variable value for each variable of the one or more flow variables. (b) a variable of the one or more flow variables is selected as a current variable. (c) a current value equal to the defined first variable value is defined for the current variable. (d) a first transformation phase of the one or more transformation phases is selected. (e) the computed phase internal parameter value for the current variable and the current transformation phase is selected. (f) a transformation function is defined with the selected phase internal parameter value based on the current transformation phase. (g) a result value is computed by executing the defined transformation function with the defined current value. (h) (e) to (g) are repeated with each remaining transformation phase of the one or more transformation phases as the current transformation phase and with the defined current value equal to the computed result value. (i) the computed result value is output to a transformed input dataset. (j) (c) to (i) are repeated with each remaining variable of the one or more flow variables as the current variable. (a) to (j) are repeated with each remaining observation vector from the input dataset.

In another example embodiment, a system is provided. The system includes, but is not limited to, a processor and a computer-readable medium operably coupled to the processor. The computer-readable medium has instructions stored thereon that, when executed by the processor, cause the system to provide analysis of distributed data and grouping of variables in support of analytics.

In yet another example embodiment, a method of providing analysis of distributed data and grouping of variables in support of analytics is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 15A and 15B depicts a flow diagram illustrating examples of operations performed by the controller device of FIG. 3 in support of data transformation in accordance with an illustrative embodiment.

FIGS. 16A, 16B, and 16C depicts a flow diagram illustrating examples of operations performed by the worker device of FIG. 4 in support of data transformation in accordance with an illustrative embodiment.

FIG. 26 depicts a flow diagram illustrating examples of operations performed by the prediction device of FIG. 25 in accordance with an illustrative embodiment.

DETAILED DESCRIPTION

Figure 1:
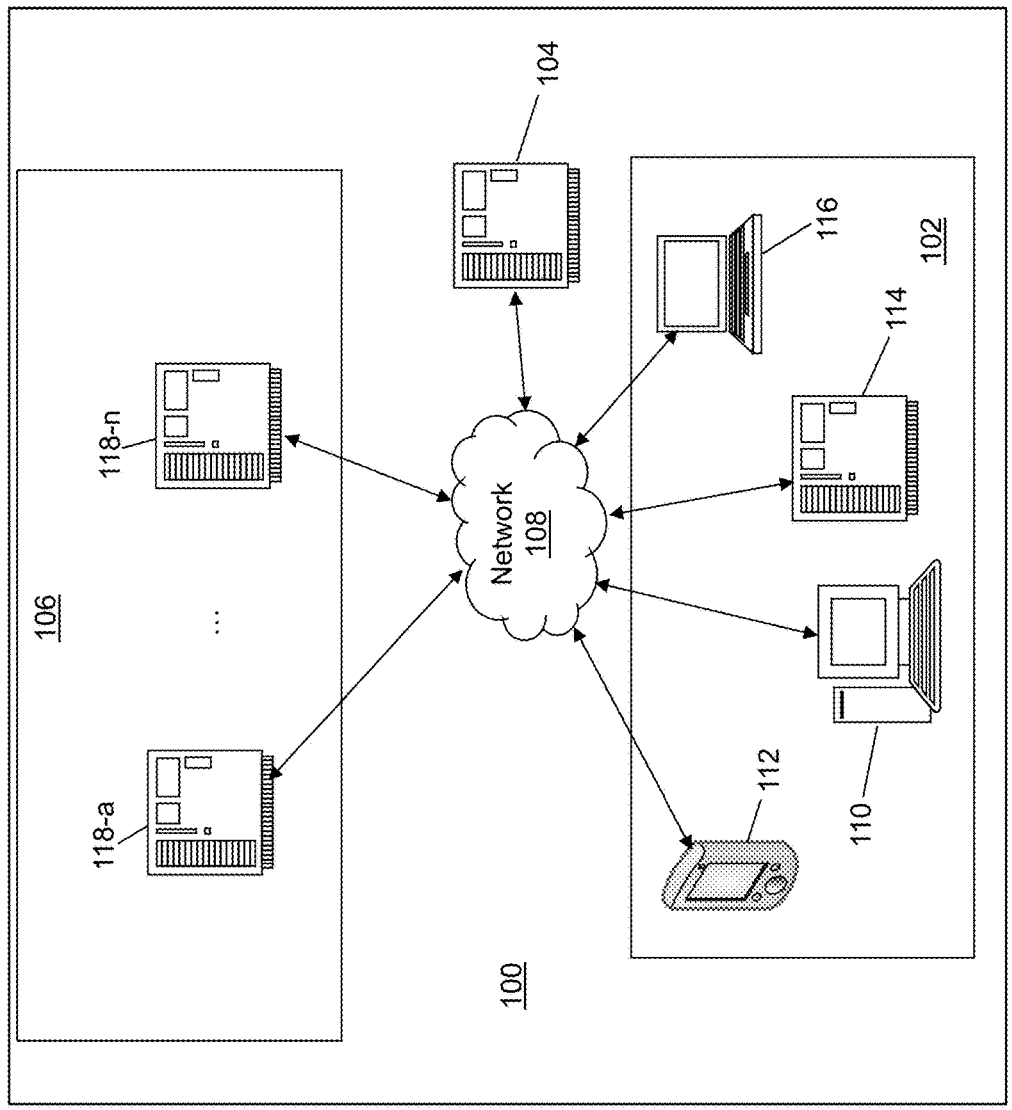
FIG. 1 depicts a block diagram of a data analysis and transformation system in accordance with an illustrative embodiment.

Referring to FIG. 1, a block diagram of a data analysis and transformation system 100 is shown in accordance with an illustrative embodiment. In an illustrative embodiment, data analysis and transformation system 100 may include a user system 102, a controller device 104, a worker system 106, and a network 108. Each of user system 102, controller device 104, and worker system 106 may be composed of one or more discrete computing devices in communication through network 108. User system 102 and controller device 104 may be integrated into a single computing device.

Data analysis and transformation system 100 performs automatic variable analysis and grouping in two data passes of an input dataset. Data analysis and transformation system 100 provides effective visualization of data quality problems in modern datasets that are typically characterized by large dimensions. Data analysis and transformation system 100 further consumes the data analytics to perform a plurality of variable transformation flows simultaneously in a minimum of data passes with a minimum of calculations so that the user can explore multiple options for transforming one or more variables of the input dataset. The resulting transformed dataset that may include multiple data transformations of the same data can be input to a model training system to train one or more models that describe various characteristics of the transformed dataset. The trained model can be applied to new data to predict a characteristic of or to monitor the new data for identification of occurrence of an event.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from controller device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
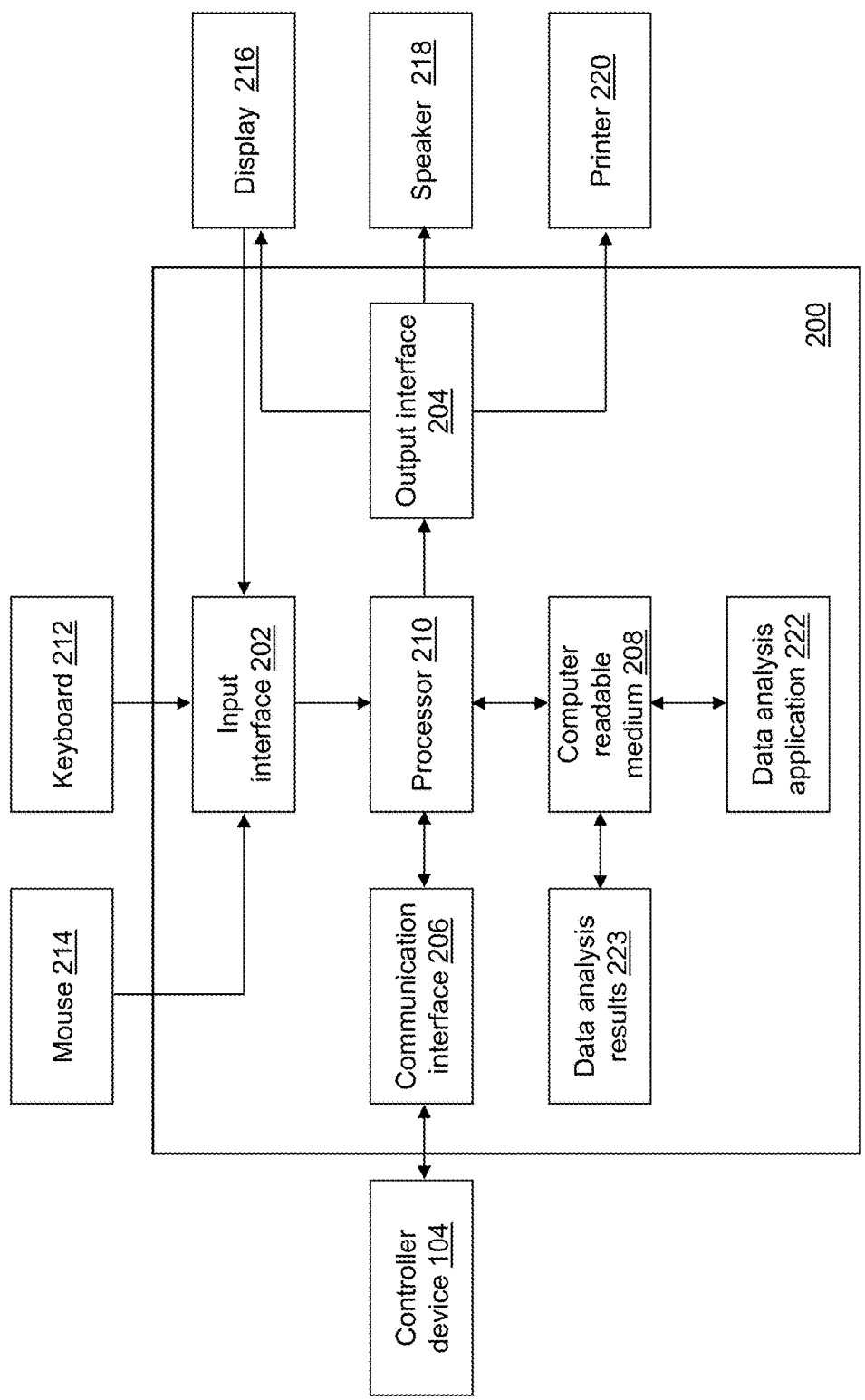
FIG. 2 depicts a block diagram of a user device of the data analysis and transformation system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, a data analysis application 222, and data analysis results 223. Each computing device of user system 102 may be executing data analysis application 222 of the same or different type.

Referring again to FIG. 1, controller device 104 can include any form factor of computing device. For illustration, FIG. 1 represents controller device 104 as a server computer. Controller device 104 may send and receive signals through network 108 to/from user system 102 and/or to/from worker system 106. Controller device 104 may communicate using various transmission media that may be wired and/or wireless as understood by those skilled in the art. Controller device 104 may be implemented on a plurality of computing devices of the same or different type. Data analysis and transformation system 100 further may include a plurality of controller devices that communicate with user system 102 and worker system 106.

Figure 3:
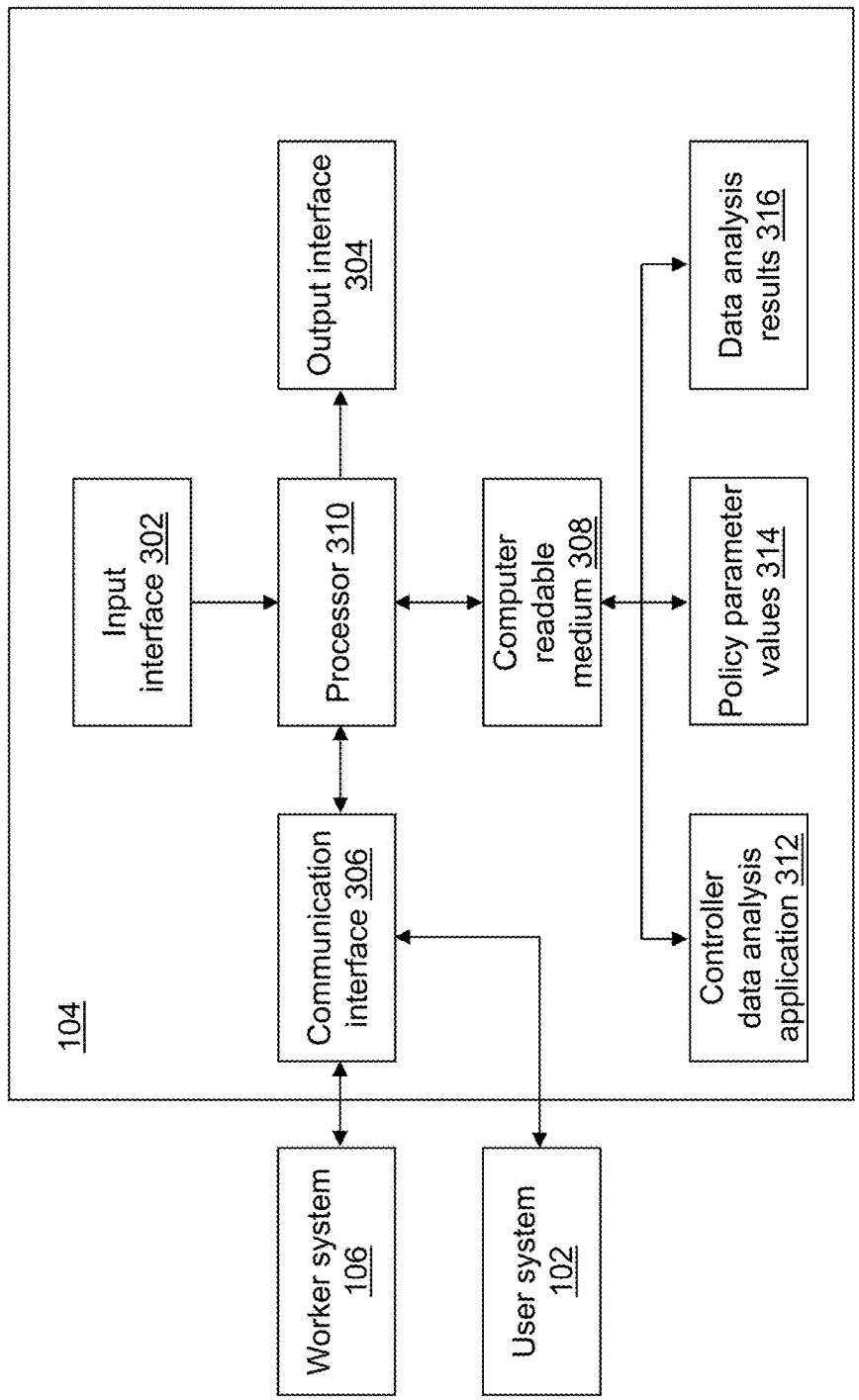
FIG. 3 depicts a block diagram of a controller device of the data analysis and transformation system of FIG. 1 in accordance with an illustrative embodiment.

For illustration, referring to FIG. 3, a block diagram of controller device 104 is shown in accordance with an illustrative embodiment. Controller device 104 may include a second input interface 302, a second output interface 304, a second communication interface 306, a second non-transitory computer-readable medium 308, a second processor 310, a controller data analysis application 312, policy parameter values 314, and data analysis results 316. Controller device 104 may execute controller data analysis application 312 that creates data analysis results 316 based on the input dataset that may be distributed across the computing devices of worker system 106 and on policy parameter values 314 that may be defined by a user of user device 200.

Referring again to FIG. 1, the one or more computing devices of worker system 106 may include computers of any form factor such as a desktop, a server, a laptop, etc. For example, in the illustrative embodiment, worker system 106 includes a first server computer 118-*a*, . . . , and an nth server computer 118-*n*. Each server computer may support use of a plurality of threads. The computing devices of worker system 106 may send and receive signals through network 108 to/from controller device 104 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4:
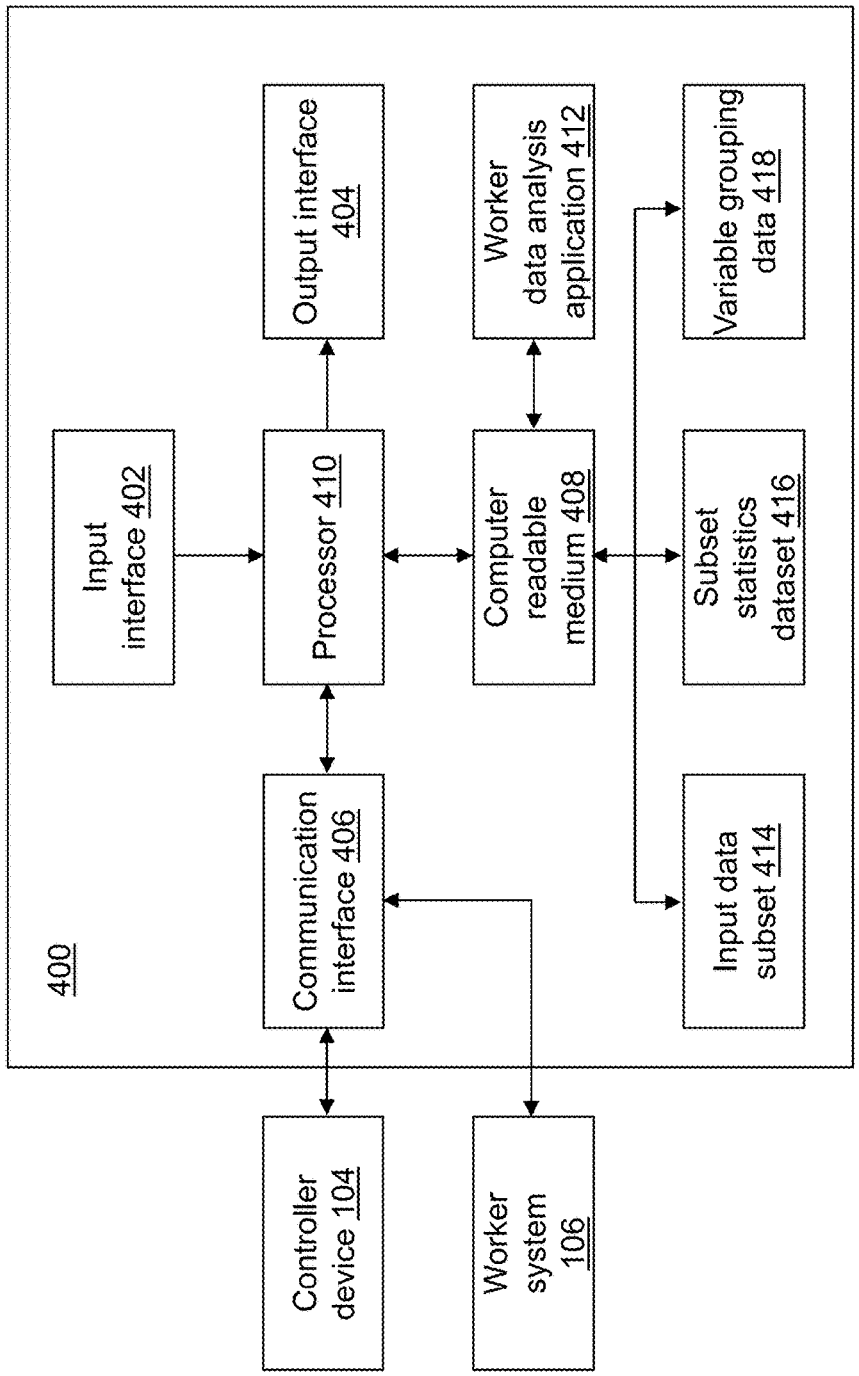
FIG. 4 depicts a block diagram of a worker device of the data analysis and transformation system of FIG. 1 in accordance with an illustrative embodiment.

For illustration, referring to FIG. 4, a block diagram of a worker device 400 is shown in accordance with an example embodiment. Worker device 400 is an example computing device of worker system 106. For example, each of first server computer 118-*a*, . . . , and nth server computer 118-*n* may be an instance of worker device 400. Worker device 400 may include a third input interface 402, a third output interface 404, a third communication interface 406, a third non-transitory computer-readable medium 408, a third processor 410, a worker data analysis application 412, an input data subset 414, a subset statistics dataset 416, and variable grouping data 418.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 includes a touch screen that accepts input from the user and that presents output to the user. User device 200 may have one or more input interfaces that use the same or a different input interface technology. The input interface technology further may be accessible by user device 200 through communication interface 206.

Output interface 204 provides an interface for outputting information for review by a user of user device 200. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and controller device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106 and/or output interface 204.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Data analysis application 222 performs operations associated with requesting analysis of the input dataset so that the user can understand the data stored in the input dataset. The operations may be implemented using hardware, firmware, software, or any combination of these methods. Referring to the example embodiment of FIG. 2, data analysis application 222 is implemented in software (comprised of computer-readable and/or computer-executable instructions) stored in computer-readable medium 208 and accessible by processor 210 for execution of the instructions that embody the operations of data analysis application 222. Data analysis application 222 may be written using one or more programming languages, assembly languages, scripting languages, etc.

Data analysis application 222 may be implemented as a Web application. For example, data analysis application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Data analysis application 222 may be integrated with other analytic tools. As an example, data analysis application 222 may be part of an integrated data analytics software application and/or software architecture such as that offered by SAS Institute Inc. of Cary, N.C., USA. For example, data analysis application 222 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, data analysis application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA. Data mining is applicable in a wide variety of industries.

Referring to FIG. 3, fewer, different, or additional components may be incorporated into controller device 104. Second input interface 302 provides the same or similar functionality as that described with reference to input interface 202 of user device 200 though referring to controller device 104. Second output interface 304 provides the same or similar functionality as that described with reference to output interface 204 of user device 200 though referring to controller device 104. Second communication interface 306 provides the same or similar functionality as that described with reference to communication interface 206 of user device 200 though referring to controller device 104. Data and messages may be transferred between controller device 104 and user device 200 and/or worker device 400 using second communication interface 306. Second computer-readable medium 308 provides the same or similar functionality as that described with reference to computer-readable medium 208 of user device 200 though referring to controller device 104. Second processor 310 provides the same or similar functionality as that described with reference to processor 210 of user device 200 though referring to controller device 104.

Controller data analysis application 312 performs operations associated with performing variable statistical analysis and grouping of the input dataset based on inputs provided from user device 200 using the computing devices of worker system 106. The input dataset may be distributed across the computing devices of worker system 106. The operations may be implemented using hardware, firmware, software, or any combination of these methods. Referring to the example embodiment of FIG. 3, controller data analysis application 312 is implemented in software (comprised of computer-readable and/or computer-executable instructions) stored in second computer-readable medium 308 and accessible by second processor 310 for execution of the instructions that embody the operations of controller data analysis application 312. Controller data analysis application 312 may be written using one or more programming languages, assembly languages, scripting languages, etc. Controller data analysis application 312 may be implemented as a Web application.

Controller data analysis application 312 may be integrated with other analytic tools. As an example, controller data analysis application 312 may be part of an integrated data analytics software application and/or software architecture such as that offered by SAS Institute Inc. of Cary, N.C., USA. For example, controller data analysis application 312 may be part of SAS® Enterprise Miner™ developed and provided by SAS Institute Inc. of Cary, N.C., USA. Merely for further illustration, controller data analysis application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Referring to FIG. 4, fewer, different, and additional components may be incorporated into worker device 400. Each worker device 400 of worker system 106 may include the same or different components or combination of components.

Third input interface 402 provides the same or similar functionality as that described with reference to input interface 202 of user device 200 though referring to worker device 400. Third output interface 404 provides the same or similar functionality as that described with reference to output interface 204 of user device 200 though referring to worker device 400. Third communication interface 406 provides the same or similar functionality as that described with reference to communication interface 206 of user device 200 though referring to worker device 400. Data and messages may be transferred between worker device 400 and another computing device of worker system 106 and/or controller device 104 using third communication interface 406. Third computer-readable medium 408 provides the same or similar functionality as that described with reference to computer-readable medium 208 of user device 200 though referring to worker device 400. Third processor 410 provides the same or similar functionality as that described with reference to processor 210 of user device 200 though referring to worker device 400.

Worker data analysis application 412 performs variable statistical analysis and grouping of input data subset 414 based on inputs from controller device 104 to define subset statistics dataset 416 and variable grouping data 418 that is returned, or otherwise made available, to controller device 104. Worker data analysis application 412 may be integrated with other analytic tools. As an example, worker data analysis application 412 may be part of an integrated data analytics software application and/or software architecture such as that offered by SAS Institute Inc. of Cary, N.C., USA. For example, worker data analysis application 412 may be part of SAS® Enterprise Miner™ developed and provided by SAS Institute Inc. of Cary, N.C., USA. Merely for further illustration, worker data analysis application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Data analysis application 222, controller data analysis application 312, and worker data analysis application 412 may be the same or different applications that are integrated in various manners to perform variable statistical analysis and grouping of the input dataset distributed across worker system 106. A subset of the input dataset may further may be stored on controller device 104.

The input dataset may include, for example, a plurality of rows and a plurality of columns. The plurality of rows may be referred to as observation vectors or records (observations), and the columns may be referred to as variables (features). The input dataset may be transposed. The input dataset may include supervised (target variable) and/or unsupervised data. The plurality of variables may define multiple dimensions or features for each observation vector. An observation vector $x_i$ may include a value for each of the plurality of variables associated with the observation i. One or more values may be missing from one or more observation vectors and is referred to herein as missing data or missing data values. Each variable of the plurality of variables may describe a characteristic of a physical object. For example, if the input dataset includes data related to operation of a vehicle, the variables may include an oil pressure, a speed, a gear indicator, a gas tank level, a tire pressure for each tire, an engine temperature, a radiator level, etc. The input dataset may include data captured as a function of time for one or more physical objects. As another example, the input dataset may include data related to images, where each row includes the pixels that define a single image. The images may be of any item for which image recognition or classification may be performed including, but not limited to, faces, objects, alphanumeric letters, terrain, plants, animals, etc.

The data stored in the input dataset may be generated by and/or captured from a variety of sources including one or more sensors of the same or different type, one or more computing devices, etc. The data stored in the input dataset may be received directly or indirectly from the source and may or may not be preprocessed in some manner. For example, the data may be preprocessed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

The input dataset may be stored on computer-readable medium 208, on second computer-readable medium 308, and/or on third computer-readable medium 408 of each worker device 400. In an illustrative embodiment, the input dataset may be distributed and loaded on each third computer-readable medium 408 of worker system 106. Data stored in the input dataset may be sensor measurements or signal values captured by a sensor such as a camera, may be generated or captured in response to occurrence of an event or a transaction, generated by a device such as in response to an interaction by a user with the device, etc. The data stored in the input dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the input dataset may be captured at different time points periodically, intermittently, when an event occurs, etc. One or more columns of the input dataset may include a time and/or date value.

The input dataset may include data captured under normal operating conditions of a physical object. The input dataset may include data captured at a high data rate such as 200 or more observations per second for one or more physical objects. For example, data stored in the input dataset may be generated as part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things before being stored in the input dataset. For example, the IoT can include sensors in many different devices and types of devices, and high value analytics can be applied to identify hidden relationships and to drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in the input dataset.

The input dataset may be stored using various structures as known to those skilled in the art including one or more files of a file system, a relational database, one or more tables of a system of tables, a structured query language database, etc. Controller device 104 may coordinate access to the input dataset that is distributed across worker system 106. For example, the input dataset may be stored in a cube distributed across worker system 106 that forms a grid of computers as understood by a person of skill in the art. As another example, the input dataset may be stored in a multi-node Hadoop® cluster. For instance, Apache™ Hadoop® is an open-source software framework for distributed computing supported by the Apache Software Foundation. As another example, the input dataset may be stored in worker system 106 that forms a cloud of computers and is accessed using cloud computing technologies, as understood by a person of skill in the art. The SAS® LASR™ Analytic Server may be used as an analytic platform to enable multiple users to concurrently access data stored in the input dataset. The SAS® Viya™ open, cloud-ready, in-memory architecture also may be used as an analytic platform to enable multiple users to concurrently access data stored in the input dataset. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
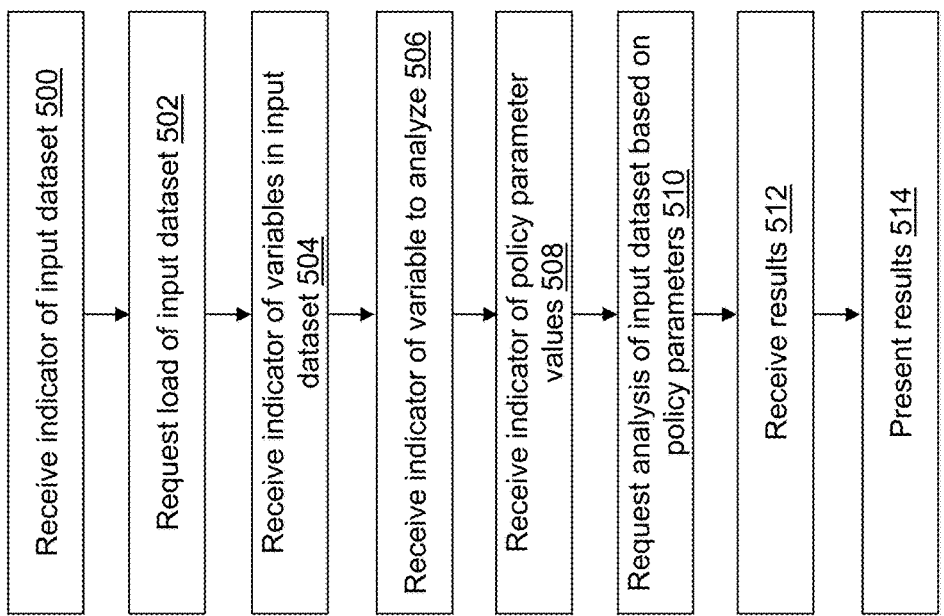
FIG. 5 depicts a flow diagram illustrating examples of operations performed by the user device of FIG. 2 in support of data analysis and grouping in accordance with an illustrative embodiment.

Referring to FIG. 5, example operations associated with data analysis application 222 are described. Additional, fewer, or different operations may be performed depending on the embodiment. The order of presentation of the operations of FIG. 5 is not intended to be limiting. A user can interact with one or more user interface windows presented to the user in a display under control of data analysis application 222 independently or through a browser application in an order selectable by the user. Although some of the operational flows are presented in sequence, the various operations may be performed in various repetitions, concurrently, and/or in other orders than those that are illustrated. For example, a user may execute data analysis application 222, which causes presentation of a first user interface window, which may include a plurality of menus and selectors such as drop down menus, buttons, text boxes, hyperlinks, etc. associated with data analysis application 222 as understood by a person of skill in the art. As further understood by a person of skill in the art, various operations may be performed in parallel, for example, using a plurality of threads.

A session may be established with controller device 104. A "session" includes user device 200, controller device 104 that is a controller node, and a plurality of worker devices of worker system 106. User device 200 accepts commands from a user and relays instructions to controller device 104. Controller device 104 establishes a communication network with the worker devices of worker system 106, sending instructions to the worker devices of worker system 106, collecting and aggregating the results of computations from the worker devices of worker system 106, and communicating final results to user device 200. Controller device 104 may utilize itself as a worker device. The worker devices of worker system 106 receive instructions from controller device 104, store and process data, and send the results of computations back to controller device 104. Worker devices of worker system 106 may also communicate with each other directly to accomplish a task.

In an operation 500, a first indicator may be received that indicates the input dataset. For example, the first indicator indicates a location and/or a name of the input dataset. As an example, the first indicator may be received by data analysis application 222 after selection from a user interface window or after entry by a user into a user interface window. In an alternative embodiment, the input dataset may not be selectable. For example, a most recently created dataset may be used automatically.

In an operation 502, a load of the input dataset may be requested. For example, user device 200 may request that the input dataset be loaded into a table that is ready for processing. In an alternative embodiment, the input dataset may already be ready for processing.

In an operation 504, a second indicator of the plurality of variables included in the input dataset may be received in a response to the request to load the input dataset. For example, a list of variable names in the order they are read from a first row of the input dataset may be received. In an alternative embodiment, the second indicator may not be received. Instead, the user may already know the plurality of variables included in the input dataset or may obtain the list using another method.

In an operation 506, a third indicator may be received that indicates a plurality of variables $v_i$ of the input dataset to analyze for each observation vector $x_i$ read from a row of the input dataset. For example, the third indicator indicates a list of input variables to analyze by name, column number, etc. The name may be matched to a column header included in the first row of the input dataset. Other variables may not be analyzed. In an alternative embodiment, the third indicator may not be received. For example, all of the variables may be analyzed automatically.

In an operation 508, a fourth indicator may be received that indicates a plurality of policy parameter values. The plurality of policy parameter values is used to define how the plurality of variables $v_i$ are grouped. Each policy parameter value of the plurality of policy parameter values may have a predefined default value that may be used when a user does not specify a value for the policy parameter using the fourth indicator. Each policy parameter value may be received using a separate indicator. For illustration, Table I below includes the plurality of policy parameter values in accordance with an example embodiment:

TABLE I

| Policy parameter name | Test | Default value |
|---|---|---|
| Very high-cardinality (high-C) threshold | ≥ | 5000 |
| Cardinality ratio threshold for nominal | > | 0.25 |
| Non-integral values are interval flag | = | True |
| Negative values are interval flag | = | True |
| Missing rate high threshold (%) | ≥ | 50 |
| Missing rate medium threshold (%) | ≥ | 5 |
| Missing rate low threshold (%) | < | 5 |
| Nominal cardinality high threshold | ≥ | 100 |
| Nominal cardinality medium threshold | ≥ | 25 |
| Nominal cardinality low threshold | < | 25 |
| Nominal entropy high threshold (either Shannon entropy or Gini index) | ≥ | 0.5, 0.5 |
| Nominal entropy medium threshold (either Shannon entropy or Gini index) | ≥ | 0.1, 0.1 |
| Nominal entropy low threshold (both Shannon entropy and Gini index) | < | 0.1, 0.1 |
| Nominal frequency skewness high threshold (Top1/Bot1 or Top1/Top2 or variation ratio) | ≥ | 100, 25, 0.7 |
| Nominal frequency skewness medium threshold (Top1/Bot1 or Top1/Top2 or variation ratio) | ≥ | 1, 1, 0.5 |
| Nominal frequency skewness low threshold (Top1/Bot1 and Top1/Top2 or variation ratio) | < | 1, 1, 0.5 |
| Interval skew high threshold (classical or average quantile) | > | 10, 0.75 |

TABLE I-continued

| Policy parameter name | Test | Default value |
|---|---|---|
| Interval skew medium threshold (classical or average quantile) | > | 2, 0.1 |
| Interval skew low threshold (classical and average quantile) | < | 2, 0.1 |
| Interval kurtosis high threshold (classical or average quantile) | > | 10, 3 |
| Interval kurtosis medium threshold (classical or average quantile) | > | 5, 2.75 |
| Interval kurtosis low threshold (classical and average quantile) | < | 5, 2.75 |
| Interval outlier high threshold (%) | ≥ | 5 |
| Interval outlier medium threshold (%) | ≥ | 1 |
| Interval outlier rate low threshold (%) | < | 1 |
| Number of register bits | Not applicable | 10 |
| List of required nominal variables | Not applicable | User selected |
| List of required interval variables | Not applicable | User selected |
| Non-integral values interval | = | True |
| Negative values interval | = | True |

Figure 8A:
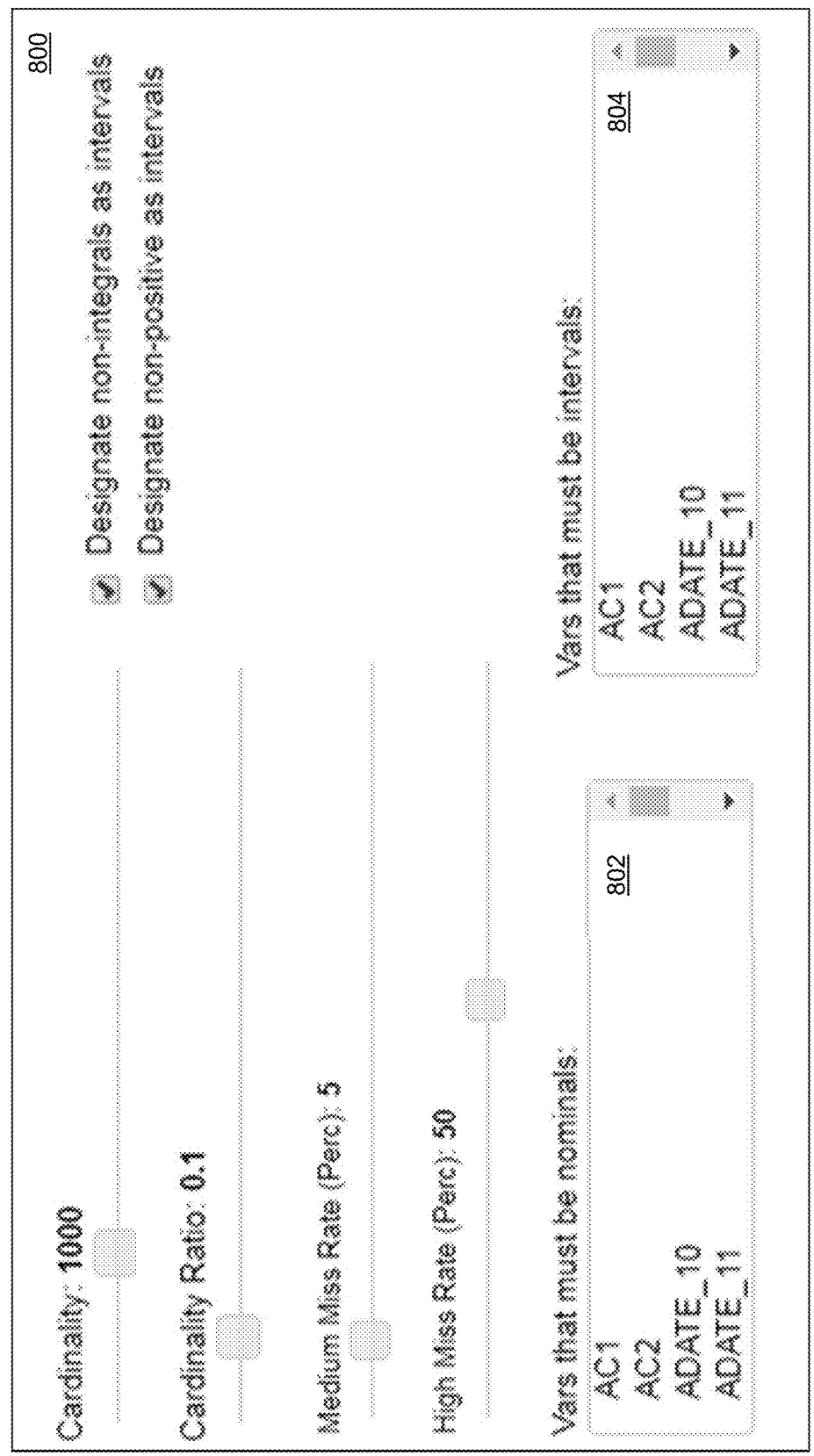
FIGS. 8A to 8C depict user interface options provided by the user device of FIG. 2 in accordance with an illustrative embodiment.
Figure 8B:
Figure 8C:
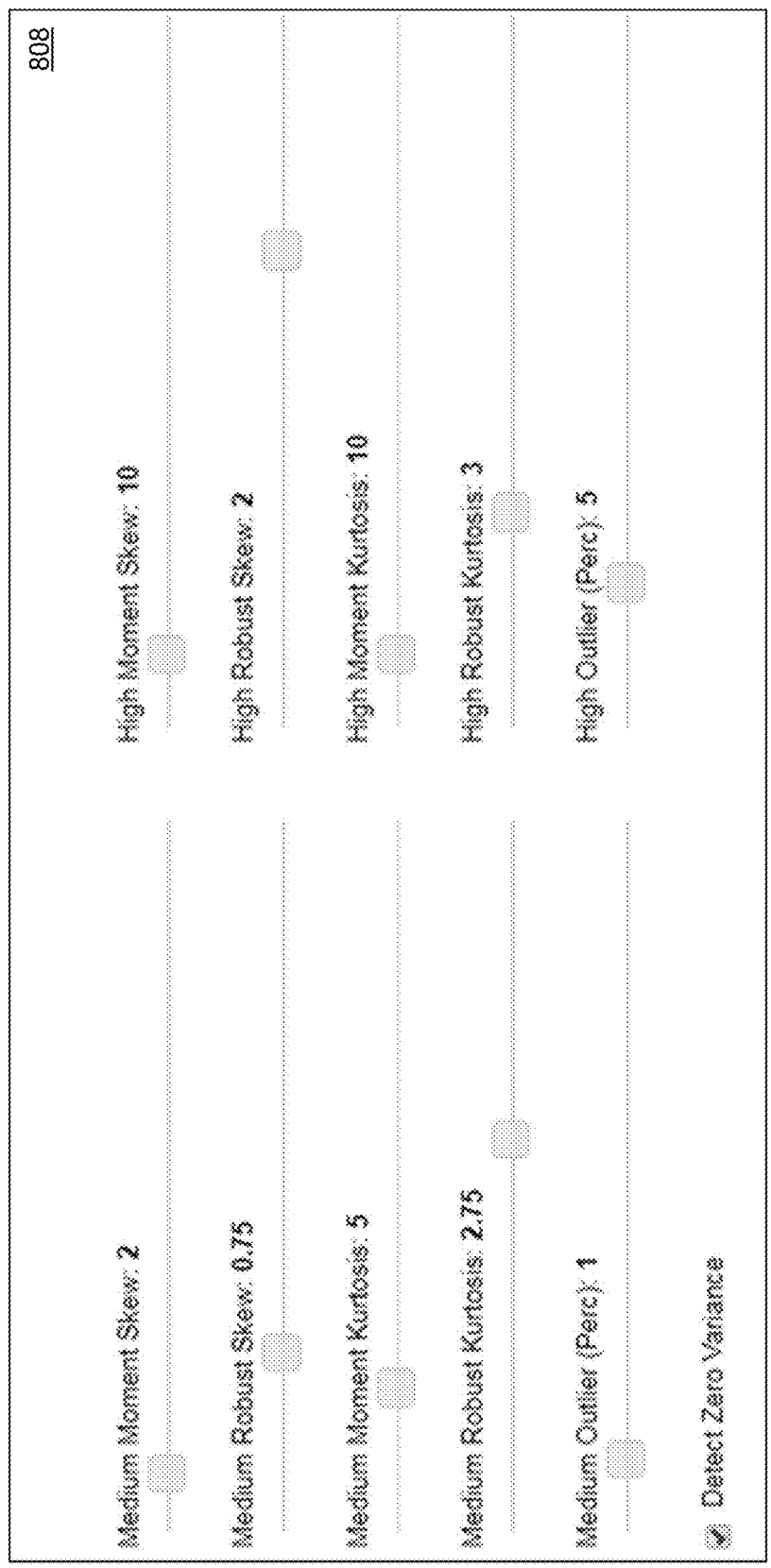

Referring to FIGS. 8A to 8C, user interface options provided by data analysis application 222 to allow the user to select the plurality of policy parameter values are shown in accordance with an illustrative embodiment. For example, FIG. 8A shows a first user interface window 800 that allows the user to select a value for the very high-cardinality (high-C) threshold, a value for the cardinality ratio threshold for a variable to define the variable as a nominal variable, a checkbox to define variables with non-integral values as interval variables, a checkbox to define variables with negative values as interval variables, a value for the medium missing rate threshold, and a value for the high missing rate threshold. First user interface window 800 also includes a nominal variable list box 802 and an interval variable list box 804. Required nominal variable list box 802 includes a list of each variable by name included in the input dataset or included in the plurality of variables $v_i$ of the input dataset to analyze and defined in operation 506. The user may select zero or more variables that are defined as the list of required nominal variables regardless of any comparison with the defined thresholds. Required interval variable list box 804 includes a list of each variable by name included in the input dataset or included in the plurality of variables $v_i$ of the input dataset to analyze and defined in operation 506. The user may select zero or more variables that are defined as the list of required interval variables regardless of any comparison with the defined thresholds.

FIG. 8B shows a second user interface window 806 that allows the user to select a value for the nominal cardinality medium threshold, a value for the nominal cardinality high threshold, a value for the nominal entropy medium threshold, a value for the nominal entropy high threshold, a value for the nominal variation ratio high threshold, a value for the nominal variation ratio medium threshold, a value for the nominal variation ratio low threshold, a value for the nominal frequency ratio medium threshold Top1/Top2, a value for the nominal frequency ratio high threshold Top1/Top2, a value for the nominal frequency ratio medium threshold Top1/Bot1, and a value for the nominal frequency ratio high threshold Top1/Bot1.

FIG. 8C shows a third user interface window 808 that allows the user to select a value for the interval classical skew medium threshold, a value for the interval classical skew high threshold, a value for the interval robust skew medium threshold, a value for the interval robust skew high threshold, a value for the interval classical kurtosis medium threshold, a value for the interval classical kurtosis high threshold, a value for the interval robust kurtosis medium threshold, a value for the interval robust kurtosis high threshold, a value for the interval outlier percentage threshold medium, and a value for the interval outlier percentage threshold high. A checkbox may indicate whether or not to detect a variable that has a variance value of zero.

The user interface options may initially be presented with the default values. In some cases, a low value for a policy parameter may not be specified because it is identified as any variable value that is not "high" or "medium". In an alternative embodiment, a high value for a policy parameter may not be specified because it is identified as any variable value that is not "low" or "medium". Though a hierarchy of low, medium, and high is used to group variables, a fewer or a greater number of hierarchy levels may be specified to further categorize variables.

Referring again to FIG. 5, in an operation 510, a request to analyze the input dataset based on the plurality of policy parameter values is sent to controller device 104. For example, the user may select a button to indicate that the plurality of policy parameter values has been selected and that analysis of the input dataset should be performed. The plurality of policy parameter values may be sent in a message or other instruction to controller device 104 or may be provided in a known memory location to controller device 104. In an alternative embodiment, user device 200 and controller device 104 may be integrated in the same computing device so that when the plurality of policy parameter values is received by user device 200, it is also received by controller device 104.

In an operation 512, data analysis results are received. For example, variable statistical metrics and variable grouping data may be received from controller device 104 and stored in data analysis results 223 on computer-readable medium 208. The variable statistical metrics and variable grouping data may be received from controller device 104. As another example, an indicator may be received that indicates that the analysis process is complete and data analysis results 223 may already contain the variable statistical metrics and variable grouping data. For example, one or more output tables may be presented on display 216 when the analysis process is complete. As another option, display 216 may present a statement indicating that the analysis process is complete. The user can access the variable statistical metrics and variable grouping data in a predefined location or a user defined location of data analysis results 223.

Figure 9:
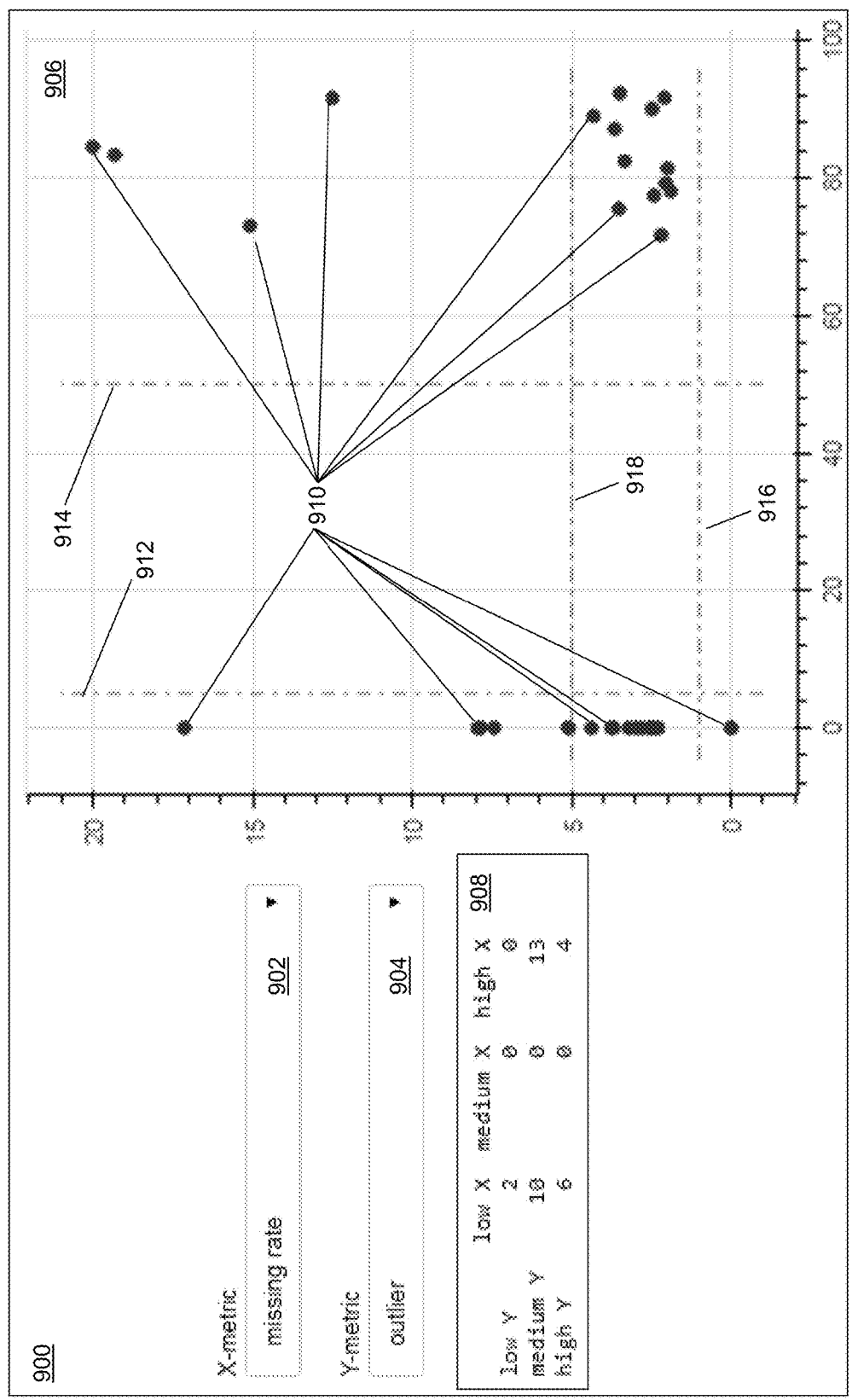
FIG. 9 depicts data analysis results presented by the user device of FIG. 2 in accordance with an illustrative embodiment.

In an operation 514, one or more results may be presented on display 216. For example, the user may select a pair of policy parameter metrics to compare. For illustration, FIG. 9 shows a fourth user interface window 900 that allows the user to select a first policy parameter using an x-axis selector 902 to plot on an x-axis of a graph 906 and a second policy parameter using a y-axis selector 904 to plot on a y-axis of graph 906. For the input dataset used to create the results shown in FIG. 9, controller data analysis application 312 identified 35 interval variables with the remaining 444 variables identified as nominal variables. Whether interval or nominal variable groups are shown is based on the policy parameter selections using x-axis selector 902 and y-axis selector 904. A table 908 summarizes a number of variables in each hierarchical group based on the designation of high, medium, and low for the selected x- and y-metrics though again a different number of hierarchical groups may be defined. Each circle 910 shown in the scatterplot of graph 906 represents a pair of computed values for the selected policy parameter metrics selected using x-axis selector 902 and y-axis selector 904 for a variable of the plurality of variables included in the input dataset. A first vertical line 912 indicates the threshold between low and medium values for the x-axis metric. A second vertical line 914 indicates the threshold between medium and high values for the x-axis metric. A first horizontal line 916 indicates the threshold between low and medium values for the y-axis metric. A second horizontal line 918 indicates the threshold between medium and high values for the y-axis metric.

Figure 10:
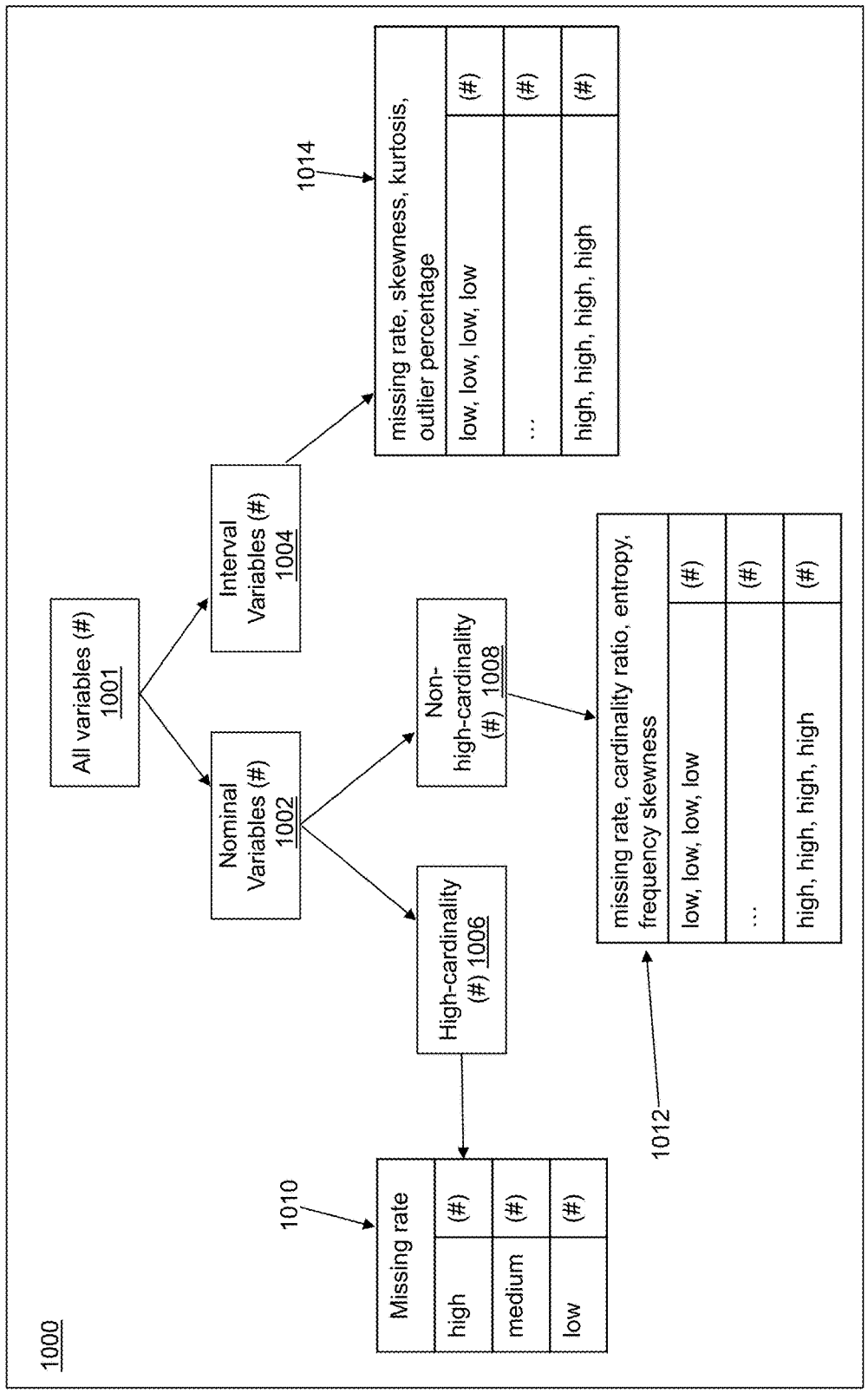
FIG. 10 illustrates a variable grouping result tree determined by the data analysis and transformation system of FIG. 1 in accordance with an illustrative embodiment.

For illustration, FIG. 10 shows a tree schematic 1000 that can be presented on display 216 to summarize the groupings of the plurality of variables $v_i$, where (#) is filled in with a number of variables that satisfy the specified grouping criteria. For example, a root node 1001 of tree schematic 1000 indicates a number of the plurality of variables $v_i$. A nominal variable type node 1002 indicates a number of the plurality of variables $v_i$ identified as a nominal variable based on the plurality of policy parameter values. An interval variable type node 1004 indicates a number of the plurality of variables $v_i$ identified as an interval variable based on the plurality of policy parameter values. A high-cardinality variable type node 1006 indicates a subset of the nominal variables identified as having a high-cardinality based on the plurality of policy parameter values. A non-high-cardinality variable type node 1008 indicates a subset of the nominal variables identified as not having a high-cardinality based on the plurality of policy parameter values.

A high-cardinality variable type table node 1010 summarizes the subset of the high-cardinality variables identified as having a high, a medium, and a low missing rate based on the plurality of policy parameter values. A non-high-cardinality variable type table node 1012 summarizes the subset of the nominal variables identified as not having high-cardinality. Each row of non-high-cardinality variable type table node 1012 defines the number of variables having the associated combination of high, medium, and low missing rate, cardinality, entropy, and frequency skewness based on the plurality of policy parameter values. An interval variable type table node 1014 summarizes a number of the subset of the interval variables identified as having the associated combination of high, medium, and low missing rate, skewness, kurtosis, and outlier percentage based on the plurality of policy parameter values.

Figure 6:
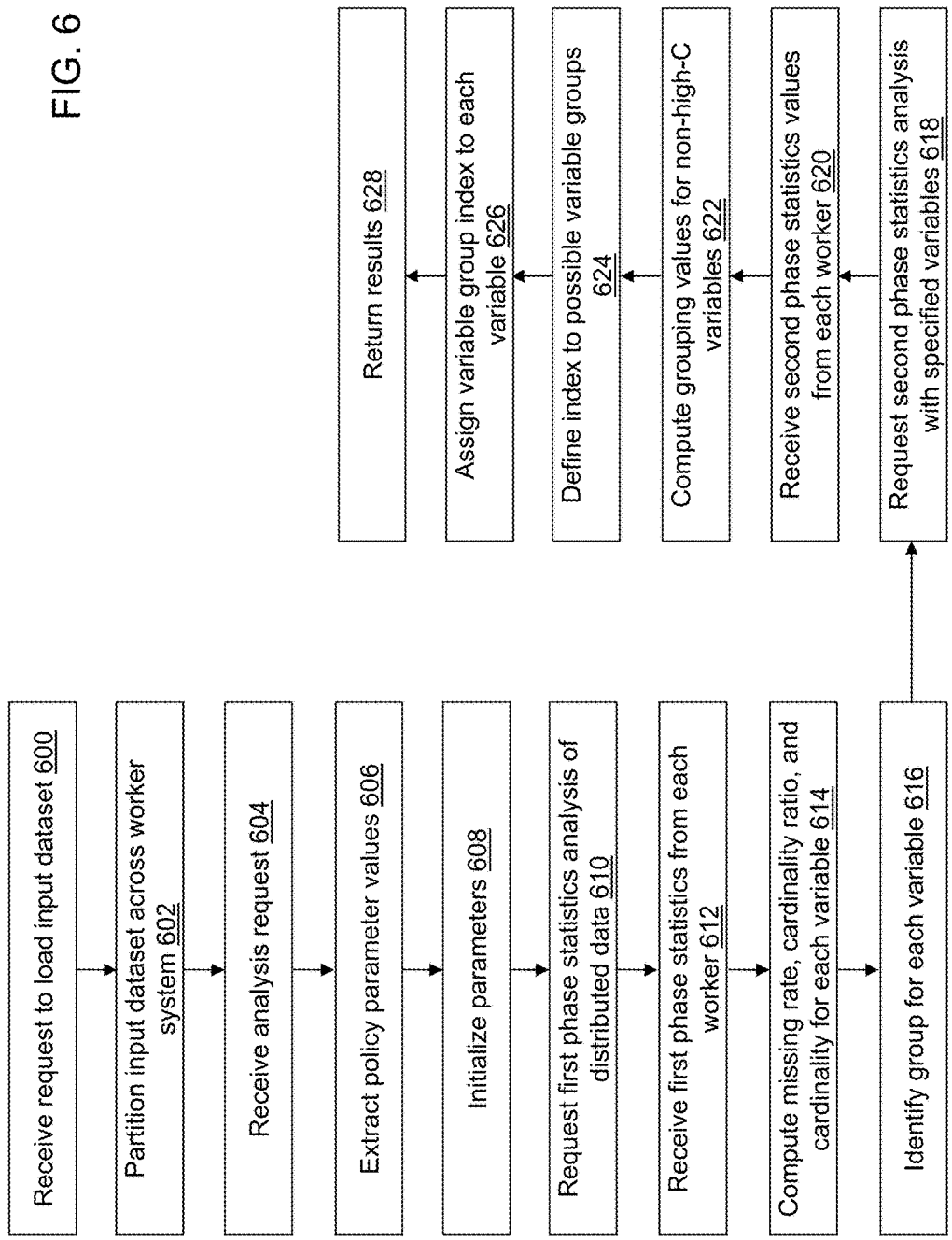
FIG. 6 depicts a flow diagram illustrating examples of operations performed by the controller device of FIG. 3 in support of data analysis and grouping in accordance with an illustrative embodiment.

Referring to FIG. 6, example operations associated with controller data analysis application 312 are described. Additional, fewer, or different operations may be performed depending on the embodiment. The order of presentation of the operations of FIG. 6 is not intended to be limiting. Again, controller data analysis application 312 and data analysis application 222 may be integrated or be the same applications so that the operations of FIGS. 5 and 6 are merged.

In an operation 600, the request to load the input dataset selected by the user is received, if the input dataset is not already loaded.

In an operation 602, the input dataset is partitioned across each worker device 400 of worker system 106. After distributing the input dataset, input data subset 414 is stored in computer-readable medium 408 of each worker device 400. In an alternative embodiment, the input dataset may already be loaded and distributed across each worker device 400.

In an operation 604, the analysis request may be received from user device 200 or directly from the user of user device 200 when integrated.

In an operation 606, the plurality of policy parameter values is extracted from the analysis request. In an alternative embodiment, the request may include a reference to a location that is storing the values. In another alternative embodiment, the plurality of policy parameter values may be read from a known storage location.

In an operation 608, parameters are initialized. For example, controller register banks (hash tables) for each variable of the plurality of variables $v_i$ are initialized to zero. The number of register bits policy parameter value may be used to define a size of the controller register banks according to the algorithm described in Stefan Heule et al., *HyperLogLog in Practice: Algorithmic Engineering of a State of the Art Cardinality Estimation Algorithm*, Proceedings of the 16th International Conference on Extending Database Technology, ACM, Mar. 18, 2013, at 683 (*HyperLogLog++*). The *HyperLogLog++* algorithm is a scalable, one-pass, approximate cardinality estimator used to estimate the cardinality and cardinality ratio statistics for each variable of the plurality of variables $v_i$. Because users may include an analysis of all variables in the input dataset, where there may be a large number of variables, a scalable execution of a first phase to estimate cardinality is dependent on a scalability of the technique used, which excludes exact distinct count techniques that require an O(n) memory footprint that cannot be applied to many modern datasets. This is especially true when the input dataset is a dataset with which the user is not familiar and has little, or no expert guidance on which variables can safely be excluded from the predictive modelling workflow.

In an operation 610, computation of first phase statistics analysis of the input dataset distributed to worker system 106 may be requested of each worker device 400 of worker system 106. The first phase is used to classify each variable of the plurality of variables $v_i$ into nominal and interval variables and to split the nominal variables into two groups. The first group has a very high cardinality based on exceeding the very high-cardinality threshold policy parameter value. The second group includes the nominal variables that do not exceed the very high-cardinality threshold policy parameter value. The request may include the number of register bits policy parameter value or each worker device 400 may have access to the value for its computations.

In an operation 612, the first phase statistics analysis values may be received from each worker device 400 of worker system 106. For example, the register banks computed by each worker device 400 of worker system 106 for each variable of the plurality of variables $v_i$ may be received. Additionally, statistics such as a number of observations and a missing count value for each variable of the plurality of variables $v_i$ may be received. The first phase statistics analysis values may be sent in a message or other instruction to controller device 104, may be provided in a known memory location to controller device 104, returned in a call to controller device 104, etc.

In an operation 614, an estimated cardinality value $C_e$ is computed from the received first phase statistics analysis values from each worker device 400 for each variable of the plurality of variables $v_i$. For example, the register banks from each worker device 400 of worker system 106 are processed iteratively to update controller register banks according to the HyperLogLog++ algorithm. A missing rate value $M_r$ also may be computed for each variable of the plurality of variables $v_i$ by dividing a received missing count value from each worker device 400 by the received number of observations from each worker device 400 of the associated variable of the plurality of variables $v_i$ such that $M_r = M/N$, where N is the received number of observations and M is the received missing count value. A cardinality ratio value $C_r$ also may be computed for each variable of the plurality of variables $v_i$ by dividing a computed cardinality value by the received number of observations minus the received missing count value of the associated variable of the plurality of variables $v_i$ such that $C_r=C_e/(N-M)$.

Variables in a dataset are primarily either of numeric type or of non-numeric type. While non-numeric variables are always nominals, numeric variables can be either nominal or interval. For most practical predictive algorithms, the interval and nominal measurement scales are the most important with others such as ordinal being subsumed by either scale.

In an operation 616, each variable of the plurality of variables $v_i$ is determined to be an interval variable, a high-cardinality nominal variable, or a non-high-cardinality nominal variable automatically based on the plurality of policy parameter values. For example, any variable included in the required nominal variable list is identified and grouped (typed) as a nominal variable, and any variable included in the required interval variable list is identified and grouped as an interval variable. Of the remaining non-grouped variables, variables that have non-integral values or negative values are identified and grouped as interval variables when the non-integral values interval policy parameter value or the negative values interval policy parameter value, respectively, are true.

Of the remaining non-grouped variables, the cardinality ratio value $C_r$ computed for each variable is compared to the cardinality ratio threshold for nominal. Variables for which the cardinality ratio value $C_r$ greater than the cardinality ratio threshold for nominal specified by the plurality of policy parameter values are identified and grouped (typed) as a nominal variable.

For the variables identified as nominal variables, the cardinality value computed for the associated variable is compared to the very high-cardinality threshold policy parameter value. Those nominal variables with cardinality values greater than the very high-cardinality threshold policy parameter value are identified and grouped as high-cardinality nominal variables. The remaining nominal variables are identified and grouped as non-high-cardinality nominal variables.

For the variables identified as nominal variables, the cardinality value computed for the associated variable is compared to the very high-cardinality threshold policy parameter value. Those nominal variables with cardinality values greater than the very high-cardinality threshold policy parameter value are identified and grouped as high-cardinality nominal variables. The remaining nominal variables are identified and grouped as non-high-cardinality nominal variables.

For the high-cardinality nominal variables, the missing rate value $M_r$ is compared to the missing rate high threshold $M_H$, the missing rate medium threshold $M_M$, and the missing rate low threshold $M_L$. The high-cardinality nominal variables with $M_r \geq M_H$ are identified and grouped as high-cardinality nominal variables with a high missing rate. The high-cardinality nominal variables with $M_r \geq M_M$ are identified and grouped as high-cardinality nominal variables with a medium missing rate. The high-cardinality nominal variables with $M_r < M_L$ are identified and grouped as high-cardinality nominal variables with a low missing rate.

As a result, after the first phase, each variable of the plurality of variables $v_i$ is assigned to one of interval variable type node 1004, nominal high-cardinality variable type node 1006, or nominal non-high-cardinality variable type node 1008. Each high-cardinality nominal variable has also been assigned to a level of nominal, high-cardinality variable type table node 1010 based on the plurality of policy parameter values.

In an operation 618, computation of second phase statistics analysis of the input dataset distributed to worker system 106 may be requested of each worker device 400 of worker system 106. The second phase is used to further classify each nominal non-high-cardinality variable into a combination of high, medium, or low missing rate, cardinality, entropy, and frequency skewness based on the plurality of policy parameter values. The second phase is also used to further classify each interval variable into a combination of high, medium, or low missing rate, skewness, kurtosis, and outlier percentage based on the plurality of policy parameter values. The request may include a nominal list of the non-high-cardinality nominal variables and an interval list of the interval variables or each worker device 400 may have access to the lists for its computations. The high-cardinality nominal variables are excluded from the second phase analysis, which provides scalability so that computation of the entropy and frequency skewness are not slowed down by the high-cardinality nominal variables. Furthermore, the cardinality and missing rate values are sufficient to characterize high-cardinality nominal variables because these variables are commonly transformed into interval scale for downstream analytics.

In an operation 620, second phase statistics values may be received from each worker device 400 of worker system 106 for each variable in the nominal list and each variable in the interval list. For example, the second phase statistics values include values for the parameters below used to compute the grouping values for each variable. The second phase statistics values may be sent in a message or other instruction to controller device 104, may be provided in a known memory location to controller device 104, returned in a call to controller device 104, etc.

In an operation 622, the grouping values for each variable in the nominal list and each variable in the interval list are computed from the received second phase statistics values for each non-high-cardinality variable and for each interval variable of the plurality of variables $v_i$. The missing rate value M and the cardinality ratio value $C_r$ were computed in operation 614.

For example, the Shannon entropy $E_S$ may be computed for each non-high-cardinality nominal variable using $$E_S = \frac{-\sum_{i=1}^{N_N} p_i \log_2^{p_i}}{\log_2^C}, \text{ where } p_i = \frac{f_i}{N_N},$$

where $f_i$ is a number of times a unique value for the variable occurred, $N_N$ is a number of observations of the variable, and C is the computed cardinality value defined based on a number of unique values of the variable. The Gini entropy $E_G$ may be computed for each non-high-cardinality nominal variable using $$E_G = \frac{-C\sum_{i=1}^{N_N}(1-p_i^2)}{(C-1)}.$$

The variation ratio v may be computed for each non-high-cardinality nominal variable using $$v = \frac{(1-f_m)}{N_N - M},$$

where $f_m$ is a frequency of a mode computed for the variable. A first frequency skewness $F_{t1,t2}$ (Top1/Top2) may be computed for each non-high-cardinality nominal variable using $F_{t1,t2}=f_{t1}/f_{t2}$, where $f_{t1}$ is a frequency of a most frequent unique value and $f_{t2}$ is a frequency of a second most frequent unique value. A second frequency skewness $F_{t1,b1}$ (Top1/Bot1) may be computed for each non-high-cardinality nominal variable using $F_{t1,b1}=f_{t1}/f_{b1}$, where $f_{b1}$ is a frequency of a least frequent unique value. Each non-high-cardinality variable has a tuple of grouping values that include the missing rate value $M_r$, the cardinality ratio value $C_r$, the Shannon entropy $E_S$, the Gini entropy $E_G$, the variation ratio v, the first frequency skewness $F_{t1,t2}$, and the second frequency skewness $F_{t1,b1}$ or ($M_r$, $C_r$, $E_S$, $E_G$, v, $F_{t1,t2}$, $F_{t1,b1}$). The Shannon entropy $E_S$ and the Gini entropy $E_G$ are a combined metric, and the variation ratio v, the first frequency skewness $F_{t1,t2}$, and the second frequency skewness $F_{t1,b1}$ are a combined metric as indicated in Table I.

For example, the classical skewness $S_c$ may be computed for each interval variable using $S_c=E[(x-E[x])^3]$, where $E[x]$ is a mean value for the variable The average quantile skewness $S_q$ may be computed for each interval variable using $S_q=(E[x]-q_2)/E[|x-q_2|]$, where $q_2$ is a median value for the variable. The classical kurtosis $K_C$ may be computed for each interval variable using $K_C=E[(x-E[x])^4]$. The average quantile kurtosis $K_q$ may be computed for each interval variable using $K_q=(U_A-L_A)/(U_B-L_B)$, where $U_{A/B}=\int 1-a/b^1 F^{-1}(X)dx$, $L_{A/B}=\int_0^{a/b} F^{-1}(X)dx$, and $F^{-1}(X)$ is an inverse cumulative density function, a is a lower quantile, and b is an upper quantile used for the computation of a lower ($L_A$, $L_B$) and an upper ($U_A$, $U_B$) contribution. Illustrative values are a=0.025 and b=0.25. The expressions for $L_A$, $L_B$, $U_A$, and $U_B$ can be cast into sums for the upper and lower tail of the distribution of the values, which controller device 104 computes using the contributions computed by each worker device 400. The number of outliers $N_o$ may be estimated using an adjusted boxplot as described in Mia Hubert and Ellen Vandervieren, *An Adjusted Boxplot for Skewed Distributions*, 52 Comput. Stat. Data Anal. 5186 (2008). The outlier percentage $O_p$ is computed using $O_p=N_o/N_I$, where $N_I$ is a number of non-missing values for the interval variable. Each interval variable has a tuple of grouping values that include the missing rate value $M_r$, the classical skewness $S_c$, the average quantile skewness $S_q$, the classical kurtosis $K_C$, the average quantile kurtosis $K_q$, and the outlier percentage $O_p$ or ($M_r$, $S_c$, $S_q$, $K_C$, $K_q$, $O_p$). The classical skewness $S_c$ and the average quantile skewness $S_q$ are a combined metric, and the classical kurtosis $K_C$ and the average quantile kurtosis $K_q$ are a combined metric as indicated in Table I.

Worker data analysis application 412 executed by each worker device 400 computes the contributions to the statistical value while controller device 104 receives the contributions from each worker device 400 and computes the final values for each statistical value. For example, in the case of the mean value $E[x]$, each worker device 400 sends their contribution to both the sum of each variable and the number of used observations of each variable and controller device 104 aggregates these contributions and computes the actual value for the mean $E[x]$. Of course, the higher order moments such as $S_c=E[(x-E[x])^3]$ need the computation of more factors than the sum such as the sums of $x^2$, $x^3$, etc.

In an operation 624, an index is assigned to each variable group. For example, a variable group index may be defined for each row of high-cardinality variable type table node 1010, each row of non-high-cardinality variable type table node 1012, and each row of interval variable type table node 1014. For illustration, an index of one may be assigned to high cardinality variables with a high missing rate; an index of two may be assigned to high cardinality variables with a medium missing rate; an index of three may be assigned to high cardinality variables with a low missing rate; an index of four may be assigned to interval variables with a low missing rate, low skewness, low kurtosis, low outlier percentage; and so on.

In an operation 626, a group index is assigned to each variable of the plurality of variables $v_i$. For example, each identified high-cardinality variable may be assigned the variable group index based on the missing rate value $M_r$ comparison described in operation 616.

The grouping values computed for each variable in the nominal list may be compared to the nominal policy parameter(s) of the plurality of policy parameters. For example, the missing rate value $M_r$ is compared to the missing rate high threshold $M_H$, the missing rate medium threshold $M_M$, and the missing rate low threshold $M_L$ to assign the first dimension of the tuple (missing rate, cardinality ratio, the entropy compound metric, and the frequency skewness compound metric) as either high, medium, or low. Similarly, the cardinality ratio value $C_r$ is compared to the nominal cardinality high threshold and the nominal cardinality low threshold to assign the second dimension of the tuple (missing rate, cardinality ratio, the entropy compound metric, and the frequency skewness compound metric) as either high or low. The Shannon entropy $E_S$ and the Gini entropy $E_G$ are compared to the appropriate nominal entropy high threshold, the appropriate nominal entropy medium threshold, and the appropriate nominal entropy low threshold to assign the third dimension of the tuple (missing rate, cardinality ratio, the entropy compound metric, and the frequency skewness compound metric) as either high, medium, or low based on the policy parameter test values. The first frequency skewness $F_{t1,t2}$, the second frequency skewness $F_{t1,b1}$, and the variation ratio v are compared to the appropriate nominal frequency ratio high threshold, the appropriate nominal frequency ratio medium threshold, and the appropriate nominal frequency ratio low threshold to assign the fourth dimension of the tuple (missing rate, cardinality ratio, the entropy compound metric, and the frequency skewness compound metric) as either high, medium, or low based on the policy parameter test values.

The grouping values computed for each variable in the interval list may be compared to the interval policy parameter(s) of the plurality of policy parameters. For example, the missing rate value $M_r$ is compared to the missing rate high threshold $M_H$, the missing rate medium threshold $M_M$, and the missing rate low threshold $M_L$ to assign the first dimension of the tuple (missing rate, the skewness compound metric, the kurtosis compound metric, outlier percentage) as either high, medium, or low. The classical skewness $S_c$ and the average quantile skewness $S_q$ are compared to the appropriate interval skew high threshold, the appropriate interval skew medium threshold, and the appropriate interval skew low threshold to assign the second dimension of the tuple (missing rate, the skewness compound metric, the kurtosis compound metric, outlier percentage) as either high, medium, or low based on the policy parameter test values. The classical kurtosis $K_C$ and the average quantile kurtosis $K_q$ are compared to the appropriate interval kurtosis high threshold, the appropriate interval kurtosis medium threshold, and the appropriate interval kurtosis low threshold to assign the third dimension of the tuple (missing rate, the skewness compound metric, the kurtosis compound metric, outlier percentage) as either high, medium, or low based on the policy parameter test values. The outlier percentage $O_p$ is compared to the interval outlier high threshold, the interval outlier medium threshold, and the interval outlier low threshold to assign the fourth dimension of the tuple (missing rate, the skewness compound metric, the kurtosis compound metric, outlier percentage) as either high, medium, or low.

In an operation 628, data analysis results 223 may be returned or otherwise provided to user device 200 if user device 200 and controller device 104 are not integrated. For example, the grouping values computed for each variable may be returned with the assigned group index and/or the assigned group of interval variable, non-high-cardinality nominal variable, or high-cardinality nominal variable. In addition, a count of a number of variables assigned to each variable group may be computed in operation 626 as the group index is assigned to each variable and the count of the number of variables assigned to each variable group may be returned. A total number of variables, a total number of nominal variables, a total number of interval variables, a number of high-cardinality variables, and/or a number of non-high-cardinality variables also may be returned. A proportion of the number of variables with a specific pair, triplet, etc. (any valid composition of statistical metrics based on the type of the variable) of statistical metrics also may be computed and returned. For example, a proportion of interval variables with a high missing rate metric and a low skewness metric may be computed and returned after operation 626.

Figure 7B:
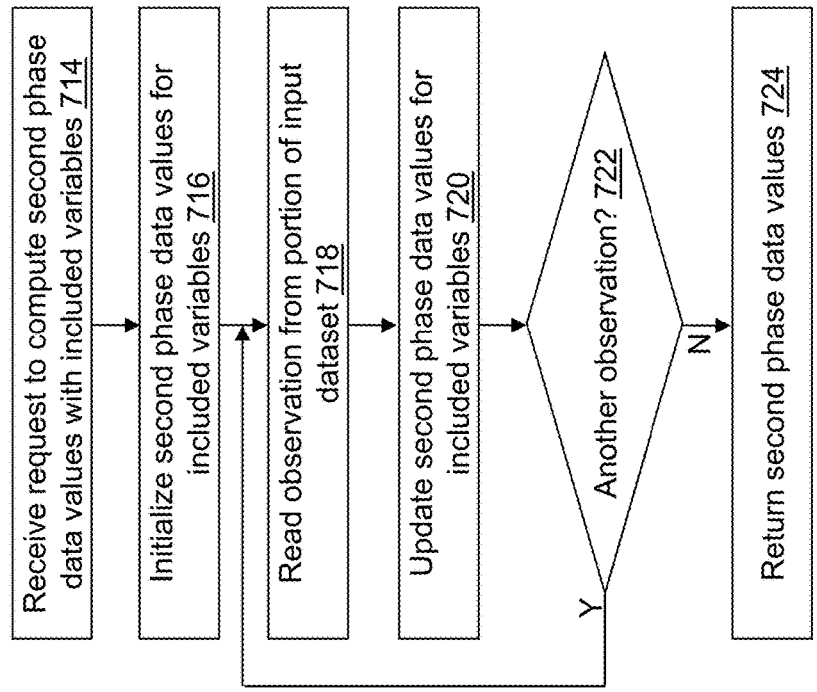
FIGS. 7A and 7B depict a flow diagram illustrating examples of operations performed by the worker device of FIG. 4 in support of data analysis and grouping in accordance with an illustrative embodiment.
Figure 7A:
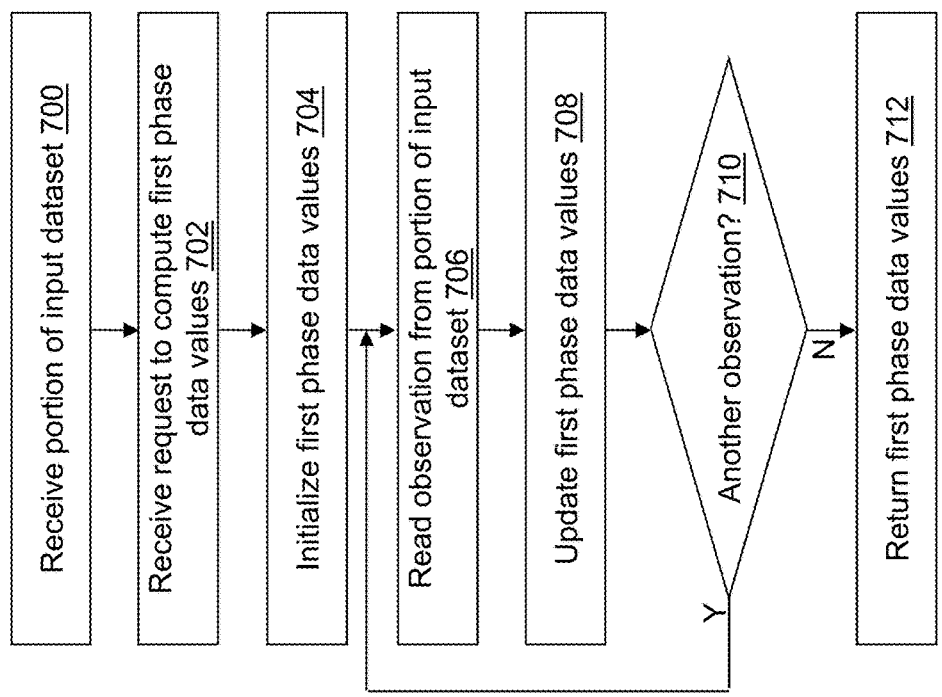

Referring to FIGS. 7A and 7B, example operations associated with worker data analysis application 412 are described. Additional, fewer, or different operations may be performed depending on the embodiment. The order of presentation of the operations of FIGS. 7A and 7B is not intended to be limiting. Again, controller data analysis application 312 and worker data analysis application 412 may be integrated or be the same applications so that the operations of FIG. 6 and FIGS. 7A and 7B are merged.

In an operation 700, a portion of the input dataset is received and loaded in third computer-readable medium 408 as input data subset 414 unless already loaded.

In an operation 702, the request to compute first phase data values is received.

In an operation 704, the first phase data values are initialized. For example, worker register banks (hash tables) for each variable of the plurality of variables $v_i$ are initialized to zero. The number of register bits policy parameter value that may have been received with the request is used to define a size of the worker register banks according to the HyperLogLog++ algorithm. As another example, missing counter values for each variable of the plurality of variables $v_i$ are initialized to zero. As yet another example, a number of observations counter value is initialized to zero.

In an operation 706, a first observation is read from input data subset 414 to define values for each variable of the plurality of variables $v_i$.

In an operation 708, the first phase data values are updated based on the defined values. For example, the missing counter value is incremented for any variable for which a value is missing, the number of observations counter value is incremented, and the values used to estimate cardinality value $C_e$ according to the HyperLogLog++ algorithm are updated. Quantiles used for the average quantile skewness and kurtosis metrics (a=0.025, b=0.25, and, q=0.5) may be computed as part of the first phase data values for all numeric variables.

In an operation 710, a determination is made concerning whether input data subset 414 includes another observation. If input data subset 414 includes another observation, processing continues in operation 706. If input data subset 414 does not include another observation, processing continues in an operation 712.

In operation 712, the updated first phase data values computed for each variable of the plurality of variables $v_i$ are returned or otherwise provided to controller device 104. The updated first phase data values may be stored in subset statistics dataset 416.

In an operation 714, the request to compute second phase data values is received.

In an operation 716, the second phase data values are initialized. For example, frequency counter values, unique value counter values, sum values, and/or sum squared values for each variable of the plurality of variables $v_i$ may be initialized to zero or one as appropriate.

In an operation 718, a first observation is read from input data subset 414 to define values for each variable of the plurality of variables $v_i$.

In an operation 720, the second phase data values are updated based on the defined values.

In an operation 722, a determination is made concerning whether input data subset 414 includes another observation. If input data subset 414 includes another observation, processing continues in operation 718. If input data subset 414 does not include another observation, processing continues in an operation 724.

In operation 724, the updated second phase data values computed for each variable of the plurality of variables $v_i$ are returned or otherwise provided to controller device 104. The second first phase data values may be stored in variable grouping data 418.

Quantifying data-quality issues of the input dataset is an important first task in predictive modelling. Data analysis application 222, controller data analysis application 312, and worker data analysis application 412 need minimal inputs to organize the variables of the input dataset into groups that are defined by statistical metrics. This organization quantifies data quality issues of the dataset in an easily digestible form. Thus, as a first pass, users can use data analysis application 222, controller data analysis application 312, and worker data analysis application 412 with its default policy settings to augment the normal data exploration part of their analytics workflow. Additionally, the user can easily adjust the policy parameter values. Though the default values are usually effective for most input datasets, it may be beneficial to experiment with different values for the policy parameters. This helps to identify variables that have borderline values for specific statistical metrics. These variables can further be explored individually for a better understanding and a more robust classification. The graphical and numerical depiction of the results, as illustrated in FIGS. 9 and 10, is beneficial to understand the full array of data quality issues uncovered by data analysis application 222, controller data analysis application 312, and worker data analysis application 412. In the context of predictive modelling, the results can be used as an input to a data transformation application 224 shown referring to FIG. 11 or a high-C data transformation application 230 shown referring to FIG. 17. For example, it is well-known that both skewness reducing functional transformations such as Box-Cox transformation and discretization can ameliorate skewness. However, skewness reducing functional transformations cannot handle issues due to missing values. In contrast discretization can, as long as missing values are put in a distinct bin. Thus, both the treatment of missing values followed by skewness and the outright treatment of both missing values and skewness are potential treatments for a variable group characterized by a high missing rate and a high skewness by data transformation application 224.

Figure 11:
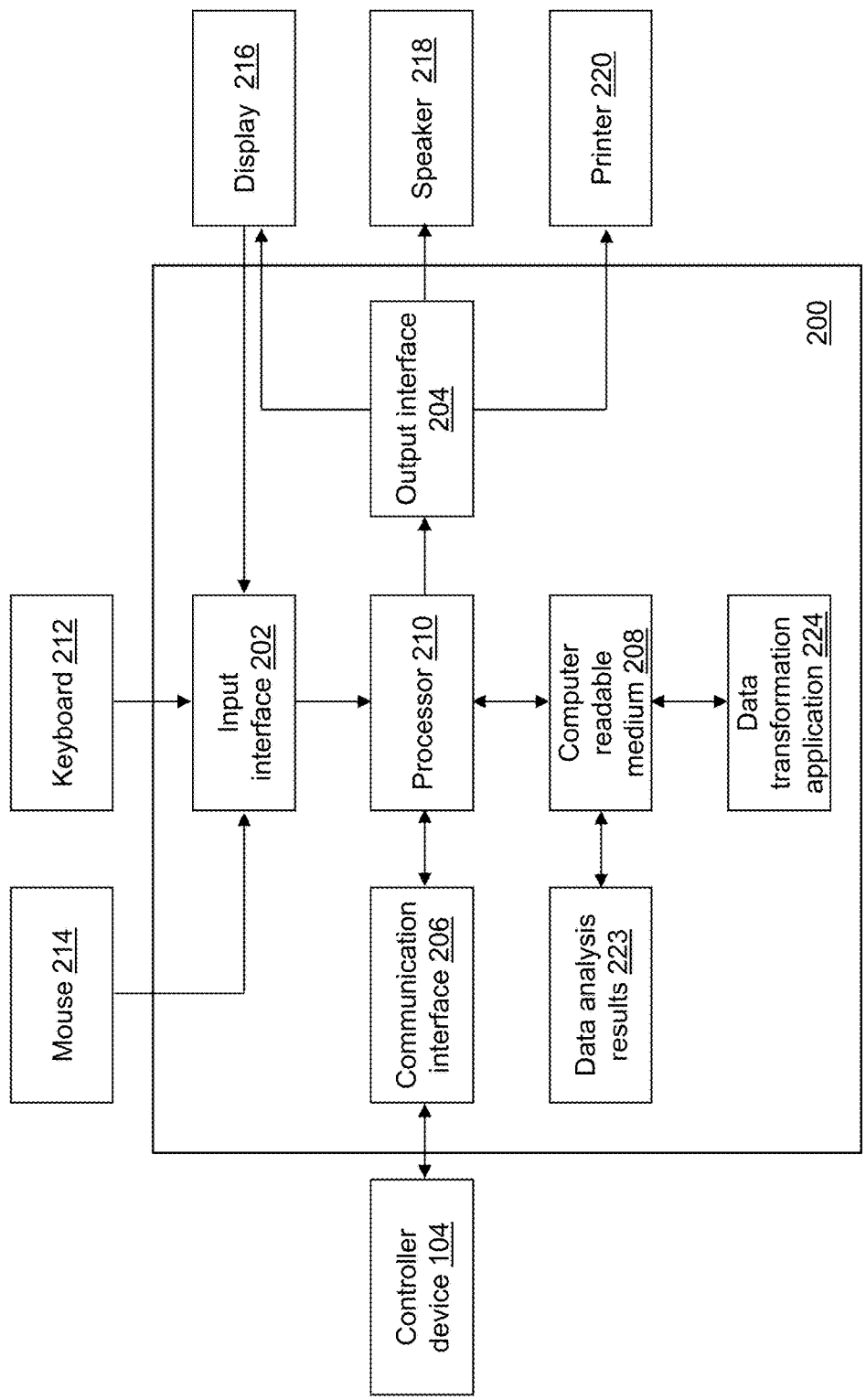
FIG. 11 depicts a second block diagram of the user device of the data analysis and transformation system of FIG. 1 in accordance with an illustrative embodiment.

Referring to FIG. 11, a second embodiment of user device 200 is shown that further includes data transformation application 224. Data transformation application 224 performs operations associated with requesting transformation of the input dataset so that the user can better utilize the data in subsequent predictive model training. The operations may be implemented using hardware, firmware, software, or any combination of these methods. Referring to the example embodiment of FIG. 11, data transformation application 224 is implemented in software (comprised of computer-readable and/or computer-executable instructions) stored in computer-readable medium 208 and accessible by processor 210 for execution of the instructions that embody the operations of data transformation application 224. Data transformation application 224 may be written using one or more programming languages, assembly languages, scripting languages, etc. Data transformation application 224 may be implemented as a Web application.

Data transformation application 224 may be integrated with other analytic tools including data analysis application 222. As an example, data transformation application 224 may be part of an integrated data analytics software application and/or software architecture such as that offered by SAS Institute Inc. of Cary, N.C., USA. For example, data transformation application 224 may be part of SAS® Enterprise Miner™ developed and provided by SAS Institute Inc. of Cary, N.C., USA. Merely for further illustration, data transformation application 224 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Figure 12:
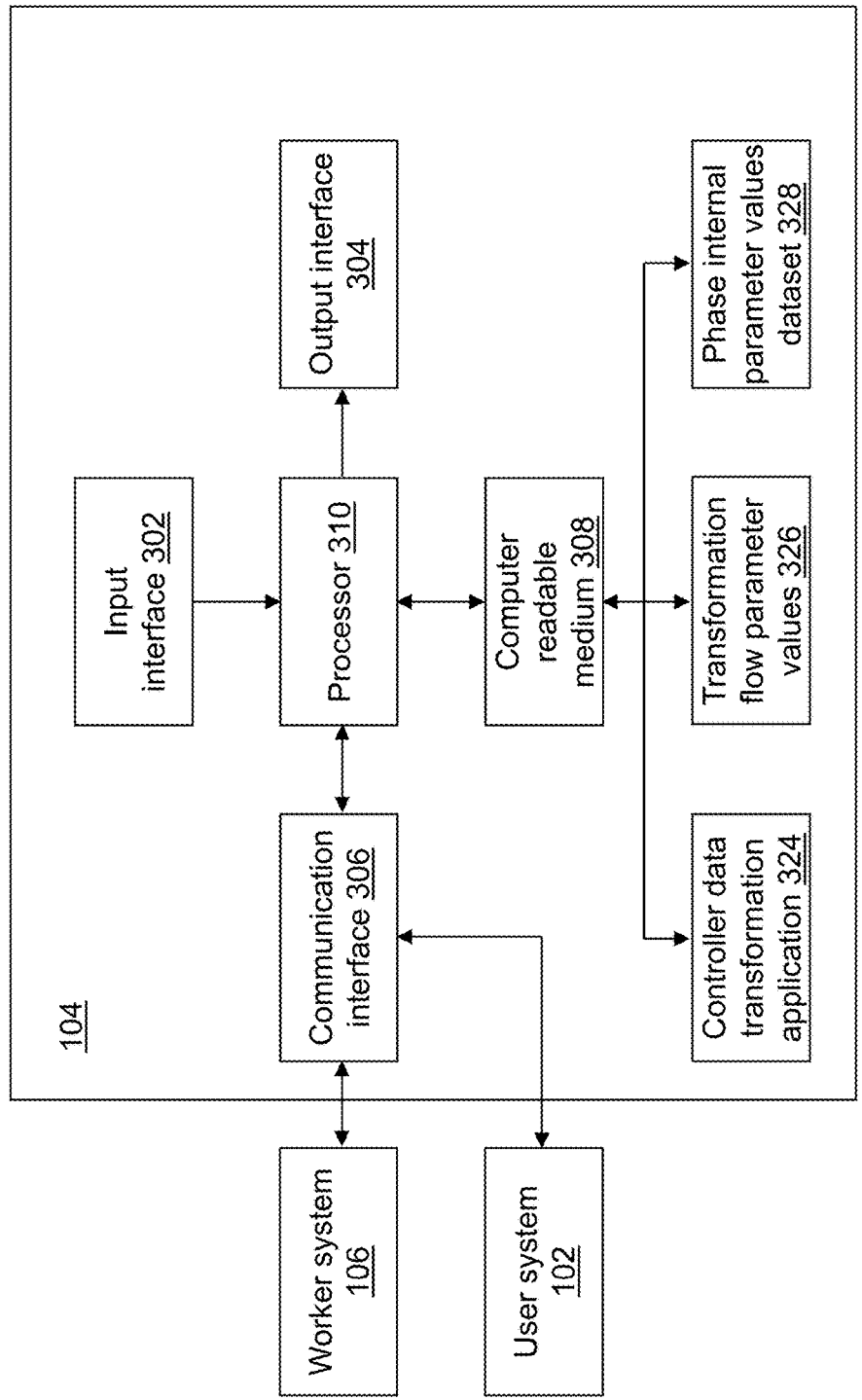
FIG. 12 depicts a second block diagram of a controller device of the data analysis and transformation system of FIG. 1 in accordance with an illustrative embodiment.

Referring to FIG. 12, a second embodiment of controller device 104 is shown that further includes controller data transformation application 324. Controller data transformation application 324 performs operations associated with transforming the input dataset based on transformation flow parameter values 326 provided from user device 200 using the computing devices of worker system 106, when the input dataset is distributed across the computing devices of worker system 106. The operations may be implemented using hardware, firmware, software, or any combination of these methods. Referring to the example embodiment of FIG. 12, controller data transformation application 324 is implemented in software (comprised of computer-readable and/or computer-executable instructions) stored in second computer-readable medium 308 and accessible by second processor 310 for execution of the instructions that embody the operations of controller data transformation application 324. Controller data transformation application 324 may be written using one or more programming languages, assembly languages, scripting languages, etc. Controller data transformation application 324 may be implemented as a Web application.

Controller data transformation application 324 may be integrated with other analytic tools including with controller data analysis application 312. As an example, controller data transformation application 324 may be part of an integrated data analytics software application and/or software architecture such as that offered by SAS Institute Inc. of Cary, N.C., USA. For example, controller data transformation application 324 may be part of SAS® Enterprise Miner™ developed and provided by SAS Institute Inc. of Cary, N.C., USA. Merely for further illustration, controller data transformation application 324 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Figure 13:
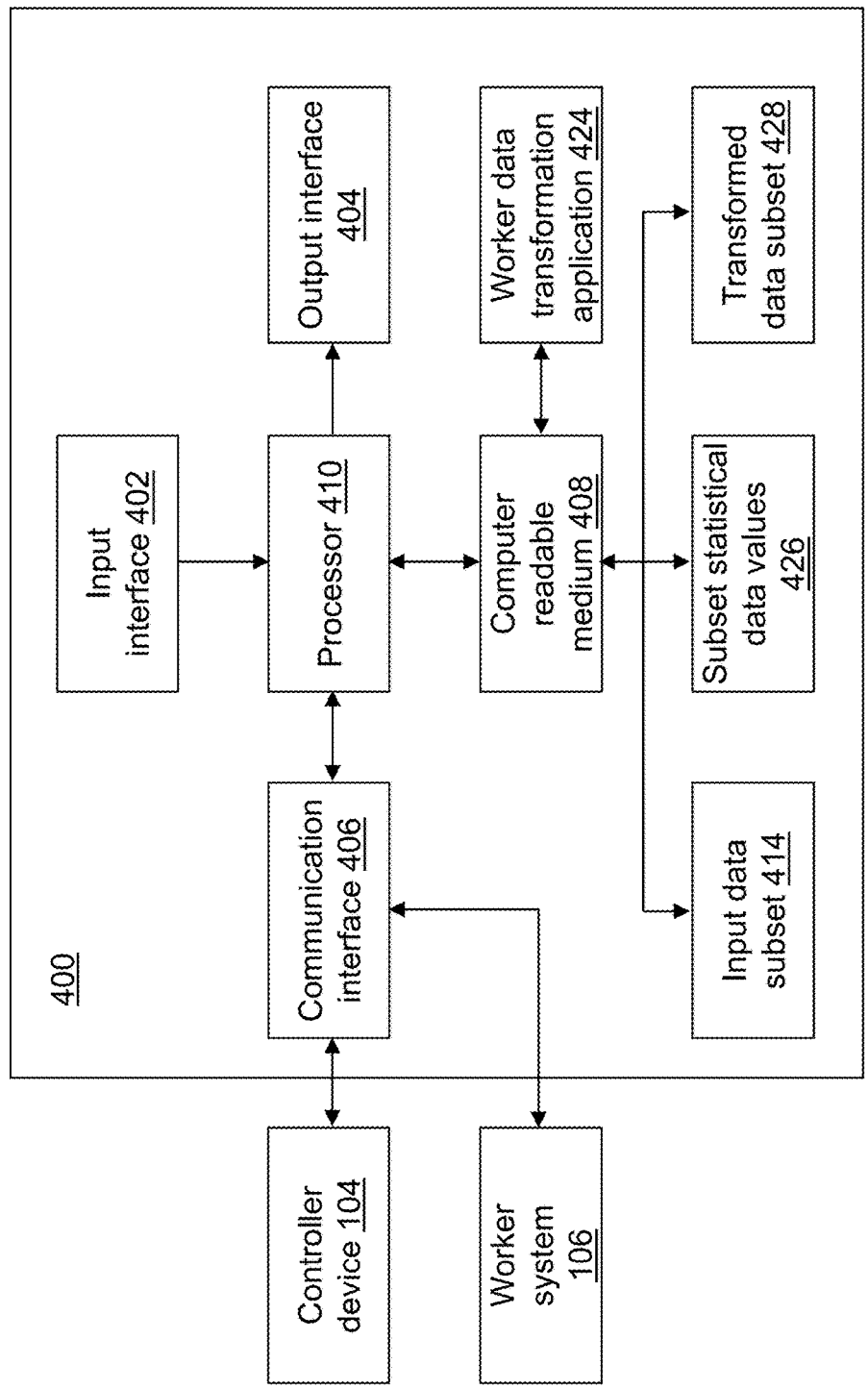
FIG. 13 depicts a second block diagram of a worker device of the data analysis and transformation system of FIG. 1 in accordance with an illustrative embodiment.

Referring to FIG. 13, a second embodiment of worker device 400 is shown that further includes worker data transformation application 424. Worker data transformation application 424 performs data transformation of input data subset 414 based on inputs from controller device 104 to define subset statistical data values 426 and transformed data subset 428. Worker data transformation application 424 may be integrated with other analytic tools including worker data analysis application 412. As an example, worker data transformation application 424 may be part of an integrated data analytics software application and/or software architecture such as that offered by SAS Institute Inc. of Cary, N.C., USA. For example, worker data transformation application 424 may be part of SAS® Enterprise Miner™ developed and provided by SAS Institute Inc. of Cary, N.C., USA. Merely for further illustration, worker data transformation application 424 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Data transformation application 224, controller data transformation application 324, and worker data transformation application 424 may be the same or different applications that are integrated in various manners to perform data transformation of the input dataset distributed across worker system 106. Data transformation application 224, controller data transformation application 324, and worker data transformation application 424 process a transformation request composed of user specifiable and configurable transformation flows. The user can specify multiple, connected transformation phases per flow in a user configurable order. These transformation phases include imputation, outlier detection and treatment, functional transformation, and discretization phases for interval variable transformations, and imputation, map-interval, hashing, and nominal grouping phases for nominal variable transformations. Any one of these phases may be included or excluded in a particular transformation flow, and the phases can be configured in a user-specifiable order. Data transformation application 224, controller data transformation application 324, and worker data transformation application 424 provide the capability to succinctly express most, if not all, feature transformations that practitioners apply in their predictive modeling workflow, thereby resulting in faster model development.

The composition of the most effective feature transformation steps depends on the particular modelling task, and in particular, the chosen predictive model type. As a result, practitioners are forced to iteratively apply and evaluate feature transformation steps in their predictive modeling workflow. This makes feature transformation a combinatorial problem that requires the exploration of a large feature transformation space. The user of data transformation application 224, controller data transformation application 324, and worker data transformation application 424 can specify multiple feature transformation flows that are processed in distributed-mode/parallel sharing data passes, which results in a significant reduction in a number of data passes that may be required to transform data to a form consumable by different predictive model types. This is an important contribution as it lets users efficiently explore and evaluate a large number of transformation flows. There is also no generation of temporary (intermediate) datasets, which is especially important in a big-data and/or cloud environment where the computer memory is not available to support intermediate datasets.

Data transformation application 224, controller data transformation application 324, and worker data transformation application 424 provide an effective solution for this combinatorial problem through their expressive, parallel, multi-flow feature transformation pipelines. Each feature transformation pipeline is user specifiable and configurable, thereby avoiding undue restrictions in the exploration of the feature transformation space. In addition, their parallel and multi-flow capabilities let the user explore multiple feature transformation pipelines for each variable or group of variables in parallel and in the same data pass, without generating temporary datasets.

Each feature transformation flow is an independent task, and as such, a variable may be a member of multiple transformation flows in support of different predictive model types that have different feature transformation needs. As a result, the multi-flow capability reduces the number of data passes (reads and writes) that are needed to prepare data for multiple predictive model types, which saves computing cycles, memory accesses, network communications, etc. Again, this is especially important in a big-data and/or cloud environment.

Data transformation application 224, controller data transformation application 324, and worker data transformation application 424 optimize computations using transformation flow similarity and variable flow analysis to avoid redundant intermediate computations across transformation flows. The transformation similarity and variable flow analysis techniques analyze the specified transformation flows to determine and deactivate redundant intermediate computations. Redundant intermediate computations are grouped into sets and only a single representative from each set is designated as computable. The rest of the members of the set are designated as non-computable. The non-computable members share the result from their computable counterpart avoiding redundant computations.

Figure 14:
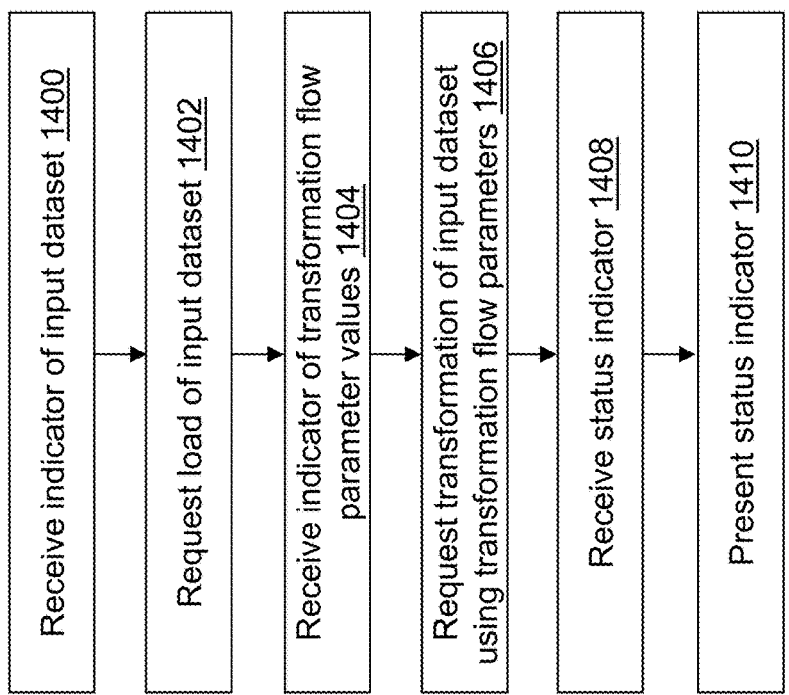
FIG. 14 depicts a flow diagram illustrating examples of operations performed by the user device of FIG. 2 in support of data transformation in accordance with an illustrative embodiment.

Referring to FIG. 14, example operations associated with data transformation application 224 are described. Additional, fewer, or different operations may be performed depending on the embodiment. The order of presentation of the operations of FIG. 14 is not intended to be limiting. A user can interact with one or more user interface windows presented to the user in a display under control of data transformation application 224 independently or through a browser application in an order selectable by the user. Although some of the operational flows are presented in sequence, the various operations may be performed in various repetitions, concurrently, and/or in other orders than those that are illustrated.

A session may be established with controller device 104.

Similar to operation 500, in an operation 1400, the first indicator may be received that indicates the input dataset.

Similar to operation 502, in an operation 1402, a load of the input dataset may be requested.

In an operation 1404, a fifth indicator may be received that indicates a plurality of transformation flow parameter values. The plurality of transformation flow parameter values is used to define how each of a plurality of variables $v_i$ are transformed though each variable can be transformed multiple times in different transformation flows. Each transformation flow parameter value of the plurality of transformation flow parameter values may have a predefined default value that may be used when a user does not specify a value for the transformation flow parameter using the fifth indicator.

In an operation 1406, a request to transform the input dataset based on the plurality of transformation flow parameter values is sent to controller device 104. For example, the user may select a button to indicate that the plurality of transformation flow parameter values has been selected and that transformation of the input dataset should be performed. As another example, in the illustrative code above, the "run" statement triggers sending of the request to controller device 104. The plurality of transformation flow parameter values may be sent in a message or other instruction to controller device 104, may be provided in a known memory location to controller device 104, etc. In an alternative embodiment, user device 200 and controller device 104 may be integrated in the same computing device so that when the plurality of transformation flow parameter values is received by user device 200, it is also received by controller device 104.

Each transformation flow parameter value may be received using a separate indicator. For example, the following code establishes a session ("session mysess") and sends a transformation request ("dataPreprocess.transform") to process the input dataset defined by table="test".

```
proc cas;
  session mysess;
  dataPreprocess.transform/
    table="test"
    requestPackages={
      {
        name="pipeline1"
        inputs=${x1, x2}
        impute={method="mean"}
        outlier={method="IQR", treatment="trim"}
        function={method="log",
          args={otherArgs={10}}}
        discretize={method="bucket"}
        phaseOrder="IFO"
      },
      {
        name="pipeline2"
        inputs=${x1}
        impute={method="mean"}
```

```
            function={method="standardize"}
            discretize={method="bucket"}
        },
        {
            name="pipeline3"
            inputs=${x1, x2, x3}
            targets=${y}
            outlier={method="IQR", treatment="trim"}
            discretize={method="MDLP"}
        },
        {
            name="pipeline4"
            inputs=${c1, c2}
            impute={method="mode"}
            catTrans={method="grouprare",
                args={nbins=3}}
        },
        {
            name="pipeline5"
            inputs=${c1}
            targets=${y}
            events={"1"}
            mapInterval={method="WOE"}
        }
    }
    casout={name="out1" replace=True}
run;
quit;
```

The transformed dataset is stored in name="out1". The transformed values replace the existing variable values though the option replace=False results in the transformed values being added to the existing variable values instead of replacing them.

The "requestPackages" parameter defines a list of transformation flows that are the plurality of transformation flow parameter values that define at least one transformation flow. Thus, each request package of the "requestPackages" parameter is a transformation flow definition of one or more transformation flow definitions. Because each transformation flow can have multiple phases, computation of the parameters for a phase is based on the data that flows from the preceding phase, if any. For example, if an interval transformation has an impute phase followed by functional transformation phase, the parameters of the functional transformation phase are estimated based on the imputed feature/variable.

In the illustrative code, five transformation flow definitions named "pipeline1", "pipeline2", "pipeline3", "pipeline4", and "pipeline5" are defined by the "requestPackages" parameter. The user can define any number of transformation flow definitions with each transformation flow definition associated with a transformation flow. Each transformation flow definition includes a "name" parameter that defines a name for the transformation flow and an "inputs" parameter that defines a list of one or more variables $v_{tf,i}$ to be transformed by the transformation flow indicated by tf, where i=1, . . . , $N_{tf}$ and $N_{tf}$ is a number of the one or more variables listed for the transformation flow indicated by tf. For example, for the first transformation flow definition named "pipeline1", $N_{tf}=2$, $v_{1,1}$ is a variable named "x1" read from the input dataset, and $v_{1,2}$ is a variable named "x2" read from the input dataset.

A transformation flow may include a "targets" parameter that defines a list of one or more target variables $v_{t,f,i}$ to be transformed by the transformation flow indicated by tf, where i=1, . . . , $N_{t,tf}$ and $N_{t,tf}$ is a number of the one or more target variables listed for the transformation flow indicated by tf. For example, for the third transformation flow definition named "pipeline3", $N_{t,tf}=1$, $vt_{3,1}$ is a variable named "y" read from the input dataset.

For a binary target variable, an "events" parameter defines a target variable that the user has selected for modelling, such as a rare level. For example, for fraud detection with target variable y, if a value of "1" indicates fraud, then a value for the "events" parameter may be "1".

Each transformation flow definition can be for either a nominal transformation flow type or an interval transformation flow type based on the type of variable(s) defined by the "inputs" parameter. Nominal transformation flow types are transformations for which the input variables are nominal variables, for example, as identified by data analysis application 222, controller data analysis application 312, and worker data analysis application 412. Each nominal transformation flow can include an impute phase ("impute"), a hash phase ("hash"), a map interval phase ("mapInterval"), and/or a categorical grouping phase ("catTrans") that can be performed in the order they are defined in the transformation flow. For example, the fourth transformation flow definition named "pipeline4" is an nominal transformation flow that includes an impute phase followed by a categorical grouping phase.

The impute phase for a nominal transformation flow type imputes a value for the specified input variables when a value is missing for an observation using the specified method. The imputed value is a mode statistic computed for the variable and may be referred to as a phase internal parameter for the impute phase because it is computed prior to execution of the transformation phase.

The hash phase maps values for the specified input variables using the specified method.

The mapInterval phase maps values for the specified input variables to an interval scale using the specified method. As a result, these mapped values, essentially interval-scale intermediate variables, can be further processed using an interval transformation. Level-value maps are the phase internal parameters defined for the mapInterval phase. Each level of the nominal variable is mapped to some interval/numeric value defined by the level-value maps. Optional methods for determining the level-value maps phase internal parameters include frequencies, event probabilities, weight of evidence (WOE), standardized centralized moments, etc.

The catTrans phase groups variables using the specified method. Level-group maps are the phase internal parameters defined for the categorical grouping phase. Optional methods for determining the level-group maps phase internal parameters include unsupervised (rare level grouping "grouprare") or supervised, such as decision tree, regression tree, etc., methods. Supervised methods use a target variable specified by the "targets" parameter to perform the grouping. The "args" parameter defined for the catTrans phase varies dependent on the method selected. For example, the rare level grouping, unsupervised method uses a number of bins into which the data is grouped. The number of bins is defined by the "{nbins=3}" parameter.

Interval transformation flow types are transformations for which the input variables are interval variables, for example, as identified by data analysis application 222, controller data analysis application 312, and worker data analysis application 412. Each interval transformation flow type can include an impute phase ("impute"), an outlier phase ("outlier"), a functional transform phase ("function"), and/or a discretize phase ("discretize") that can be performed in the order they are defined in the transformation flow definition. For example, the first transformation flow definition named "pipeline1" is an interval transformation flow type that includes an impute phase followed by an outlier phase followed by a functional transform phase followed by a discretize phase.

The impute phase for an interval transformation flow type imputes a value for the specified input variables when a value is missing for an observation using the specified method. Again, the imputed value is the phase internal parameter for the impute phase because it is computed prior to execution of the transformation phase. The imputed value may be a central tendency statistic computed for the variable that may be a mean, a median, a Winsorized mean, a trimmed mean, a mid-range, a geometric mean, a harmonic mean, Tukey's biweight, etc. as understood by a person of skill in the art.

The outlier phase detects, using the specified method, and treats, using the specified treatment method, outlier values for the specified input variables. A lower threshold, an upper threshold, and a replacement value are the phase internal parameters defined for the outlier phase. Optional methods for computing the lower and upper threshold phase internal parameters include z-score, robust z-score, inter-quantile range (IQR), percentile, user-defined limits, etc. Optional treatment methods for computing the replacement value phase internal parameter include winsorization, trimming and value replacement, etc. The outlier phase internal parameters depend on location and scale estimates. Location estimates may be computed as a mean, a median, a winsorized mean, a trimmed mean, a mid-range, a geometric mean, a harmonic mean, Tukey's biweight, etc. Scale estimates may be computed as a standard deviation, an IQR, a median absolute deviation about the median (MAD), a Gini scale, a Tukey's biweight, etc. These statistics are used to compute the phase internal parameter for the outlier phase depending on the selected outlier detection and treatment methods.

The function phase transforms the specified input variables using the specified method. Optional methods include log, sqrt, centering, standardization, etc. The "args" parameter defined for the function phase varies dependent on the method selected. Depending on the method selected the function phase may not need computation of any phase internal parameters. For example, the methods "log" and "sqrt" do not require any computation to perform the requested transformation. Data dependent methods such as centering and standardization include location and scale estimates as phase internal parameters for the function phase. Location estimates may be computed as a mean, a median, a winsorized mean, a trimmed mean, a mid-range, a geometric mean, a harmonic mean, Tukey's biweight, etc. Scale estimates may be computed as a standard deviation, an IQR, a MAD, a Gini scale, a Tukey's biweight, etc. These statistics are used to compute the phase internal parameter for data dependent methods selected for the function phase.

The discretize phase transforms the specified input variables using the specified method. Cut-points (bin boundaries) are the phase internal parameters defined for the discretize phase. Computation of the cut-points depends on the specified discretization method. The discretization methods include non-iterative (unsupervised) and iterative (supervised) techniques. Non-iterative (unsupervised) methods such as bucket and equal-frequency compute the cut-points based on statistics such as a minimum and a maximum or quantiles, and the specified number of bins. In contrast, iterative (supervised) techniques such as a minimum description length principle (MDLP), extended-chi-merge, class-attribute contingency coefficient (CACC), etc. use statistics for construction of a contingency (frequency) table, and the contingency table is processed by the specified method to estimate the cut-points. The minimum description length principle and the extended-chi-merge technique is described in J. Dougherty et al., *Supervised and Unsupervised Discretization of Continuous Features*, Proceedings 12th International Conference on Machine Learning, at 194 (1995). The class-attribute contingency coefficient technique is described in Cheng-Jung Tsai, Chien-I Lee, Wei-Pang Yang: *A discretization algorithm based on Class-Attribute Contingency Coefficient*. Inf. Sci. 178(3): 714-731 (2008).

As stated previously, transformation flows/pipelines are of either interval or nominal type. By default, if used, interval transformation phases are processed according to the following sequence: 1) impute phase, 2) outlier phase, 3) function phase, and 4) discretize phase. By default, if used, nominal transformation phases are processed according to the following sequence: 1) impute phase, 2) hash phase, and 3) catTrans phase or 4) mapInterval phase. For interval transformation phases, the default phase order can be changed using the "phaseOrder" parameter. For example, setting the "phaseOrder" parameter value to "FOI" indicates the following sequence: 1) function ("F") phase, 2) outlier ("O") phase, 3) impute ("I") phase, and 4) discretize phase. The "phaseOrder" parameter value does not affect the discretize phase, which is applied last. Thus, the phase order for application of the function ("F") phase, the outlier ("O") phase, and the impute ("I") phase can be changed from the default order using the "phaseOrder" parameter value and defining the order using the appropriate letter designation.

The user may use data analysis results 223 to identify the phases and order of application of the phases to apply to specific variables. For illustration, Table II below includes the plurality of transformation flow parameter values that can be selected by a user to define a transformation flow.

TABLE II

| Transformation flow parameter name | Options | Default values |
|---|---|---|
| name | name value | none |
| inputs | list of one more variable names | none |
| impute | method-for interval transformation, mean, median, min, max, harmonic mean, winsorized mean, trimmed mean, geometric mean, user-provided value; for nominal, mode and user-provided value. | Mean for interval and mode for nominal |
| outlier | method-IQR, Z-score, modified Z-score, percentile, and user defined limits. treatment-trim, winsor, replace | IQR trim |
| function | method-log, BoxCox, exp, sqrt, power, standardize, center, . . . Options for location and scale estimates | standardize |
| discretize | method-bucket, quantile, MDLP, CACC, Chimerge, regressionTree (single predictor), WOE. Options to control the number of bins (nbins, max nbins, min nbins). | bucket |
| phaseOrder | IOF, IFO, OIF, OFI, FIO, FOI | IOF |

TABLE II-continued

| Transformation flow parameter name | Options | Default values |
|---|---|---|
| targets | list of one more target variable names | none |
| catTrans | method-grouprare, WOE, decisionTree. Options to control the number of bins (nbins, max nbins, min nbins). | grouprare |
| events | list of one or more events for the binary target variables. | none |
| mapInterval | Method-WOE, event-probability, standardized moments, counts | none |

In the illustrative code above, the first, second, and third transformation flows are interval transformation flows, while the fourth and fifth transformation flows are nominal transformation flows. A complexity of a transformation flow is expressed by an order value that counts a number of phases in the transformation flow where the order of a transformation flow is a number of phases of the transformation flow.

In the illustrative code above, the first transformation flow is a 4th-order transformation flow (impute phase, outlier phase, functional transform phase, discretize phase), the second transformation flow is a 3rd-order transformation flow (impute phase, functional transform phase, discretize phase), the third transformation flow is a 2nd-order transformation flow (outlier phase, discretize phase), the fourth transformation flow is a 2nd-order transformation flow (impute phase, catTrans phase), and the fifth transformation flow is a 1st-order transformation flow (mapInterval phase).

As mentioned above, various statistical values may need to be computed as part of execution of a phase and are referred to as phase internal parameters. Table III lists the statistics used to compute the transformed values for each type of phase. The hash phase does not require any phase internal parameters.

TABLE III

| Statistic type | impute | outlier | function | discretize | mapInterval | catTrans |
|---|---|---|---|---|---|---|
| Basic (nobs, number missing observations, min, max) | Yes | Yes | Yes | Yes | Yes | Yes |
| Location estimate (mean, median, trimmed mean, winsorized mean, harmonic mean, geometric mean) | Yes | Yes | Yes | | | |
| Scale estimate (Std, IQR, MAD and Gini scale) | Yes | Yes | Yes | | | |
| Quantile | Yes | Yes | Yes | Yes | | |
| Contingency table | | | | Yes | Yes | Yes |
| Distinct counts | | | | Yes | Yes | Yes |
| WOE, moments, event probability, level frequency | | | | | Yes | |

Basic statistics include a number of observations, a minimum value, a maximum value, etc. Again, location estimates may include a mean, a median, a winsorized mean, a trimmed mean, a mid-range, a geometric mean, a harmonic mean, Tukey's biweight, etc. Scale estimates may include a standard deviation, an IQR, a MAD, a Gini scale, a Tukey's biweight, etc.

In an operation 1408, a status indicator may be received that indicates a success or a failure of the transformation request. Additionally, or in the alternative, a summary table may be received that provides a list of transformed variables.

In an operation 1410, the received status indicator may be presented on display 216.

Figure 15B:
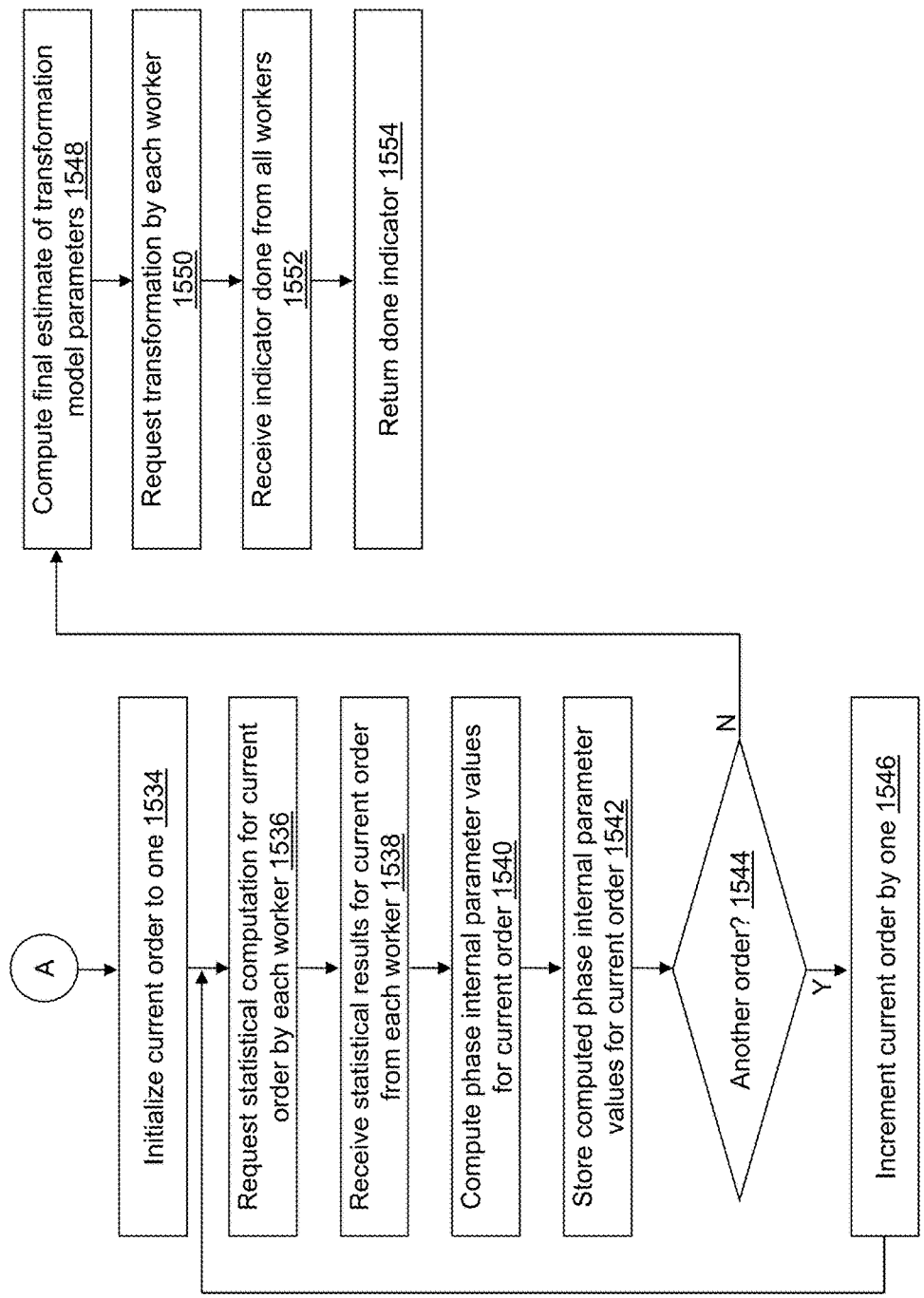

Referring to FIGS. 15A and 15B, example operations associated with controller data transformation application 324 are described. Additional, fewer, or different operations may be performed depending on the embodiment. The order of presentation of the operations of FIGS. 15A and 15B is not intended to be limiting. Again, controller data transformation application 324 and data transformation application 224 may be integrated or be the same applications so that the operations of FIG. 14 and FIGS. 15A and 15B are merged. Additionally, or in the alternative, controller data analysis application 312 and controller data transformation application 324 may be integrated or be the same applications so that the operations of FIG. 6 and FIGS. 15A and 15B are merged.

Similar to operation 600, in an operation 1500, the request to load the input dataset selected by the user is received.

Similar to operation 602, in an operation 1502, the input dataset is partitioned across each worker device 400 of worker system 106.

In an operation 1504, the transformation request may be received from user device 200 or directly from the user of user device 200 when integrated.

In an operation 1506, the plurality of transformation flow parameter values is extracted from the transformation request. In an alternative embodiment, the request may include a reference to a location that is storing the values. In another alternative embodiment, the plurality of transformation flow parameter values may be read from a known storage location. The plurality of transformation flow parameter values may be stored in transformation flow parameter values 326.

In an operation 1508, an index value for tf is assigned to each transformation flow. For example, an index of one, tf=1, is assigned to the first transformation flow; an index of two, tf=2, is assigned to the second transformation flow; an index of three, tf=3, is assigned to the third transformation flow; an index of four, tf=4, is assigned to the fourth transformation flow; an index of five, tf=5, is assigned to the fifth transformation flow; etc.

In an operation 1510, a flow similarity between the plurality of transformation flows defined by the plurality of transformation flow parameter values is determined. A transformation request can include a large number of transformation flows. As a result, direct (naïve) computation of the statistics that are required to define the phase internal parameters for each phase may introduce significant inefficiencies due to redundant computations. This can be a performance bottleneck, especially in a big data or a distributed data environment. To avoid these inefficiencies, the similarity is determined to avoid redundant intermediate computations. The flow similarity analysis is done for each phase of the transformation flows. Two transformation flows are nth-order similar if the first n phases are similar. Flow similarity analysis is not based on the input variables and/or target variables specified for each transformation flow. Flow similarity is measured between transformation flows of the same type. For example, flow similarity is determined separately for interval transformation flows and for nominal transformation flows. For illustration, considering the code above, the first transformation flow is $1^{st}$-order similar with the second transformation flow and vice versa because flow similarity is symmetric. The third transformation flow is $0^{th}$-order similar with the first transformation flow and with the second transformation flow.

For illustration, each entry in a similarity matrix SA[n, n] is initialized to zero, where n is a number of the transformation flows.

for i=1 to n
  for j=i+1 to n
    for k=1 to np, where np is a number of phases of $TF_j$,
      where $TF_j$ is the $j^{th}$ transformation flow
      If the kth phase of $TF_j$, where $TF_i$ is the $i^{th}$
        transformation flow, is equivalent to the kth
        phase of $TF_j$, SA[i,j]+=1
    end for
  end for
end for The equivalence of two phases is dependent on the full array of options specified for those options. For example, if two phases are both imputations, but one is a mean imputation and the other is median imputation, the two phases are not equivalent. SA[i,j] holds the similarity order of $i^{th}$ transformation flow with the $j^{th}$ transformation flow, where the similarity order of a transformation flow with itself is not computed and the similarity matrix is symmetric.

In an operation 1512, a maximum transformation order $M_{to}$ is determined. For example, a maximum order is identified from the order of each transformation flow. For illustration, considering the code above, the maximum transformation order is four because the first transformation flow has four phases, which is the maximum order for any of the five defined transformation flows.

In an operation 1514, a current order a is initialized to one.

In an operation 1516, a set of statistical computations is defined as an $a^{th}$ order computation set. The set includes one or more tuples defined by (a, tf, v, st_type), where a is the current order selected in operation 1514, tf is the transformation flow index assigned in operation 1508 for the associated transformation flow, v is a variable of the associated transformation flow, and st_type is a statistic type. For illustration, considering the code above, Table IV captures the statistic(s), if any, for each order and each transformation flow.

TABLE IV

| | TF1 | TF2 | TF3 | TF4 | TF5 |
|---|---|---|---|---|---|
| $1^{st}$-order | mean | mean | quantile | mode | level frequency, WOE |
| $2^{nd}$-order | quantile | mean, std. dev. | min, max | level frequency | |
| $3^{rd}$-order | | min, max | | | |
| $4^{th}$-order | min, max | | | | |

The statistic(s) are determined based on the method(s) and phase(s) defined by the plurality of transformation flows and the phase internal parameters associated with each. For example, the third phase for the first transformation flow is a log function phase that does not include any phase internal parameters. The set of statistical computations defined for the 1st statistical computation set for a first iteration of operation 1516 includes (1, 1, x1, mean), (1, 1, x2, mean), (1, 2, x1, mean), (1, 3, x1, quantile), (1, 3, x2, quantile), (1, 3, x3, quantile), (1, 4, c1, mode), (1, 4, c2, mode), (1, 5, c1, level frequency), (1, 5, c1, WOE).

The set of statistical computations defined for the $2^{nd}$ statistical computation set for a second iteration of operation 1516 includes (2, 1, x1, quantile), (2, 1, x2, quantile), (2, 2, x1, mean), (2, 2, x1, std. dev.), (2, 3, x1, min), (2, 3, x1, max), (2, 3, x2, min), (2, 3, x2, max), (2, 3, x3, min), (2, 3, x3, max), (2, 4, c1, level frequency), (2, 4, c2, level frequency).

The set of statistical computations defined for the $3^{rd}$ statistical computation set for a third iteration of operation 1516 includes (3, 2, x1, min), (3, 2, x1, max).

The set of statistical computations defined for the 4th statistical computation set for a fourth iteration of operation 1516 includes (4, 1, x1, min), (4, 1, x1, max), (4, 1, x2, min), (4, 1, x2, max).

The set of statistical computations is created by looping through each transformation flow that has a remaining phase based on the order index, then looping through the input variables specified for the remaining phase, and then looping through the statistical parameters required for the phase and method specified for the phase, if any.

In an operation 1518, a statistical computation index is assigned to each statistical computation of the set of statistical computations. For example, for a first iteration of operation 1518, a statistical computation index of one is assigned to (1, 1, x1, mean); a statistical computation index of two is assigned to (1, 1, x2, mean); a statistical computation index of three is assigned to (1, 2, x1, mean); a statistical computation index of four is assigned to (1, 3, x1, quantile); a statistical computation index of five is assigned to (1, 3, x2, quantile); a statistical computation index of six is assigned to (1, 3, x3, quantile); a statistical computation index of seven is assigned to (1, 4, c1, mode); a statistical computation index of eight is assigned to (1, 4, c2, mode); a statistical computation index of nine is assigned to (1, 5, c1, level frequency); and a statistical computation index of ten is assigned to (1, 5, c1, WOE) for a=1 and tf=1, . . . , 5.

In an operation 1520, any identical statistical computations without considering the transformation flow index tf are grouped. Statistical computations are identical if their reduced tuples are identical. For example, the reduced tuples include (a, v, st_type), where a is the current order selected in operation 1514, v is a variable of the associated transformation flow, and st_type is a statistic type.

In an operation 1522, a statistical computation is selected from each grouped set of statistical computations.

In an operation 1524, the selected statistical computation from each grouped set of statistical computations is designated as active.

In an operation 1526, any remaining statistical computation(s) of each grouped set of statistical computations are designated as inactive.

In an operation 1528, a set of statistical computations is defined that includes any non-grouped statistical computation and the selected statistical computation designated as active for each grouped set of statistical computations.

The inactive statistical computation(s) of each grouped set of statistical computations will receive the data computed for the corresponding statistical computation indicated as active, but the value will not be redundantly computed.

In an operation 1530, a determination is made concerning whether there is another order for which to define a computable set of statistical computations. For example, when $a=M_{to}$, there is not another order. When there is another order, processing continues in an operation 1532. When there is not another order, processing continues in an operation 1534.

In operation 1532, the current order a is incremented by one. For example, a=a+1 and processing continues in operation 1516.

Shown referring to FIG. 15B, in operation 1534, the current order a is re-initialized to one.

In an operation 1536, a request is sent to each worker device 400 to compute each statistical computation of the $a^{th}$ computable set of statistical computations. For example, the request includes the tuples associated with each statistical computation included in the set to instruct each worker device 400 to compute a specific statistic type for a specific variable and associate it with the order and transformation flow defined by the tuple.

In an operation 1538, the statistical results for each statistical computation of the $a^{th}$ computable set of statistical computations are received from each worker device 400.

In an operation 1540, a phase internal parameter value is computed for each statistical computation for the current order. For example, the mean of variable "x1" is computed for (1, 1, x1, mean) using the statistical results for (1, 1, x1, mean) that include a counter of a number of observations of "x1" and a sum of all of the observation values of "x1".

In an operation 1542, the computed phase internal parameter value for each statistical computation for the current order may be stored in phase internal parameter values dataset 328 with its associated tuple information.

In an operation 1544, a determination is made concerning whether there is another order for which to compute the phase internal parameter values. For example, when $a=M_{to}$, there is not another order. When there is another order, processing continues in an operation 1546. When there is not another order, processing continues in an operation 1548.

In operation 1546, the current order a is incremented by one. For example, a=a+1, and processing continues in operation 1536.

In operation 1548, a final computation of the phase internal parameter values is performed and may also be stored in phase internal parameter values dataset 328 with its associated tuple information. No further computation is required for some of the phase internal parameter values such as a mean, a median, etc. However, additional computation is needed to compute some of the phase internal parameter values. For example, a lower threshold and an upper threshold may be estimated from quantile estimates computed in operation 1540 using the specified method such as the IQR formula. As another example, the bin boundaries or cut-points for a discretize phase may be computed from minimum and maximum estimates using a contingency table. The contingency table is a frequency table that counts a number of occurrences of values of x (the transformation variable) and y (the target variable—if specified). The contingency table is defined based on the type of discretize phase:

For x, if bucket binning or initialization is selected for the supervised discretize phase, the cut-points of the contingency table are generated using cut-point(i)=min(x)+i*(min(x)−max(x))/m, where m is a number of rows of the contingency table that is equal to a number of splits of the x variable. For quantile binning or initialization, the cut-points are set equal to the corresponding quantiles.

For y, if specified, a number of unique values of y is determined and the unique values are used to define the columns. If y is not specified, the number of unique values is one.

During the data pass, values of x and y (in each record) are used to map the observation to one of the cells of the contingency table, and the frequency count of the mapped cell is incremented by one.

The contingency table is a final output for unsupervised discretize phases (e.g. bucket/equal-width, quantile/equal-frequency). In contrast, the contingency table is processed further to generate the final bins for supervised discretize phases such as MDLP, extended chi-merge, etc.

In an operation 1550, a request is sent to each worker device 400 to transform each variable for each transformation flow. For example, the request includes the computed phase internal parameter value for each statistical computation with its associated tuple to instruct worker device 400 to perform each transformation associated with each phase for each variable with the phase internal parameter value(s) needed by the associated phase.

In an operation 1552, a done indicator is received from each worker device 400.

In operation 1554, a done indicator is sent to user device 200. The transformed data may be stored in transformed data subset 428 at each worker device 400.

Figure 16C:
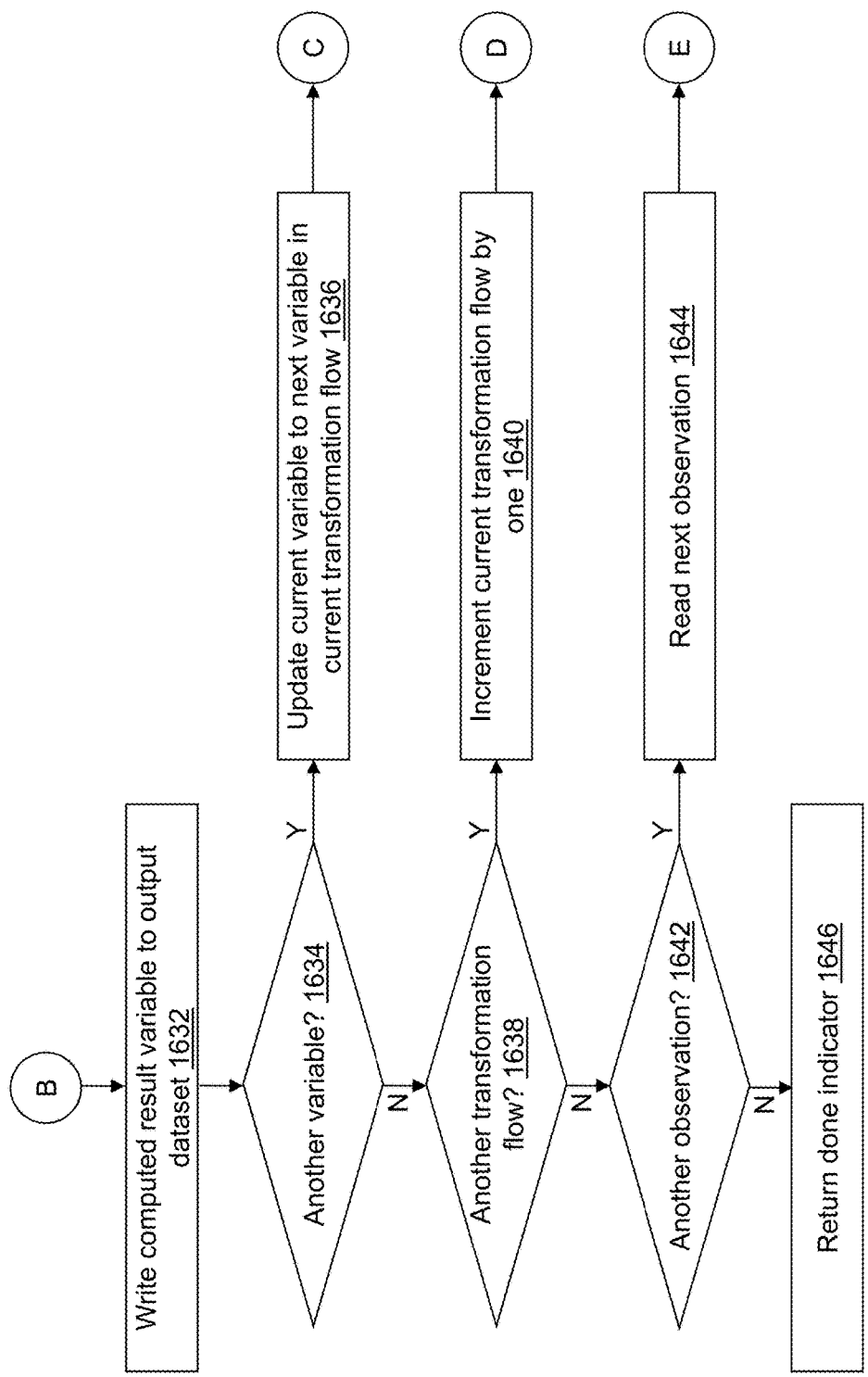

Referring to FIGS. 16A, 16B, and 16C, example operations associated with worker data transformation application 424 are described. Additional, fewer, or different operations may be performed depending on the embodiment. The order of presentation of the operations of FIGS. 16A, 16B, and 16C is not intended to be limiting. Controller data transformation application 324 and worker data transformation application 424 may be integrated or be the same applications so that the operations of FIGS. 15A and 15B and FIGS. 16A, 16B, and 16C are merged. Additionally, or in the alternative, worker data analysis application 412 and worker data transformation application 424 may be integrated or be the same applications so that the operations of FIGS. 7A and 7B and FIGS. 16A, 16B, and 16C are merged.

Similar to operation 700, in an operation 1600, a portion of the input dataset is received and loaded in third computer-readable medium 408 as input data subset 414.

In an operation 1602, the request to compute a statistical value is received. The request may include the active set of statistical computations for a current order being processing by controller device 104. The request may further include the set of statistical computations that includes inactive statistical computations. For illustration, for the first order provided in the example above, worker device 400 receives (1, 1, x1, mean); (1, 1, x2, mean); (1, 2, x1, mean); (1, 3, x1, quantile); (1, 3, x2, quantile); (1, 3, x3, quantile); (1, 4, c1, mode); (1, 4, c2, mode); (1, 5, c1, level frequency); and (1, 5, c1, WOE), but, as in operations 1520 to 1528, identifies (1, 2, x1, mean) as inactive relative to (1, 1, x1, mean) because the computations are identical except for the transformation flow.

In an operation 1604, statistical data values are initialized as needed for each statistical computation. For example, counters and sum values are initialized to zero. Minimum values may be initialized to a large quantity, and maximum values may be initialized to a large negative quantity. Illustrative counters include a number of observations counter value, a number of missing observations counter value, a number of unique values counter value, a number of occurrences of each unique value counter value, etc. for each statistical computation based on the type of statistical computation. Illustrative sum values include a total sum of values of each variable, a total sum of squared values of each variable, a total sum of inverse values of each variable, a total sum of difference values of each variable, etc. for each statistical computation based on the type of statistical computation.

In an operation 1606, a first observation is read from input data subset 414 to define values for each variable of the plurality of variables $v_j$.

In an operation 1608, the statistical data value(s) associated with each statistical computation are updated based on the defined values. For example, the missing counter value is incremented for any variable for which a value is missing; the number of observations counter value is incremented, a sum of values is updated, etc.

In an operation 1610, a determination is made concerning whether input data subset 414 includes another observation. If input data subset 414 includes another observation, processing continues in operation 1606. If input data subset 414 does not include another observation, processing continues in an operation 1612.

In operation 1612, the updated statistical data value(s) associated with each statistical computation are returned or otherwise provided to controller device 104. The updated statistical data value(s) may be stored in subset statistical data values 426.

Referring to FIG. 16B, in an operation 1614, the request to transform each variable of each transformation flow is received. For example, the received request includes the computed phase internal parameter value for each statistical computation with its associated tuple. The computed phase internal parameter value for each statistical computation with its associated tuple may be stored in subset statistical data values 426.

In an operation 1616, a first observation is read as a current observation from input data subset 414 to define values for each variable of the plurality of variables $v_j$. Transformed data subset 428 may be opened for writing on a first row. A current row of transformed data subset 428 is the first row. When the option replace=False is selected by the user, the first observation may be written to transformed data subset 428 so that transformed values are appended to the original values read from input data subset 414. A header row may be written to the first row of transformed data subset 428 that includes a variable name for each transformed variable. For example, the variable name for each variable to transform may be appended to the "name" parameter value given to each transformation flow so that each transformed variable has a unique name. For example, in the illustrative code above, a first transformed variable may be named "pipeline1_x1", a second transformed variable may be named "pipeline1_x2", a third transformed variable may be named "pipeline2_x1", . . . , and a ninth transformed variable may be named "pipeline5_c1".

In an operation 1618, a current transformation flow is initialized to one, tf=1.

In an operation 1620, a variable is selected as a current variable from the current transformation flow, and a current value $V_c$ is defined as the value for the current variable selected from the current observation. For example, for the first transformation flow provided in the example code, the variable "x1" is selected as the current variable, and the current value is defined as the value of the variable "x1" of the current observation.

In an operation 1622, a current order (phase) is initialized to one, a=1.

In an operation 1624, a transformation function is defined for the current order, the current transformation flow, and the current variable using an identifier of the phase (e.g., "impute", "function", "discretize") associated with the current order and the computed phase internal parameter value(s) associated with the current order, the current transformation flow, and the current variable. For example, the phase is matched to a function call and passed the parameters and the read value.

In an operation 1626, a result variable value $V_r$ is computed from the current value using the defined transformation function. For example, if the current value indicates that a value for the current variable selected from the current observation is missing and the phase is impute with a mean value, the defined transformation function selects the mean value provided as the computed phase internal parameter value(s) associated with the current order, the current transformation flow, and the current variable and sets the result variable value equal to the mean value. As another example, if the current phase is function(log), the defined transformation function computes a log of the current value and sets the result variable value equal to that log value. As another example, if the current phase is discretize(bucket), the defined transformation function determines in which bin of the contingency table (provided as the computed phase internal parameter value(s) associated with the current order) the current value falls and sets the result variable value equal to that bin value.

In an operation 1628, a determination is made concerning whether or not there is another order or phase of the current transformation flow to process. For example, when a=$M_{tfo}$, there is not another order, where $M_{tfo}$ is a maximum order (number of phases) of the current transformation flow tf. When there is another order, processing continues in an operation 1630. When there is not another order, processing continues in an operation 1632.

In operation 1630, the current order a is incremented by one to point to the next phase of the transformation flow and the current value is set equal to the computed result variable value $V_c$=$V_r$. For example, a=a+1, $V_c$=$V_r$, and processing continues in operation 1624 to apply the next phase to the result variable value of the previous phase.

Referring to FIG. 16C, in an operation 1632, the computed result variable value is appended to the current row of transformed data subset 428 as an output value of the current transformation flow for the value of the current variable.

In an operation 1634, a determination is made concerning whether there is another variable to process for the current transformation flow to process. When there is another variable, processing continues in an operation 1636. When there is not another variable, processing continues in an operation 1638.

In operation 1636, a next variable is selected as the current variable from the current transformation flow, a current value $V_c$ is defined as the value for the next variable selected from the current observation, and processing continues in operation 1622 to apply the current transformation flow to the next variable. For example, for the first transformation flow provided in the example code, the variable "x2" is selected as the next variable, and the current value is defined as the value of the variable "x2" of the current observation.

In an operation 1638, a determination is made concerning whether there is another transformation flow to process. When there is another transformation flow, processing continues in an operation 1640. When there is not another transformation flow, processing continues in an operation 1642.

In operation 1640, a next transformation flow is selected as the current transformation flow, and processing continues in operation 1620 to apply the next transformation flow. For example, because indices were assigned to each transformation flow, the transformation flow may be incremented by one to index to the next transformation flow, tf=tf+1. For illustration, after processing the first transformation flow, the second transformation flow is selected as the current transformation flow.

In an operation 1642, a determination is made concerning whether there is another observation to process in input data subset 414 to define values for each variable of the plurality of variables $v_j$. When there is another observation, processing continues in an operation 1644. When there is not another observation, processing continues in an operation 1646.

In operation 1644, a next observation is read from input data subset 414, and processing continues in operation 1618 to process the next observation. When the option replace=False is selected by the user, the next observation may be written to transformed data subset 428 so that the transformed values are appended to the original values read from input data subset 414 on a next row of transformed data subset 428. When the option replace=True is selected by the user, the next observation may not be written to transformed data subset 428 so that only the transformed values are written to the next row of transformed data subset 428. The current row of transformed data subset 428 is the next row.

In operation 1646, a done indicator is sent to controller device 104.

Predictive modelling practitioners such as data scientists and statisticians, spend a significant part of their time in the data preprocessing (feature transformation and generation) phase. Data transformation application 224, controller data transformation application 324, and worker data transformation application 424 transform the input dataset without generating intermediate datasets, which saves significant computer memory for large datasets and saves computer memory, computing time, and communication time for distributed datasets. Additionally, the user can specify any number of transformation flows with one or more phases that can be executed in parallel saving significant user time, computer memory, computing time, and communication time. For example, it is common to apply imputation to handle missing values followed by discretization/binning to handle outlier values. The workflow can be performed using a single transformation flow to avoid the generation of intermediate datasets and reduce the number of data passes because the data passes are shared across the transformation flows.

It is further beneficial to explore many feature transformation flows. Data transformation application 224, controller data transformation application 324, and worker data transformation application 424 easily and automatically allow the user to evaluate the effect of many transformation flows in a single execution so that the input dataset is more effectively evaluated and transformed. For example, variance reducing functional transformations such as Box-Cox and discretization/binning can be applied to highly skewed variables in a single execution in parallel and in the same data pass.

Figure 17:
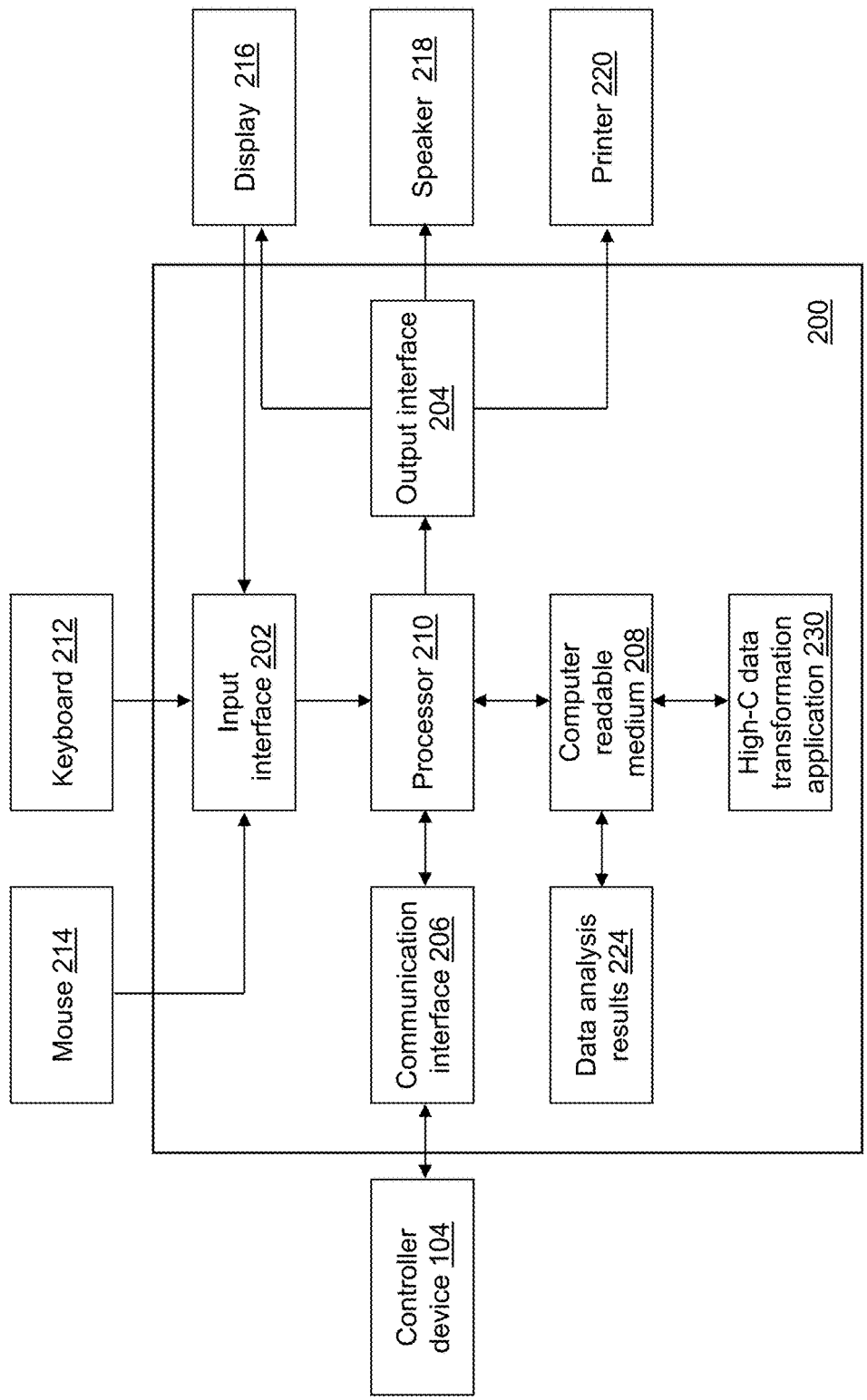
FIG. 17 depicts a third block diagram of the user device of the data analysis and transformation system of FIG. 1 in accordance with an illustrative embodiment.

Referring to FIG. 17, a third embodiment of user device 200 is shown that further includes a high-C (high-cardinality) data transformation application 230. High-C data transformation application 230 performs operations associated with requesting transformation of high-cardinality variables identified in the input dataset so that the user can better utilize the data in subsequent predictive analytics. The operations may be implemented using hardware, firmware, software, or any combination of these methods. Referring to the example embodiment of FIG. 17, high-C data transformation application 230 is implemented in software (comprised of computer-readable and/or computer-executable instructions) stored in computer-readable medium 208 and accessible by processor 210 for execution of the instructions that embody the operations of high-C data transformation application 230. High-C data transformation application 230 may be written using one or more programming languages, assembly languages, scripting languages, etc. High-C data transformation application 230 may be implemented as a Web application.

High-C data transformation application 230 may be integrated with other analytic tools including data analysis application 222 and/or data transformation application 224. As an example, high-C data transformation application 230 may be part of an integrated data analytics software application and/or software architecture such as that offered by SAS Institute Inc. of Cary, N.C., USA. For example, high-C data transformation application 230 may be part of SAS® Enterprise Miner™ developed and provided by SAS Institute Inc. of Cary, N.C., USA. Merely for further illustration, high-C data transformation application 230 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Figure 18:
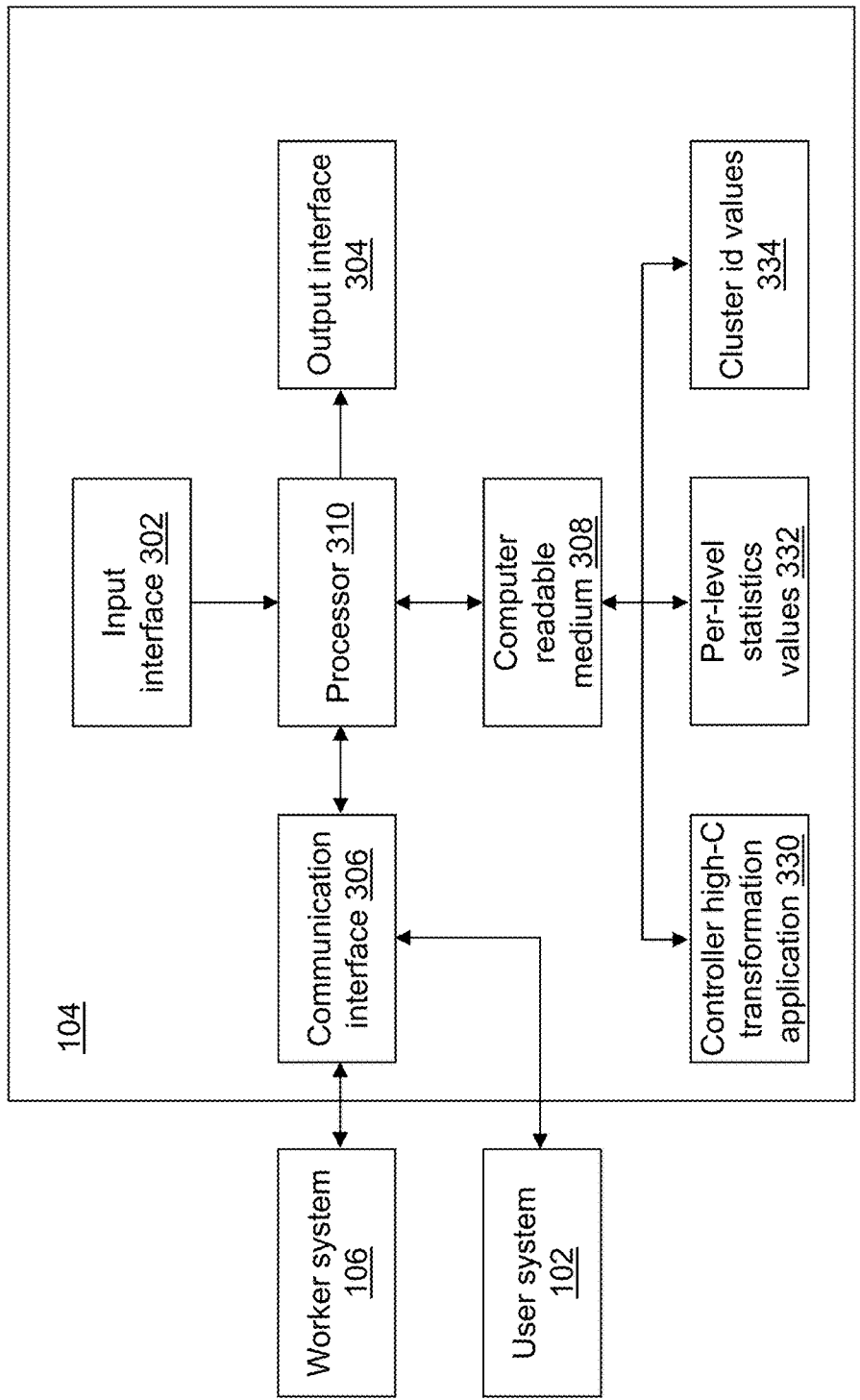
FIG. 18 depicts a third block diagram of a controller device of the data analysis and transformation system of FIG. 1 in accordance with an illustrative embodiment.

Referring to FIG. 18, a third embodiment of controller device 104 is shown that further includes a controller high-C data transformation application 330. Controller high-C data transformation application 330 performs operations associated with transforming the input dataset based on per-level statistics values 332 provided from user device 200 using the computing devices of worker system 106, when the input dataset is distributed across the computing devices of worker system 106. The operations may be implemented using hardware, firmware, software, or any combination of these methods. Referring to the example embodiment of FIG. 18, controller high-C data transformation application 330 is implemented in software (comprised of computer-readable and/or computer-executable instructions) stored in second computer-readable medium 308 and accessible by second processor 310 for execution of the instructions that embody the operations of controller high-C data transformation application 330. Controller high-C data transformation application 330 may be written using one or more programming languages, assembly languages, scripting languages, etc. Controller data transformation application 330 may be implemented as a Web application.

Controller high-C data transformation application 330 may be integrated with other analytic tools including with controller data analysis application 312 and/or controller data transformation application 324. As an example, controller high-C data transformation application 330 may be part of an integrated data analytics software application and/or software architecture such as that offered by SAS Institute Inc. of Cary, N.C., USA. For example, controller high-C data transformation application 330 may be part of SAS® Enterprise Miner™ developed and provided by SAS Institute Inc. of Cary, N.C., USA. Merely for further illustration, controller high-C data transformation application 330 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Figure 19:
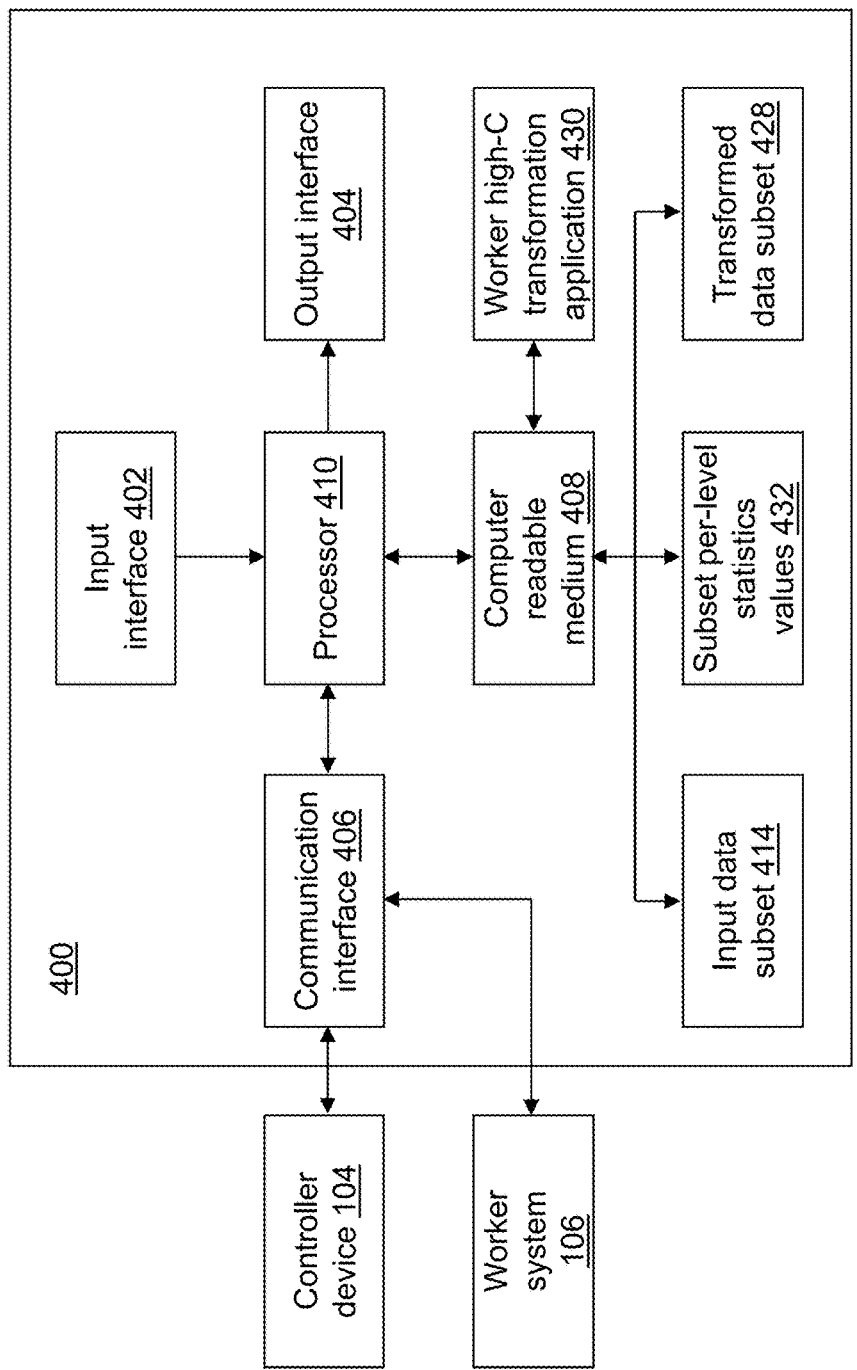
FIG. 19 depicts a third block diagram of a worker device of the data analysis and transformation system of FIG. 1 in accordance with an illustrative embodiment.

Referring to FIG. 19, a third embodiment of worker device 400 is shown that further includes a worker high-C data transformation application 430. Worker high-C data transformation application 430 performs data transformation of high-cardinality variables identified in input data subset 414 based on inputs from controller device 104 to define subset per-level statistics values 432 and transformed data subset 428. Worker high-C data transformation application 430 may be integrated with other analytic tools including worker data analysis application 412 and/or worker data transformation application 424. As an example, worker high-C data transformation application 430 may be part of an integrated data analytics software application and/or software architecture such as that offered by SAS Institute Inc. of Cary, N.C., USA. For example, worker high-C data transformation application 430 may be part of SAS® Enterprise Miner™ developed and provided by SAS Institute Inc. of Cary, N.C., USA. Merely for further illustration, worker high-C data transformation application 430 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

High-C data transformation application 230, controller high-C data transformation application 330, and worker high-C data transformation application 430 may be the same or different applications that are integrated in various manners to perform data transformation of high-cardinality variables identified in the input dataset distributed across worker system 106. High-C data transformation application 230, controller high-C data transformation application 330, and worker high-C data transformation application 430 process a transformation request composed of user specifiable transformation flows. The user can specify multiple, connected transformation phases per high-C transformation flow in a user configurable order. These transformation phases include a mapping method, a hash phase, and/or a cluster phase. Any one of these phases may be included or excluded in a particular transformation flow.

Most predictive modelling workflows discard high cardinality variables from their predictor variables set because naïve treatment of high cardinality variables, such as one-hot encoding, are fraught with problems due to explosion of the model dimension, which may in turn result in model overfitting. In addition, most high cardinality variables have rare levels (with very few observations), that make their naïve treatment ineffective. However, some high cardinality variables may be highly informative. As a result, discarding these variables may result in a predictive model that achieves less than optimal performance. In addition, this problem is compounded by the fact that designating a nominal variable as high versus low cardinality is dependent on an arbitrarily set unique count threshold that itself may be a problem.

High-C data transformation application 230, controller high-C data transformation application 330, and worker high-C data transformation application 430 provide a scalable (due to single pass standardized moment computations and hashing phases) and robust solution to these problems especially in the context of regression and classification problems. A user specifiable power parameter, p, determines a number of features, namely, standardized moments of a target variable that are computed for each level of a high cardinality predictor variable. These moments capture a density distribution of the target variable for each level of the high cardinality predictor variable, and hence, can be used as features in subsequent modelling tasks. The feature generator also makes similar count based techniques available for classification problems. In some cases, introduction of the new p features to the model space may be problematic in predictive modelling problems where dimensionality is an issue. To alleviate this, the feature generator provides a k-means clustering based feature compressor that essentially maps the p features into a single cluster identifier based feature. This dimensionality reduction benefit is in addition to the benefit that the k-means clustering may provide as an effective feature for the modeling algorithm. Other clustering methods may be used.

In most cases, high cardinality variables are bound to have levels with very few observations, namely, sparse levels. These levels complicate the estimation of any level-based statistics, including standardized moments and count statistics. High-C data transformation application 230, controller high-C data transformation application 330, and worker high-C data transformation application 430 provide two features that can be used to address this. First, a shrinkage estimator can be used to compute more accurate estimators. The shrinkage estimator shrinks the level-based statistics towards a global estimate with the amount of shrinkage controlled by the number of observations in the level and a user-definable parameter. Second, hash-based level compression can be used that reduces the cardinality to a more manageable size, thereby potentially decreasing a number of sparse levels.

For an interval target variable, high-C data transformation application 230, controller high-C data transformation application 330, and worker high-C data transformation application 430 generate p features for each high cardinality variable where p is a user definable parameter that denotes a maximum power of a standardized moment. The moments are computed for each unique value (level) of the high-cardinality variable. By definition, a value of a first standardized moment is zero, and a value of a second standardized moment is one. High-C data transformation application 230, controller high-C data transformation application 330, and worker high-C data transformation application 430 use a mean and a standard deviation in their place, respectively. For a nominal target variable, high-C data transformation application 230, controller high-C data transformation application 330, and worker high-C data transformation application 430 optionally generate a frequency per level, an event probability, etc.

High-C data transformation application 230, controller high-C data transformation application 330, and worker high-C data transformation application 430 can compute a shrinkage estimator for the standardized moments. A user definable shrinkage hyperparameter controls an amount of shrinkage that is applied to per-level moment estimators, which is important because high cardinality variables may contain levels that have too few observations for reliable estimation of the per-level moments. High-C data transformation application 230, controller high-C data transformation application 330, and worker high-C data transformation application 430 also provide flexible missing values treatment by providing an option to transform missing values of the high cardinality variable considering missing values as a unique level. High-C data transformation application 230, controller high-C data transformation application 330, and worker high-C data transformation application 430 also provide level compression of the high cardinality variables through hashing by providing a hashing based level compression that may be used as an on-the-fly preprocessing step, which is important for randomly compressing very high cardinality variables. High-C data transformation application 230, controller high-C data transformation application 330, and worker high-C data transformation application 430 also provide task parallel k-means clustering for post-processing to compress the generated p features into a single cluster identifier feature. In cases where there are multiple high cardinality input variables, a distributed task parallel scheme is implemented in which independent k-means clustering tasks are assigned to each worker device 400 for processing. This feature compression from p features to one is important for problems where model dimensionality needs to be constrained or limited.

Figure 20:
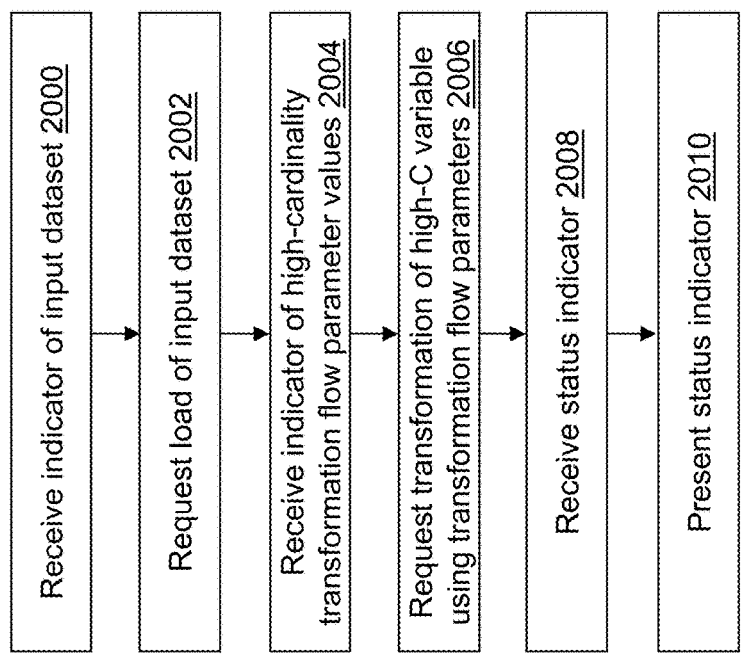
FIG. 20 depicts a flow diagram illustrating examples of operations performed by the user device of FIG. 2 in support of high-cardinality (high-C) data transformation in accordance with an illustrative embodiment.

Referring to FIG. 20, example operations associated with high-C data transformation application 230 are described. Additional, fewer, or different operations may be performed depending on the embodiment. The order of presentation of the operations of FIG. 20 is not intended to be limiting. A user can interact with one or more user interface windows presented to the user in a display under control of data transformation application 224 independently or through a browser application in an order selectable by the user. Although some of the operational flows are presented in sequence, the various operations may be performed in various repetitions, concurrently, and/or in other orders than those that are illustrated.

A session may be established with controller device 104.

Similar to operation 500, in an operation 2000, the first indicator may be received that indicates the input dataset.

Similar to operation 502, in an operation 2002, a load of the input dataset may be requested.

In an operation 2004, a sixth indicator may be received that indicates one or more high-C transformation flow parameter values. The one or more high-C transformation flow parameter values are used to define how each of one or more high-C variables $v_{HCi}$ are transformed though each variable can be transformed multiple times in different high-C transformation flows. Each high-C transformation flow parameter value of the plurality of high-C transformation flow parameter values may have a predefined default value that may be used when a user does not specify a value for the high-C transformation flow parameter using the sixth indicator.

In an operation 2006, a request to transform the selected high-C variable(s) of the input dataset based on the plurality of high-C transformation flow parameter values is sent to controller device 104. For example, the user may select a button to indicate that the plurality of high-C transformation flow parameter values has been selected and that transformation of the input dataset should be performed. The plurality of high-C transformation flow parameter values may be sent in a message or other instruction to controller device 104, may be provided in a known memory location to controller device 104, etc. In an alternative embodiment, user device 200 and controller device 104 may be integrated in the same computing device so that when the plurality of high-C transformation flow parameter values is received by user device 200, it is also received by controller device 104.

For example, the following code establishes a session ("session mysess") and sends a high-C transformation request ("dataPreprocess.transform") to process the input dataset defined by table={name="kdd98" where="target_d>0;"}, which selects a portion of the dataset names "kdd98".

```
proc cas;
   session mysess;
   dataPreprocess.transform/
   table={name="kdd98" where="target_d>0;"}
   requestPackages={
      {
         name="t1"
         inputs=${osource}
         targets=${target_d}
         mapInterval={
            method="moments"
            args={
            nMoments=4
            includeMissingLevel=True
            shrinkageFactor=10
            }
         }
      }
   }
   idVars=${osource}
   casout={name="out1" replace=True}
   run;
quit;
```

The transformed dataset is stored in name="out1". The transformed values replace the existing high-C variable values though the option replace=False adds the transformed values to the existing variable values instead of replacing them. In the illustrative code above, the "run" statement triggers sending of the request to controller device 104.

The "requestPackages" parameter defines a list of high-C transformation flows that are the plurality of transformation flow parameter values that define at least one high-C transformation flow. Thus, each request package of the "request-Packages" parameter is a high-C transformation flow definition of one or more high-C transformation flow definitions. Because each transformation flow definition can have multiple phases, computation of the parameters for a phase is based on the data that flows from the preceding phase, if any. In the illustrative code, a single transformation flow named "t1" is defined by the "requestPackages" parameter. The user can define any number of high-C transformation flow definitions. Each high-C transformation flow includes a "name" parameter that defines a name for the transformation flow and an "inputs" parameter that defines a list of the one or more high-C input variables to be transformed by the transformation flow. For example, for the first transformation flow definition named "t1", a single high-C input variable "osource" is transformed.

A high-C transformation flow definition also includes a "targets" parameter that defines the target variable associated with each high-C input variable. For example, for the first transformation flow definition named "t1", the target variable named "target_d" is read from the input dataset in association with the single high-C input variable "osource".

A high-C transformation flow definition also includes a "mapInterval" parameter that defines a transformation method and parameter values. As an example, a transformation method may be selected from "Moments", "WOE", "Frequency Count", etc. For example, a default transformation method may be the Moments transformation method. Of course, the transformation method may be labeled or selected in a variety of different manners by the user as understood by a person of skill in the art. In an alternative embodiment, the transformation method may not be selectable, and a single transformation method is implemented by high-C data transformation application 230. For example, the Moments transformation method may be used by default or without allowing a selection. As another example, the transformation method may not be specified, but may be selected by default based on a data type of the target variable specified in operation 2006. For example, the Moments transformation method may be used by default for a target variable with an interval data type, the WOE transformation method may be used by default for a target variable with a binary data type, the Frequency Count transformation method may be used by default for a target variable with a nominal (multi-class) data type, etc.

A high-C transformation flow definition also includes a value of a number of the p features to generate, which may also be referred to as a number of moments to generate. This is applicable for interval targets. A default value may be stored, for example, in computer-readable medium 208 and used automatically. In another alternative embodiment, the value of the number of the p features to generate may not be selectable. Instead, a fixed, predefined value may be used. For illustration, a default value may be four.

A high-C transformation flow definition also includes a value of a shrinkage factor. A default value may be stored, for example, in computer-readable medium 208 and used automatically. In another alternative embodiment, the value of the shrinkage factor may not be selectable. Instead, a fixed, predefined value may be used. For illustration, a default value may be zero.

A high-C transformation flow definition also includes a missing level option. The missing level option indicates whether a level is defined when a value is missing for the input variable(s). A default value may be stored, for example, in computer-readable medium 208 and used automatically. In another alternative embodiment, the value of the missing level option may not be selectable. Instead, a missing level is always defined for missing values or is never defined. For illustration, a default value may be "False" to indicate that a missing level is not defined, and the variable value is skipped.

A high-C transformation flow definition also includes a hash option that defines whether hash based level compression is applied as a pre-processing step. A default value may be stored, for example, in computer-readable medium 208 and used automatically. In another alternative embodiment, the value of the hash option may not be selectable. Instead, hash based level compression is always applied or is never applied. For illustration, a default value may be "False" to indicate that hash based level compression is not applied.

A high-C transformation flow definition may also include a value of a number of clusters into which to cluster the p features unless the clustering algorithm determines a number of clusters automatically. A default value may be stored, for example, in computer-readable medium 208 and used automatically. In another alternative embodiment, the value of the number of clusters may not be selectable. Instead, a fixed, predefined value may be used. For illustration, a default value may be one. The value of the number of clusters equal to one indicates that clustering is not performed.

For example, for the first transformation flow named "t1", the transformation method selected is the "Moments" transformation method (method="moments"). The "args" parameter indicates that the number of the p features to generate is four (nMoments=4), the value of the missing level option is "True" (includeMissingLevel=True), and the value of the shrinkage factor is ten (shrinkageFactor=10) for the selected transformation method. The default value for the value of the number of clusters into which to cluster the p features is set to the default value, which in the illustrative embodiment is one so that clustering is not performed. A high-C transformation flow may be another transformation flow read and processed by data transformation application 224 when the applications are integrated.

In an operation 2008, a status indicator may be received that indicates a success or failure of the transformation request. Additionally, or in the alternative, a summary table may be received that lists transformed variables.

In an operation 2010, the received status indicator may be presented on display 216.

Figure 21A:
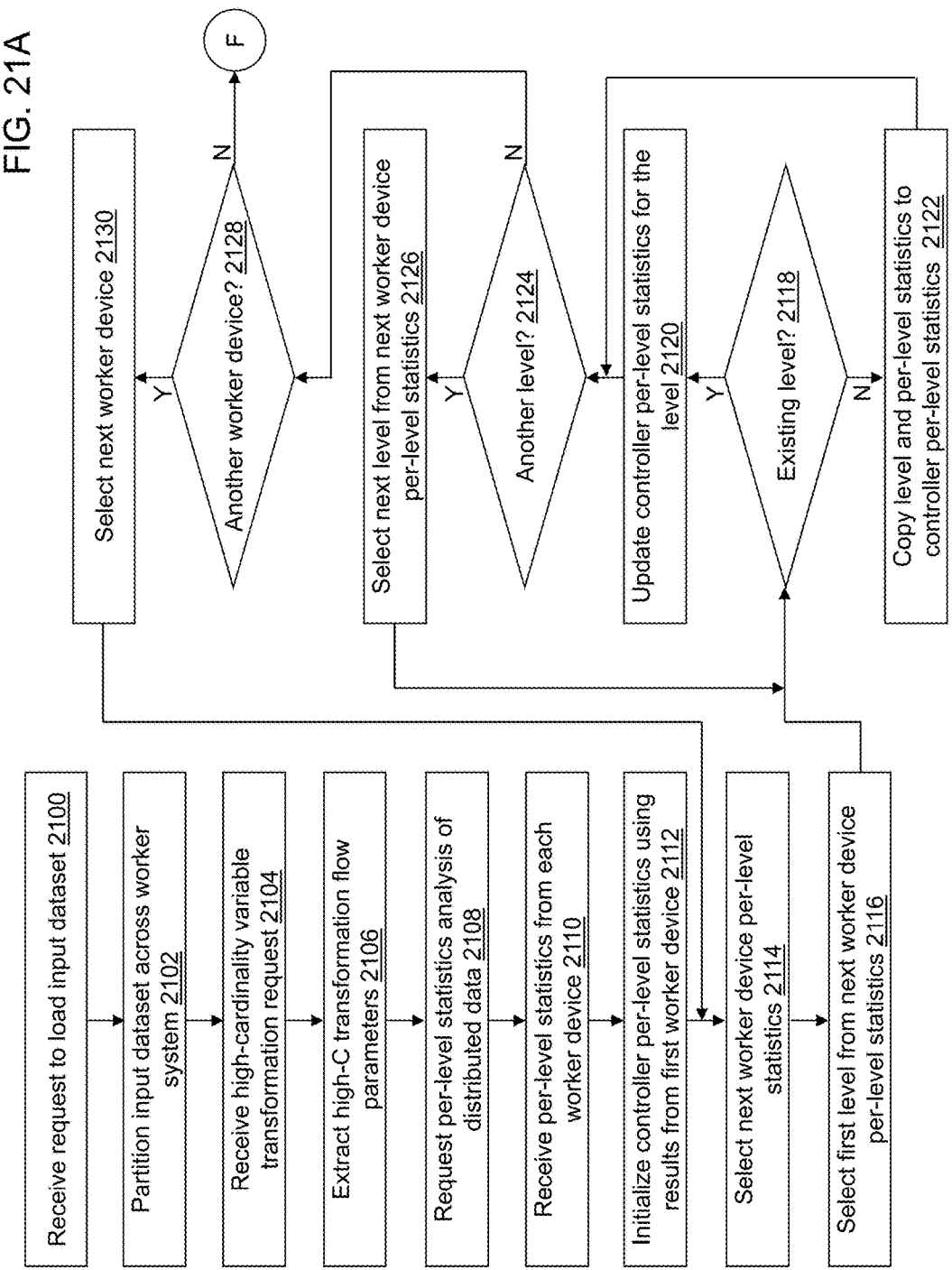
FIGS. 21A and 21B depicts a flow diagram illustrating examples of operations performed by the controller device of FIG. 3 in support of high-C data transformation in accordance with an illustrative embodiment.
Figure 21B:
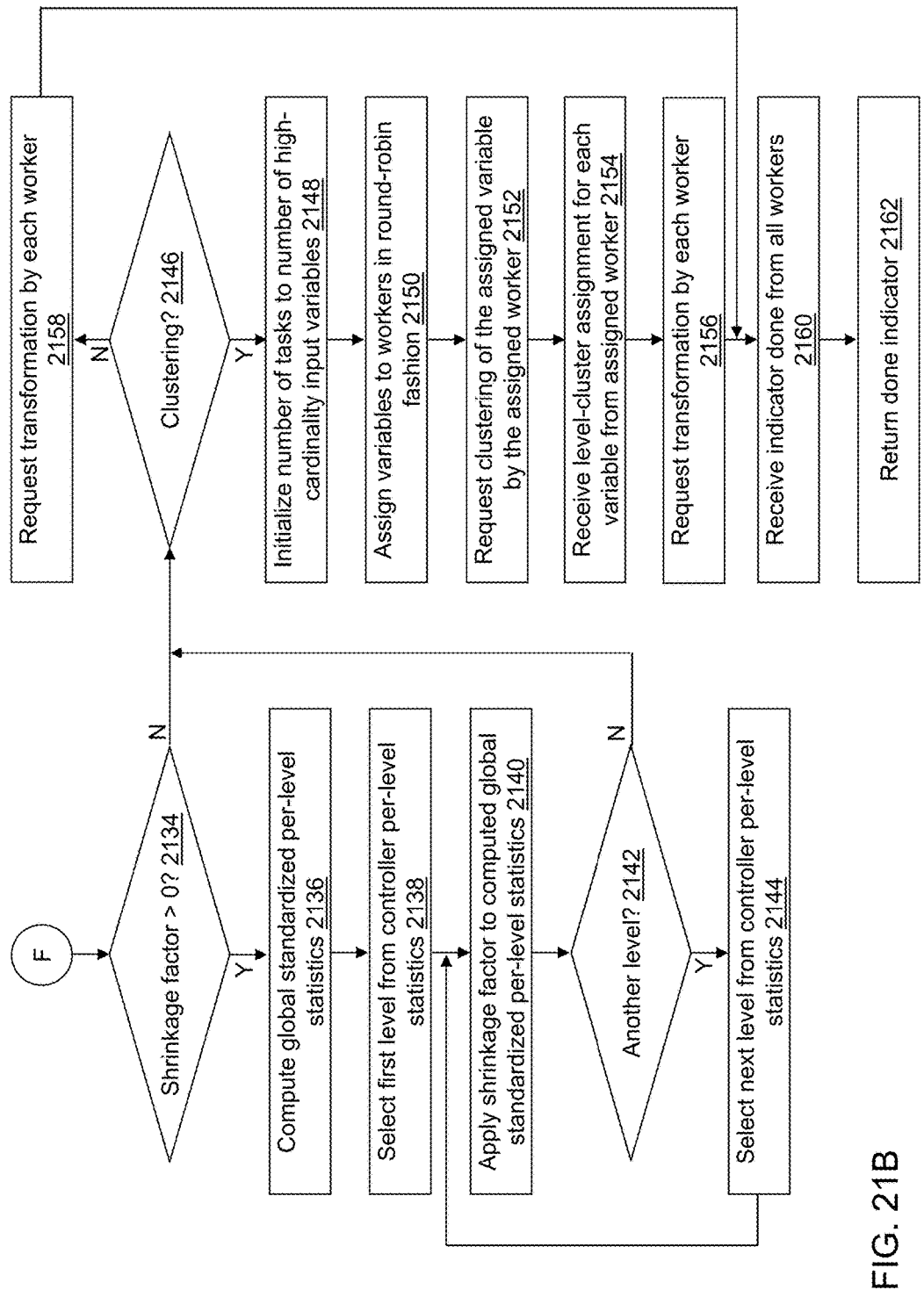

Referring to FIGS. 21A and 21B, example operations associated with controller high-C data transformation application 330 are described. Additional, fewer, or different operations may be performed depending on the embodiment. The order of presentation of the operations of FIGS. 21A and 21B is not intended to be limiting. Again, controller high-C data transformation application 330 and high-C data transformation application 230 may be integrated or be the same applications so that the operations of FIG. 20 and FIGS. 21A and 21B are merged. Additionally, or in the alternative, controller data analysis application 312, controller data transformation application 324, and/or controller high-C data transformation application 330 may be integrated or be the same applications so that the operations of FIG. 6, FIGS. 15A and 15B, and/or FIGS. 21A and 21B are merged.

Similar to operation 600, in an operation 2100, the request to load the input dataset selected by the user is received.

Similar to operation 602, in an operation 2102, the input dataset is loaded and distributed across each worker device 400 of worker system 106.

In an operation 2104, the high-C transformation request may be received from user device 200 or directly from the user of user device 200 when integrated.

In an operation 2106, the plurality of high-C transformation flow parameter values is extracted from the high-C transformation request. In an alternative embodiment, the request may include a reference to a location that is storing the values. In another alternative embodiment, the plurality of high-C transformation flow parameter values may be read from a known storage location. The plurality of high-C transformation flow parameter values may be stored in transformation flow parameter values 326.

In an operation 2108, a request is sent to each worker device 400 to compute per-level statistics for each selected high-C input variable for each high-C transformation flow. For example, the request includes an input variable name, a target variable name, and a transformation flow index for each high-C transformation flow.

In an operation 2110, the per-level statistics results for each selected high-C input variable for each high-C transformation flow are received from each worker device 400.

In an operation 2112, controller per-level statistics are initialized using the per-level statistics results from a first worker device 400 of worker system 106.

In an operation 2114, the per-level statistics results are selected for a next worker device 400 of worker system 106.

In an operation 2116, a first level is selected from the selected per-level statistics results for the next worker device 400.

In an operation 2118, a determination is made concerning whether the first level is included in the initialized controller per-level statistics. When the first level is included, processing continues in an operation 2120. When the first level is not included, processing continues in an operation 2122.

In operation 2120, the controller per-level statistics for the first level are updated to include the selected per-level statistics results for the next worker device 400, and processing continues in an operation 2124.

In operation 2122, the selected per-level statistics results for the first level for the next worker device 400 are copied to the controller per-level statistics to create the first level in the controller per-level statistics, and processing continues in operation 2124.

In operation 2124, a determination is made concerning whether the selected per-level statistics results for the next worker device 400 include another level. When there is another level, processing continues in operation 2126. When there is not another level, processing continues in an operation 2128.

In operation 2126, the next level is selected from the selected per-level statistics results for the next worker device 400, and processing continues in operation 2118.

In operation 2128, a determination is made concerning whether there is another worker device 400 of worker system 106 to process. When there is another worker device 400, processing continues in operation 2130. When there is not another worker device 400, processing continues in an operation 2132.

In operation 2130, a next worker device 400 is selected from worker system 106, and processing continues in operation 2114.

Referring to FIG. 21B, in an operation 2134, a determination is made concerning whether the value of the shrinkage factor is greater than zero. When the value of the shrinkage factor is greater than zero, processing continues in operation 2136. When the value of the shrinkage factor is not greater than zero, processing continues in an operation 2146.

In an operation 2136, global standardized moments are computed from the controller per-level statistics using the method described in Phillippe Pébay, *Formulas for Robust, One-Pass Parallel Computation of Covariances and Arbitrary-Order Statistical Moments*, Sandia Report SAND2008-6212, Sandia National Laboratories (2008).

In an operation 2138, a first level is selected from the controller per-level statistics.

In an operation 2140, the value of the shrinkage factor is applied to the first level of the controller per-level statistics using the method described in J. B. Copas, *Regression, Prediction and Shrinkage (with Discussion)*, 45 Journal of the Royal Statistical Society Series B-Methodological 311 (1983). The estimated standardized moments for the levels with observations fewer than the value of the shrinkage factor is made very close to the global standardized moments using the method.

In operation 2142, a determination is made concerning whether the controller per-level statistics include another level. When there is another level, processing continues in operation 2144. When there is not another level, processing continues in an operation 2146.

In operation 2144, the next level is selected from the controller per-level statistics, and processing continues in operation 2140.

In operation 2146, a determination is made concerning whether clustering was selected. For example, when the value of the number of clusters into which to cluster the p features is greater than one, clustering was selected. When clustering was selected, processing continues in an operation 2148. When clustering was not selected, processing continues in an operation 2150.

In operation 2148, a number of k-means clustering tasks is initialized to the number of high cardinality input variables selected, and a sequential task identifier is assigned to each k-means clustering task.

In an operation 2150, the clustering tasks are assigned to worker device 400 of worker system 106 in a round-robin fashion until each clustering task has been assigned. A list of task identifier and worker device identifier of the assigned worker device 400 may be created.

In an operation 2152, clustering of the assigned task (variable) is requested of each worker device 400 of worker system 106. The request sent to each worker device 400 may include the controller per-level statistics for the assigned variable that is to be clustered.

In an operation 2154, a cluster assignment for each level of the controller per-level statistics for the assigned variable is received from each worker device 400 of worker system 106. The cluster assignment assigns a cluster identifier to each level of the controller per-level statistics for the assigned variable.

In an operation 2156, a request is sent to each worker device 400 to transform each input variable for each high-C transformation flow using the cluster identifier assigned to each level for each high-C variable.

In an operation 2158, a request is sent to each worker device 400 to transform each input variable for each high-C transformation flow using the controller per-level statistics that may have been shrunk and/or compressed.

In an operation 2160, a done indicator is received from each worker device 400.

In operation 2162, a done indicator is sent to user device 200. The transformed data may be stored in transformed data subset 428 at each worker device 400.

Figure 22A:
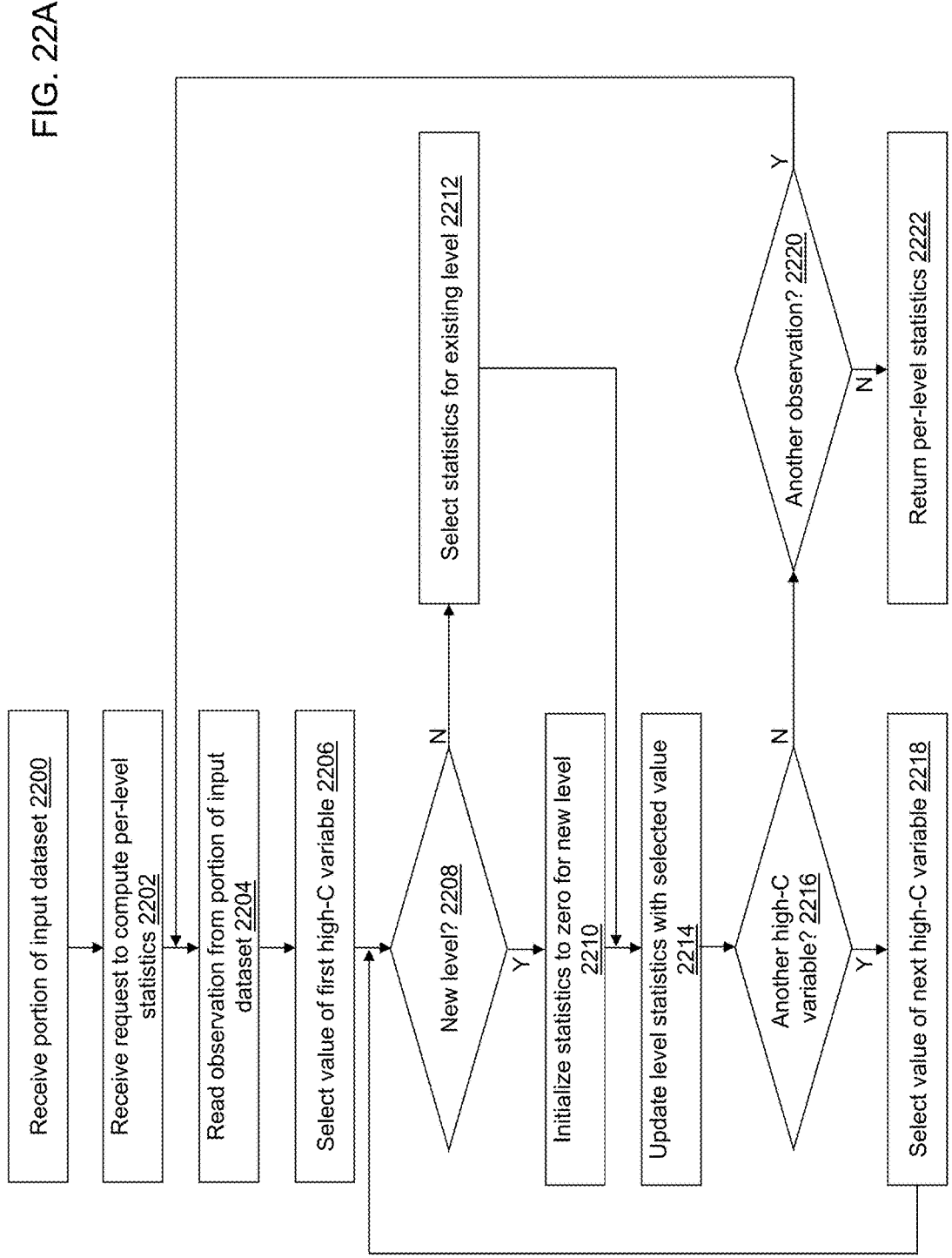
FIGS. 22A and 22B depicts a flow diagram illustrating examples of operations performed by the worker device of FIG. 4 in support of high-C data transformation in accordance with an illustrative embodiment.
Figure 22B:
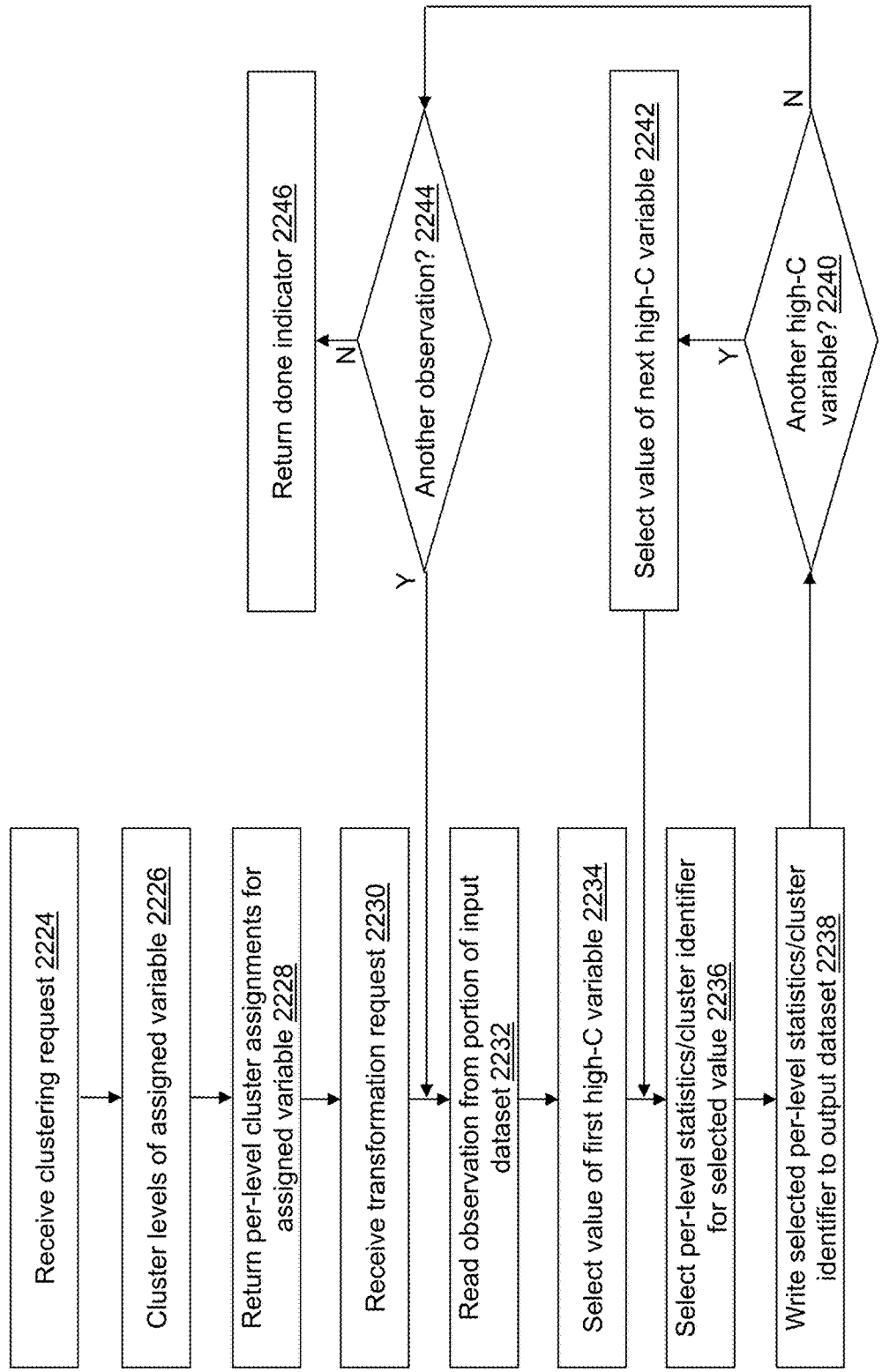

Referring to FIGS. 22A and 22B, example operations associated with worker high-C data transformation application 430 are described. Additional, fewer, or different operations may be performed depending on the embodiment. The order of presentation of the operations of FIGS. 22A and 22B not intended to be limiting. Controller high-C data transformation application 330 and worker high-C data transformation application 430 may be integrated or be the same applications so that the operations of FIGS. 21A and 21B and FIGS. 22A and 22B are merged. Additionally, or in the alternative, worker data analysis application 412, worker data transformation application 424 and/or worker high-C data transformation application 430 may be integrated or be the same applications so that the operations of FIGS. 7A and 7B, FIGS. 16A, 16B, and 16C, and/or FIGS. 22A and 22B are merged.

Similar to operation 700, in an operation 2200, a portion of the input dataset is received and loaded in third computer-readable medium 408 as input data subset 414.

In an operation 2202, the request to compute per-level statistics values is received. The request may include an indicator of the high-C transformation flow, the high-C input variable, the target variable associated with the high-C input variable, the number of the p features to generate for the high-C input variable, and/or the value of the missing level option for each high-C transformation flow.

In an operation 2204, an observation is read from input data subset 414 to define values for each high-C input variable of each high-C transformation flow and the target variable associated with each high-C input variable. Hash based level compression is applied if selected by the user as indicated by the plurality of high-C transformation flow parameter values. When hash based level compression is applied, for each value of a variable, a hash function is applied to map the nominal value to an integer index by taking the remainder (modulo operator) of the hashed value with the number of buckets of the hash table to limit a number of distinct levels to the number of buckets, which may be user-definable.

In an operation 2206, a current input value of a first high-C input variable and a target value of the target variable associated with the first high-C input variable are selected from the read observation.

In operation 2208, a determination is made concerning whether the current input value is a new level for the high-C input variable. When the value is a new level, processing continues in an operation 2210. When the value is not a new level, processing continues in an operation 2212.

In operation 2210, statistical data values are initialized for each of the p features to generate. For example, counters and sum values are initialized to zero. Minimum values may be initialized to a large quantity, and maximum values may be initialized to a large negative quantity. Illustrative counters include a number of observations counter value, a number of missing observations counter value, a number of unique values counter value, a number of occurrences of each unique value counter value, etc. Illustrative sum values include a total sum of values of each variable, a total sum of squared values of each variable, etc.

In an operation 2212, the statistical data values for each of the p features to generate for the level are selected.

In an operation 2214, the statistical data values for each of the p features to generate for the level are updated using $$M_{p,\zeta} = M_{p,\zeta_1} + \sum_{k=1}^{p-2} \binom{k}{p} M_{p-k,\zeta_1} \left(\frac{-\delta}{n}\right)^k + \left(\frac{(n-1)\delta}{n}\right)^p \left[1 - \left(\frac{-1}{n-1}\right)^{p-1}\right]$$

where $\delta = y - \mu_1$, where y is the target value, $\mu_1$ is a mean value, n is a number of observations, M is the statistical data value for the feature or moment that is one of the p features to generate, $\zeta_1$ indicates the statistical data value without a contribution from the new observation, and $\zeta$ indicates the statistical data value with the contribution from the new observation.

In operation 2216, a determination is made concerning whether there is another high-C input variable. When there is another high-C input variable, processing continues in an operation 2218. When there is not another high-C input variable, processing continues in an operation 2220.

In operation 2218, a current input value of a next high-C input variable and a target value of the target variable associated with the next high-C input variable are selected from the read observation, and processing continues in operation 2208.

In operation 2220, a determination is made concerning whether there is another observation in input data subset 414. When there is another observation, processing continues in an operation 2204. When there is not another observation, processing continues in an operation 2222.

In operation 2222, the updated level statistical data value(s) for each of the p features to generate are returned or otherwise provided to controller device 104. The updated level statistical data value(s) may be stored in subset per-level statistics values 432.

Referring to FIG. 22B, in an operation 2224, a clustering request is received that includes the controller per-level statistics value for each of the p features to generate for an assigned variable. Each clustering task is defined by a contingency table that contains the level and per-level statistics of the variable that defines the task. For illustration, Table V below depicts a slice of input to the k-means clustering task for an assigned variable where p=4:

TABLE V

| level | Moment 1 (mean) | Moment 2 (std. dev.) | Moment 3 (third moment) | Moment 4 (fourth moment) |
|---|---|---|---|---|
| 1 | 0.5 | 1 | 12 | 14 |
| 2 | 0.6 | 2.5 | 3 | 120 |
| 3 | 10 | 120 | 131 | 1400 |
| ... | ... | ... | ... | ... |

In an operation 2226, k-means clustering (or another type of clustering) is performed to map each level to a cluster identifier. For illustration, the paper by Hartigan, J. A. and Wong, M. A., *Algorithm AS 136: A K-Means Clustering Algorithm* (1979) describes a k-means clustering method.

In an operation 2228, the per-level cluster assignments are returned to controller device 104.

In an operation 2230, the request to transform each high-C input variable of each high-C transformation flow is received. The request may include an indicator of the high-C transformation flow, the input variable, and the per-level cluster identifier for each high-C input variable and for each high-C transformation flow when the request is received as a result of execution of operation 2156. The request may include an indicator of the high-C transformation flow, the input variable, and the controller per-level statistics value for each of the p features for each high-C input variable and for each high-C transformation flow when the request is received as a result of execution of operation 2158.

Transformed data subset 428 may be opened for writing on a first row. A header row may be written to the first row of transformed data subset 428 that includes a variable name for each transformed variable. For example, the variable name for each variable to transform may be appended to the "name" parameter value given to each high-C transformation flow so that each transformed variable has a unique name. For example, in the illustrative code above, a first transformed variable may be named "t1_osource_1" for a first feature of the p features or the cluster identifier, a second transformed variable may be named "t1_osource_2" for a second feature of the p features, a third transformed variable may be named "t1_osource_3" for a third feature of the p features, etc.

In an operation 2232, an observation is read as a current observation from input data subset 414 to define values for each high-C variable of each high-C transformation flow. When the option replace=False is selected by the user, the current observation may be written to transformed data subset 428 so that transformed values are appended to the original values read from input data subset 414.

In an operation 2234 a current input value of a first high-C variable is selected as a current value from the read observation.

In an operation 2236, either the per-level statistics or the cluster identifier are selected based on the current input value from the values received in the request.

In an operation 2238, either the selected per-level statistics or the selected cluster identifier are appended to the current row of transformed data subset 428 as an output value of the current high-C transformation flow for the value of the current variable.

In operation 2240, a determination is made concerning whether there is another high-C input variable to transform. When there is another high-C input variable, processing continues in an operation 2242. When there is not another high-C input variable, processing continues in an operation 2244.

In operation 2242, a current input value of a next high-C input variable is selected from the read observation, and processing continues in operation 2236.

In operation 2244, a determination is made concerning whether there is another observation in input data subset 414. When there is another observation, processing continues in operation 2232. When there is not another observation, processing continues in an operation 2246.

In operation 2246, a done indicator is sent to controller device 104.

Figure 23:
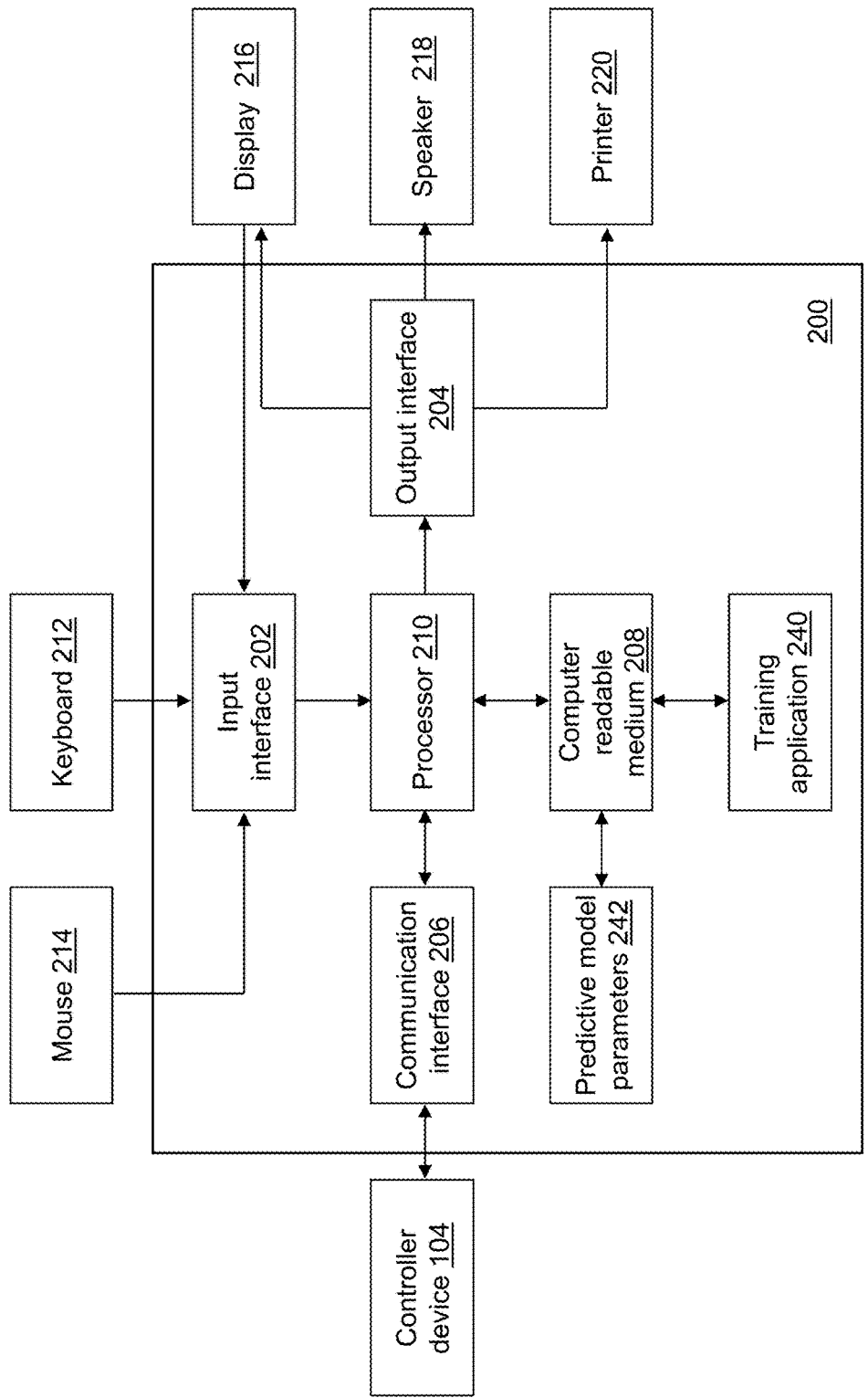
FIG. 23 depicts a block diagram of a model training device in accordance with an illustrative embodiment.

Referring to FIG. 23, a fourth embodiment of user device 200 is shown that further includes a training application 240. Training application 240 performs operations associated with training a model using transformed data subset 428. The operations may be implemented using hardware, firmware, software, or any combination of these methods. Referring to the example embodiment of FIG. 23, training application 240 is implemented in software (comprised of computer-readable and/or computer-executable instructions) stored in computer-readable medium 208 and accessible by processor 210 for execution of the instructions that embody the operations of training application 240. Training application 240 may be written using one or more programming languages, assembly languages, scripting languages, etc. Training application 240 may be implemented as a Web application.

Training application 240 may be integrated with other analytic tools including data analysis application 222, data transformation application 224, and/or high-C data transformation application 230. As an example, training application 240 may be part of an integrated data analytics software application and/or software architecture such as that offered by SAS Institute Inc. of Cary, N.C., USA. For example, training application 240 may be part of SAS® Enterprise Miner™ developed and provided by SAS Institute Inc. of Cary, N.C., USA. Merely for further illustration, training application 240 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Training application 240 performs operations associated with defining predictive model parameters 242 from data stored in transformed data subset 428 distributed across worker system 106. Predictive model parameters 242 may be used to classify data stored in a scoring dataset 2524 (shown referring to FIG. 25) to support various data analysis functions as well as provide alert/messaging related to the classified data. Some or all of the operations described herein may be embodied in training application 240. The operations may be implemented using hardware, firmware, software, or any combination of these methods.

Training application 240 may be integrated with other system processing tools to automatically process data generated as part of operation of an enterprise, device, system, facility, etc., to identify any outliers in the processed data, to monitor changes in the data, and to provide a warning or alert associated with the monitored data using input interface 202, output interface 204, and/or communication interface 206 so that appropriate action can be initiated in response to changes in the monitored data.

Figure 24:
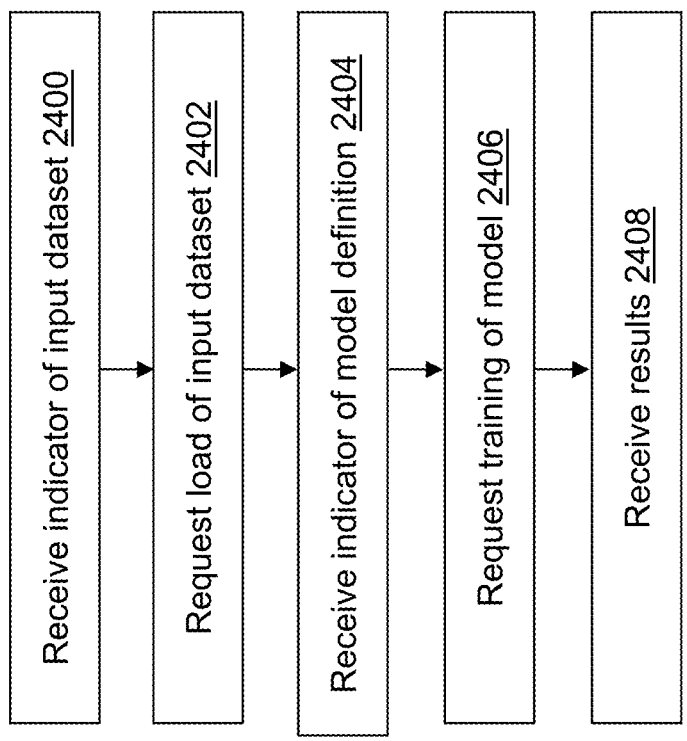
FIG. 24 depicts a flow diagram illustrating examples of operations performed by the model training device of FIG. 23 in accordance with an illustrative embodiment.

Referring to FIG. 24, example operations associated with training application 240 are described. Additional, fewer, or different operations may be performed depending on the embodiment. The order of presentation of the operations of FIG. 24 is not intended to be limiting. A user can interact with one or more user interface windows presented to the user in a display under control of data transformation application 240 independently or through a browser application in an order selectable by the user. Although some of the operational flows are presented in sequence, the various operations may be performed in various repetitions, concurrently, and/or in other orders than those that are illustrated.

A session may be established with controller device 104.

Similar to operation 500, in an operation 2400, the first indicator may be received that indicates the input dataset. The input dataset may be an indicator of the transformed dataset.

Similar to operation 502, in an operation 2402, a load of the input dataset may be requested.

In an operation 2404, a seventh indicator of a model definition is received. For example, the model definition indicates a model type to train and any hyperparameters to use as part of the model training. Illustrative model types include a neural network model type, a gradient boosting tree model type, a decision tree model type, a forest model type, a support vector machine model type, etc.

In an operation 2406, a request to train a model of the specified model type with the input dataset is sent to controller device 104.

In an operation 2408, results of training the model type are received and stored in predictive model parameters 242. The results describe a predictive model. The results may be an analytic store created using the ASTORE procedure provided by the SAS Visual Data Mining and Machine Learning Procedures developed and provided by SAS Institute Inc. of Cary, N.C., USA.

Figure 25:
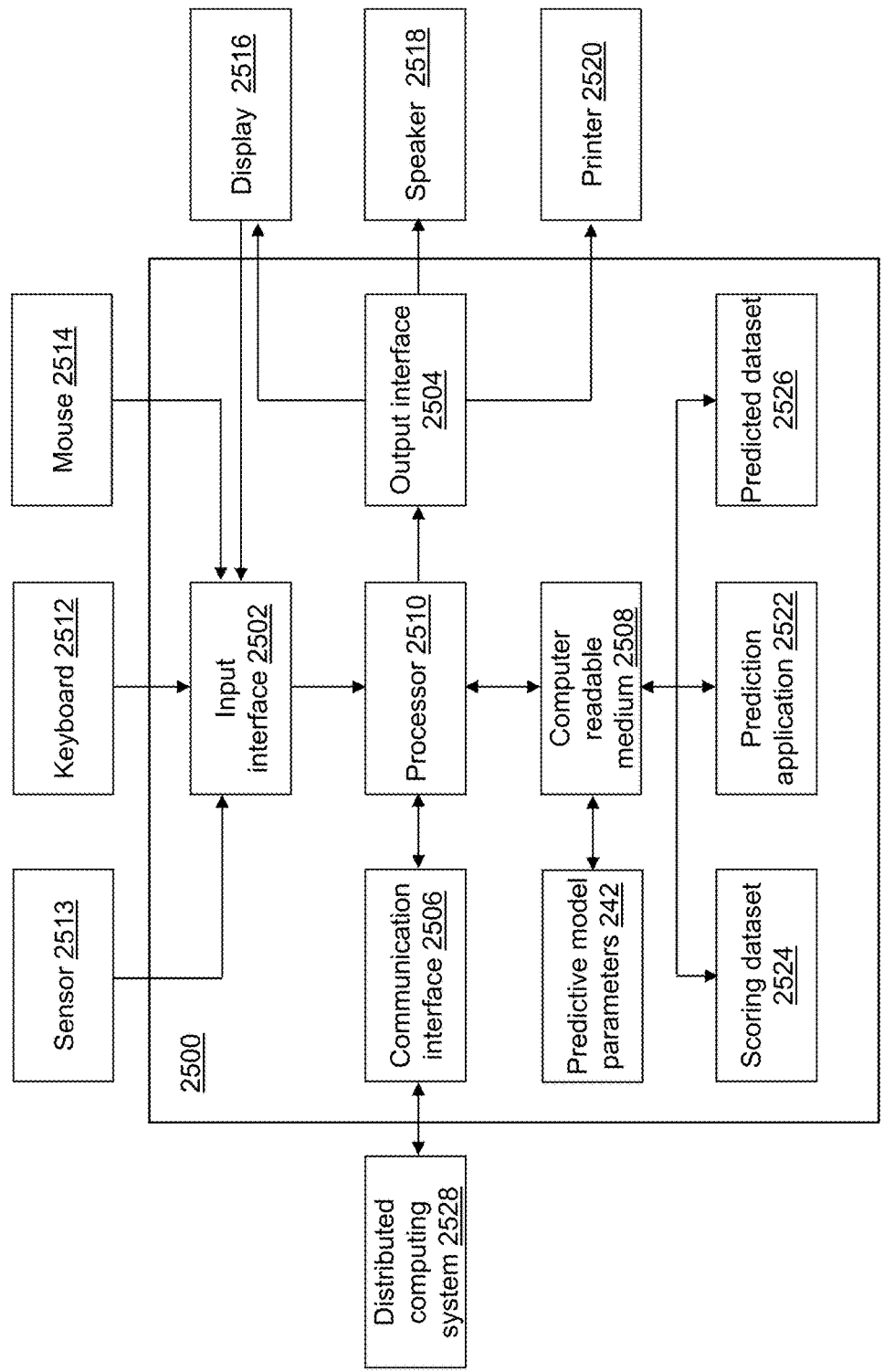
FIG. 25 depicts a block diagram of a prediction device in accordance with an illustrative embodiment.

Referring to FIG. 25, a block diagram of a prediction device 2500 is shown in accordance with an illustrative embodiment. Prediction device 2500 may include a fourth input interface 2502, a fourth output interface 2504, a fourth communication interface 2506, a fourth non-transitory computer-readable medium 2508, a fourth processor 2510, a prediction application 2522, predictive model parameters 242, scoring dataset 2524, and predicted dataset 2526. Fewer, different, and/or additional components may be incorporated into prediction device 2500. Prediction device 2500 and user device 200 and/or controller device 104 may be the same or different devices.

Fourth input interface 2502 provides the same or similar functionality as that described with reference to input interface 202 of user device 200 though referring to prediction device 2500. Fourth output interface 2504 provides the same or similar functionality as that described with reference to output interface 204 of user device 200 though referring to prediction device 2500. Fourth communication interface 2506 provides the same or similar functionality as that described with reference to communication interface 206 of user device 200 though referring to prediction device 2500. Data and messages may be transferred between prediction device 2500 and a distributed computing system 2528 using fourth communication interface 2506. Fourth computer-readable medium 2508 provides the same or similar functionality as that described with reference to computer-readable medium 208 of user device 200 though referring to prediction device 2500. Fourth processor 2510 provides the same or similar functionality as that described with reference to processor 210 of user device 200 though referring to prediction device 2500.

Prediction application 2522 performs operations associated with classifying or predicting a characteristic of each observation of scoring dataset 2524 that is stored in predicted dataset 2526 to support various data analysis functions as well as provide alert/messaging related to the classified/predicted data. Dependent on the type of data stored in the input dataset and scoring dataset 2524, prediction application 2522 may identify anomalies as part of process control, for example, of a manufacturing process, for machine condition monitoring, for example, an electrocardiogram device, for image classification, for intrusion detection, for fraud detection, etc. Some or all of the operations described herein may be embodied in prediction application 2522. The operations may be implemented using hardware, firmware, software, or any combination of these methods.

Referring to the example embodiment of FIG. 25, prediction application 2522 is implemented in software (comprised of computer-readable and/or computer-executable instructions) stored in fourth computer-readable medium 2508 and accessible by fourth processor 2510 for execution of the instructions that embody the operations of prediction application 2522. Prediction application 2522 may be written using one or more programming languages, assembly languages, scripting languages, etc. Prediction application 2522 may be integrated with other analytic tools. As an example, prediction application 2522 may be part of an integrated data analytics software application and/or software architecture such as that offered by SAS Institute Inc. of Cary, N.C., USA. For example, prediction application 2522 may be part of SAS® Enterprise Miner™ developed and provided by SAS Institute Inc. of Cary, N.C., USA. Merely for further illustration, prediction application 2522 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 2522 further may be performed by an ESPE. Prediction application 2522, data analysis application 222, controller data analysis application 312, worker data analysis application 412, and/or training application 240 may be the same or different applications that are integrated in various manners to transform data used to train and execute a model using scoring dataset 2524.

Prediction application 2522 may be implemented as a Web application.

Prediction application 2522 may be integrated with other system processing tools to automatically process data generated as part of operation of an enterprise, to classify data in the processed data, and/or to provide a warning or alert associated with the data classification using fourth input interface 2502, fourth output interface 2504, and/or fourth communication interface 2506 so that appropriate action can be initiated in response. For example, a warning or an alert may be presented using a second display 2516, a second speaker 2518, a second printer 2520, etc. or sent to one or more computer-readable media, display, speaker, printer, etc. of distributed computing system 2528.

The input dataset and scoring dataset 2524 may be generated, stored, and accessed using the same or different mechanisms. Similar to the input dataset, scoring dataset 2524 may include a plurality of rows and a plurality of columns with the plurality of rows referred to as observations or records, and the columns referred to as variables that are associated with an observation. Scoring dataset 2524 may be transposed.

Scoring dataset 2524 may be stored on fourth computer-readable medium 2508 or on one or more computer-readable media of distributed computing system 2528 and accessed by prediction device 2500 using fourth communication interface 2506. Data stored in scoring dataset 2524 may be a sensor measurement or a data communication value, for example, from a sensor 2513, may be generated or captured in response to occurrence of an event or a transaction, generated by a device such as in response to an interaction by a user with the device, for example, from a second keyboard 2512 or a second mouse 2514, etc. The data stored in scoring dataset 2524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in scoring dataset 2524 may be captured at different time points periodically, intermittently, when an event occurs, etc. One or more columns may include a time value. Similar to the input dataset, data stored in scoring dataset 2524 may be generated as part of the IoT, and some or all data may be pre- or post-processed by an ESPE.

Scoring dataset 2524 may be stored in various compressed formats such as a coordinate format, a compressed sparse column format, a compressed sparse row format, etc. Scoring dataset 2524 further may be stored using various structures as known to those skilled in the art including a file system, a relational database, a system of tables, a structured query language database, etc. on prediction device 2500 and/or on prediction application 2522. Prediction device 2500 and/or prediction application 2522 may coordinate access to scoring dataset 2524 that is distributed across worker system 106 and/or controller device 104. For example, scoring dataset 2524 may be stored in a cube distributed across a grid of computers as understood by a person of skill in the art. As another example, scoring dataset 2524 may be stored in a multi-node Hadoop® cluster. As another example, scoring dataset 2524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in scoring dataset 2524.

Referring to FIG. 26, example operations of prediction application 2522 are described. Additional, fewer, or different operations may be performed depending on the embodiment of prediction application 2522. The order of presentation of the operations of FIG. 26 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 2600, an eighth indicator may be received that indicates scoring dataset 2524. For example, the eighth indicator indicates a location and a name of scoring dataset 2524. As an example, the eighth indicator may be received by prediction application 2522 after selection from a user interface window or after entry by a user into a user interface window. In an alternative embodiment, scoring dataset 2524 may not be selectable. For example, a most recently created dataset may be used automatically.

In an operation 2602, a ninth indicator may be received that indicates predictive model parameters 242. For example, the ninth indicator indicates a location and a name of predictive model parameters 242. As an example, the ninth indicator may be received by prediction application 2522 after selection from a user interface window or after entry by a user into a user interface window. In an alternative embodiment, predictive model parameters 242 may not be selectable. For example, a most recently created model configuration data may be used automatically. As another example, predictive model parameters 242 may be provided automatically as part of integration with training application 240.

In an operation 2604, a model configuration is read from predictive model parameters 242.

In an operation 2606, a model is instantiated with the read model configuration. For example, the type of model, its hyperparameters, and other characterizing elements are read and used to instantiate the model trained using the transformed input dataset.

In an operation 2608, an observation vector is read from scoring dataset 2524.

In an operation 2610, the observation vector is pre-processed, if any pre-processing is performed.

In an operation 2612, the optionally pre-processed observation vector is input to the instantiated model.

In an operation 2614, an output of the instantiated model is received. The output may indicate a predicted characteristic computed from the observation vector using the instantiated model.

In an operation 2616, the predicted characteristic may be output, for example, by storing the predicted characteristic with the observation vector to predicted dataset 2526. In addition, or in the alternative, the predicted characteristic may be presented on second display 2516, printed on second printer 2520, sent to another computing device using fourth communication interface 2506, an alarm or other alert signal may be sounded through second speaker 2518, etc.

In an operation 2618, a determination is made concerning whether scoring dataset 2524 includes another observation vector. When scoring dataset 2524 includes another observation vector, processing continues in an operation 2620. When scoring dataset 2524 does not include another observation vector, processing continues in an operation 2622.

In operation 2620, a next observation vector is read from scoring dataset 2524, and processing continues in operation 2610.

In operation 2622, processing stops and cleanup is performed as needed.

The explosion of digital data is generating many opportunities for big data analytics, which in turn provides many opportunities for analyzing the data and grouping variables to capitalize on the information contained in the data—to make better predictions that lead to better decisions.

Data analysis and transformation system 100 outputs a hierarchical variable grouping in which the groups are characterized by comprehensive and multi-dimensional statistical metrics that can be consumed in downstream analytics by systems that perform pipelined variable transformations. An example of such a system is data transformation application 224, controller data transformation application 324, and worker data transformation application 424. Additionally, data analysis and transformation system 100 can generate a complete array of meta-learning dataset features beneficial to meta-learning systems as these features can capture salient features of datasets that are difficult to capture with traditional, individual (non-interacting) features. Data analysis and transformation system 100 also can be used for effective visualization of data quality problems in modern datasets that are typically characterized by large dimensions, which is important because it helps the user select the proper algorithms for application in downstream analytics.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    receive a transformation flow definition, wherein the transformation flow definition indicates one or more flow variables and one or more transformation phases to apply to the one or more flow variables;
    define a statistical computation for each variable of the one or more variables and for each transformation phase of the one or more transformation phases, wherein defining the statistical computation comprises
        (aa) selecting a first variable of the one or more flow variables as a current variable;
        (ba) selecting a first transformation phase of the one or more transformation phases as a current transformation phase;
        (ca) initializing an order index;
        (da) selecting a statistic type associated with the current transformation phase;
        (ea) adding the order index, the current variable, and the selected statistic type as a new statistical computation to a list of statistical computations;
        (fa) incrementing the order index;
        (ga) repeating (da) to (fa) with each remaining transformation phase of the one or more transformation phases as the current transformation phase; and
        (ha) repeating (ba) to (ga) with each remaining variable of the one or more flow variables as the current variable;
    compute a phase internal parameter value for each defined statistical computation from a plurality of observation vectors read from an input dataset, wherein each observation vector of the plurality of observation vectors includes a plurality of values, wherein each value of the plurality of values is associated with a different variable to define a plurality of variables, wherein each variable of the one or more flow variables is associated with one of the defined plurality of variables;
    (a) read an observation vector from the input dataset to define a variable value for each variable of the one or more flow variables;
    (b) select a second variable of the one or more flow variables as the current variable;
    (c) define a current value equal to the defined variable value for the current variable;
    (d) select a second transformation phase of the one or more transformation phases as the current transformation phase;
    (e) select the computed phase internal parameter value for the current variable and the current transformation phase;
    (f) define a transformation function with the selected phase internal parameter value based on the current transformation phase;
    (g) compute a result value by executing the defined transformation function with the defined current value;
    (h) repeat (e) to (g) with each remaining transformation phase of the one or more transformation phases as the current transformation phase and with the defined current value equal to the computed result value;
    (i) output the computed result value to a transformed input dataset;
    (j) repeat (c) to (i) with each remaining variable of the one or more flow variables as the current variable; and
    (k) repeat (a) to (j) with each remaining observation vector from the input dataset.

2. The non-transitory computer-readable medium of claim 1, wherein the transformation flow definition is for a nominal variable type based on a variable type of the one or more variables included in the transformation flow definition.

3. The non-transitory computer-readable medium of claim 2, wherein the current transformation phase in (ba) and in (d) is an impute phase, wherein the transformation function imputes a value when the defined current value is a missing value.

4. The non-transitory computer-readable medium of claim 3, wherein the computed phase internal parameter value for the current variable in (aa) and in (b) and the current transformation phase in (ba) and in (d) is the imputed value that is a mode value computed for the current variable in (aa) and in (b).

5. The non-transitory computer-readable medium of claim 2, wherein the current transformation phase in (ba) and in (d) is a hash phase, wherein the transformation function replaces the defined current value with a hashed value based on a hash function.

6. The non-transitory computer-readable medium of claim 2, wherein the current transformation phase in (ba) and in (d) is a map interval phase, wherein the transformation function replaces the defined current value with a mapped value.

7. The non-transitory computer-readable medium of claim 6, wherein the computed phase internal parameter value for the current variable in (aa) and in (b) and the current transformation phase in (ba) and in (d) is a contingency table of possible values of the current variable in (aa) and in (b).

8. The non-transitory computer-readable medium of claim 2, wherein the current transformation phase in (ba) and in (d) is a grouping phase, wherein the transformation function replaces the defined current value with a mapped value.

9. The non-transitory computer-readable medium of claim 8, wherein the computed phase internal parameter value for the current variable in (aa) and in (b) and the current transformation phase in (ba) and in (d) is a level-group map of possible values of the current variable in (aa) and in (b).

10. The non-transitory computer-readable medium of claim 1, wherein the transformation flow definition is for an interval variable type based on a variable type of the one or more variables included in the transformation flow definition.

11. The non-transitory computer-readable medium of claim 10, wherein the current transformation phase in (ba) and in (d) is an impute phase, wherein the transformation function imputes a value when the defined current value is a missing value of the one or more flow variables of the current transformation flow.

12. The non-transitory computer-readable medium of claim 11, wherein the computed phase internal parameter value for the current variable in (aa) and in (b) and the current transformation phase in (ba) and in (d) is the imputed value that is a central tendency value computed for the current variable in (aa) and in (b).

13. The non-transitory computer-readable medium of claim 10, wherein the current transformation phase in (ba) and in (d) is an outlier phase, wherein the transformation function determines when the defined current value is an outlier value.

14. The non-transitory computer-readable medium of claim 13, wherein the computed phase internal parameter value for the current variable in (aa) and in (b) and the current transformation phase in (ba) and in (d) is a replacement value that is a central tendency value computed for the current variable in (aa) and in (b).

15. The non-transitory computer-readable medium of claim 10, wherein the current transformation phase in (ba) and in (d) is a discretize phase, wherein the transformation function assigns the defined current value to a bin.

16. The non-transitory computer-readable medium of claim 15, wherein the computed phase internal parameter value for the current variable in (aa) and in (b) and the current transformation phase in (ba) and in (d) is a contingency table of possible values of the current variable in (aa) and in (b).

17. The non-transitory computer-readable medium of claim 10, wherein the current transformation phase in (ba) and in (d) is a functional transform phase, wherein the transformation function applies a functional transformation to the defined current value.

18. The non-transitory computer-readable medium of claim 1, wherein a plurality of statistical computations is defined for each variable of the one or more variables and for each transformation phase of the one or more transformation phases.

19. The non-transitory computer-readable medium of claim 1, wherein, after (ha), defining the statistical computation further comprises:
   grouping identical statistical computations included in the list of statistical computations;
   designating a single statistical computation of the grouped identical statistical computations as active; and
   designating non-grouped statistical computations as inactive.

20. The non-transitory computer-readable medium of claim 19, wherein, computing the phase internal parameter value comprises:
   initializing an order index;
   determine a maximum order index as a maximum number of transformation phases of the transformation flow definition;
   (ab) selecting a second statistical computation from the list of statistical computations that is designated as active and is associated with the order index;
   (bb) compute the phase internal parameter value for the selected statistical computation;
   (cb) incrementing the order index; and
   repeating (ab) to (cb) until the incremented order index is greater than the maximum order index.

21. The non-transitory computer-readable medium of claim 1, wherein the input dataset is distributed across a plurality of computing devices.

22. The non-transitory computer-readable medium of claim 21, wherein (a) to (j) is performed by each computing device of the plurality of computing devices on a subset of the input dataset stored on the respective computing device.

23. The non-transitory computer-readable medium of claim 21, wherein computing the phase internal parameter value for each defined statistical computation is performed by each computing device of the plurality of computing devices on a subset of the input dataset stored on the respective computing device.

24. The non-transitory computer-readable medium of claim 1, wherein a plurality of transformation flow definitions is received,
   wherein the transformation flow definition is one of the plurality of transformation flow definitions,
   wherein the statistical computation is further defined for each transformation flow definition of the plurality of transformation flow definitions,
   wherein the variable value is further defined for each transformation flow definition of the plurality of transformation flow definitions,
   wherein the computer-readable instructions further cause the computing device to:
   (l) select a transformation flow definition from the plurality of transformation flow definitions as a current transformation flow after (a) and before (b),
   wherein the variable selected in (b) as the current variable is selected from the one or more flow variables of the current transformation flow,
   wherein the transformation phase selected in (d) as the current transformation phase is selected from the one or more flow transformation phases of the current transformation flow,
   wherein the computed phase internal parameter value selected in (e) is further selected for the current transformation flow; and
   after (j) and before (k), repeat (b) to (j) with each remaining transformation flow definition of the plurality of transformation flow definitions as the current transformation flow.

25. A computing device comprising:
   a processor; and
   a memory operably coupled to the processor, the memory having computer-readable instructions stored thereon that, when executed by the processor, cause the computing device to
   receive a transformation flow definition, wherein the transformation flow definition indicates one or more flow variables and one or more transformation phases to apply to the one or more flow variables;
   define a statistical computation for each variable of the one or more variables and for each transformation phase of the one or more transformation phases, wherein defining the statistical computation comprises (aa) selecting a first variable of the one or more flow variables as a current variable;
(ba) selecting a first transformation phase of the one or more transformation phases as a current transformation phase;
(ca) initializing an order index;
(da) selecting a statistic type associated with the current transformation phase;
(ea) adding the order index, the current variable, and the selected statistic type as a new statistical computation to a list of statistical computations;
(fa) incrementing the order index;
(ga) repeating (da) to (fa) with each remaining transformation phase of the one or more transformation phases as the current transformation phase; and
(ha) repeating (ba) to (ga) with each remaining variable of the one or more flow variables as the current variable;
compute a phase internal parameter value for each defined statistical computation from a plurality of observation vectors read from an input dataset, wherein each observation vector of the plurality of observation vectors includes a plurality of values, wherein each value of the plurality of values is associated with a different variable to define a plurality of variables, wherein each variable of the one or more flow variables is associated with one of the defined plurality of variables;
(a) read an observation vector from the input dataset to define a first variable value for each variable of the one or more flow variables;
(b) select a second variable of the one or more flow variables as the current variable;
(c) define a current value equal to the defined first variable value for the current variable;
(d) select a second transformation phase of the one or more transformation phases as the current transformation phase;
(e) select the computed phase internal parameter value for the current variable and the current transformation phase;
(f) define a transformation function with the selected phase internal parameter value based on the current transformation phase;
(g) compute a result value by executing the defined transformation function with the defined current value;
(h) repeat (e) to (g) with each remaining transformation phase of the one or more transformation phases as the current transformation phase and with the defined current value equal to the computed result value;
(i) output the computed result value to a transformed input dataset;
(j) repeat (c) to (i) with each remaining variable of the one or more flow variables as the current variable; and
repeat (a) to (j) with each remaining observation vector from the input dataset.

26. A method of transforming variable values in an input dataset using a transformation flow definition applied in parallel, the method comprising:
receiving a transformation flow definition, wherein the transformation flow definition indicates one or more flow variables and one or more transformation phases to apply to the one or more flow variables;
defining, by a computing device, a statistical computation for each variable of the one or more variables and for each transformation phase of the one or more transformation phases, wherein defining the statistical computation comprises
(aa) selecting a first variable of the one or more flow variables as a current variable;
(ba) selecting a first transformation phase of the one or more transformation phases as a current transformation phase;
(ca) initializing an order index;
(da) selecting a statistic type associated with the current transformation phase;
(ea) adding the order index, the current variable, and the selected statistic type as a new statistical computation to a list of statistical computations;
(fa) incrementing the order index;
(ga) repeating (da) to (fa) with each remaining transformation phase of the one or more transformation phases as the current transformation phase; and
(ha) repeating (ba) to (ga) with each remaining variable of the one or more flow variables as the current variable;
computing, by the computing device, a phase internal parameter value for each defined statistical computation from a plurality of observation vectors read from an input dataset, wherein each observation vector of the plurality of observation vectors includes a plurality of values, wherein each value of the plurality of values is associated with a different variable to define a plurality of variables, wherein each variable of the one or more flow variables is associated with one of the defined plurality of variables;
(a) reading, by the computing device, an observation vector from the input dataset to define a first variable value for each variable of the one or more flow variables;
(b) selecting, by the computing device, a second variable of the one or more flow variables as the current variable;
(c) defining, by the computing device, a current value equal to the defined first variable value for the current variable;
(d) selecting, by the computing device, a second transformation phase of the one or more transformation phases as the current transformation phase;
(e) selecting, by the computing device, the computed phase internal parameter value for the current variable and the current transformation phase;
(f) defining, by the computing device, a transformation function with the selected phase internal parameter value based on the current transformation phase;
(g) computing, by the computing device, a result value by executing the defined transformation function with the defined current value;
(h) repeating, by the computing device, (e) to (g) with each remaining transformation phase of the one or more transformation phases as the current transformation phase and with the defined current value equal to the computed result value;
(i) outputting, by the computing device, the computed result value to a transformed input dataset;
(j) repeating, by the computing device, (c) to (i) with each remaining variable of the one or more flow variables as the current variable; and
repeating, by the computing device, (a) to (j) with each remaining observation vector from the input dataset.

27. The method of claim 26, wherein the transformation flow definition is for a nominal variable type based on a variable type of the one or more variables included in the transformation flow definition.

28. The method of claim 26, wherein the transformation flow definition is for an interval variable type based on a variable type of the one or more variables included in the transformation flow definition.

29. The method of claim 26, wherein the input dataset is distributed across a plurality of computing devices.

30. The method of claim 29, wherein (a) to (j) is performed by each computing device of the plurality of computing devices on a subset of the input dataset stored on the respective computing device.

* * * * *